United States Patent
Cao et al.

(10) Patent No.: US 11,885,182 B2
(45) Date of Patent: Jan. 30, 2024

(54) METHODS OF FORMING CUTTING ELEMENTS

(71) Applicant: Baker Hughes Holdings LLC, Houston, TX (US)

(72) Inventors: Wanjun Cao, The Woodlands, TX (US); Marc W. Bird, Houston, TX (US)

(73) Assignee: Baker Hughes Holdings LLC, Houston, TX (US)

(*) Notice: Subject to any disclaimer, the term of this patent is extended or adjusted under 35 U.S.C. 154(b) by 0 days.

(21) Appl. No.: 17/662,871

(22) Filed: May 11, 2022

(65) Prior Publication Data
US 2022/0298866 A1 Sep. 22, 2022

Related U.S. Application Data

(62) Division of application No. 15/993,362, filed on May 30, 2018, now Pat. No. 11,536,091.

(51) Int. Cl.
E21B 10/573 (2006.01)
C04B 35/528 (2006.01)
(Continued)

(52) U.S. Cl.
CPC ...... *E21B 10/5735* (2013.01); *B24D 18/0009* (2013.01); *C04B 35/528* (2013.01);
(Continued)

(58) Field of Classification Search
None
See application file for complete search history.

(56) References Cited

U.S. PATENT DOCUMENTS 3,141,746 A 7/1964 De Lai
3,609,818 A 10/1971 Wentorf, Jr.
(Continued)

FOREIGN PATENT DOCUMENTS

CN 101168229 A 4/2008
CN 101611210 A 12/2009
(Continued)

OTHER PUBLICATIONS

Akaishi et al., "Thermal Properties of Sintered Diamond with Small Amounts of Metal," Science and Technology of New Diamond, (1990) pp. 129-134.
(Continued)

*Primary Examiner* — James A Fiorito
*Assistant Examiner* — Ross J Christie
(74) *Attorney, Agent, or Firm* — TraskBritt

(57) ABSTRACT

A cutting element comprises a supporting substrate, and a cutting table attached to an end of the supporting substrate. The cutting table comprises inter-bonded diamond particles, and a thermally stable material within interstitial spaces between the inter-bonded diamond particles. The thermally stable material comprises a carbide precipitate having the general chemical formula, $A_3XZ_{n-1}$, where A comprises one or more of Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, La, Ce, Pr, Nd, Pm, Sm, Eu, Gd, Tb, Dy, Ho, Er, Tm, Yb, Lu, Ac, Th, Pa, and U; X comprises one or more of Al, Ga, Sn, Be, Bi, Te, Sb, Se, As, Ge, Si, B, and P; Z comprises C; and n is greater than or equal to 0 and less than or equal to 0.75. A method of forming a cutting element, an earth-boring tool, a supporting substrate, and a method of forming a supporting substrate are also described.

18 Claims, 8 Drawing Sheets

(51) Int. Cl.
  *C04B 35/56* (2006.01)
  *C04B 35/565* (2006.01)
  *C04B 35/563* (2006.01)
  *B24D 18/00* (2006.01)
  *E21B 10/567* (2006.01)
  *C22C 26/00* (2006.01)
  *E21B 10/54* (2006.01)

(52) U.S. Cl.
  CPC ............ *C04B 35/56* (2013.01); *C04B 35/563* (2013.01); *C04B 35/565* (2013.01); *C04B 35/5607* (2013.01); *C04B 35/5611* (2013.01); *C04B 35/5615* (2013.01); *C04B 35/5618* (2013.01); *C04B 35/5622* (2013.01); *C22C 26/00* (2013.01); *E21B 10/5673* (2013.01); *C22C 2026/006* (2013.01); *E21B 10/54* (2013.01)

(56) References Cited

U.S. PATENT DOCUMENTS

| | | |
|---|---|---|
| 3,745,623 A | 7/1973 | Wentorf et al. |
| 3,850,591 A | 11/1974 | Wentorf |
| 4,394,170 A | 7/1983 | Sawaoka et al. |
| 4,403,015 A | 9/1983 | Nakai et al. |
| 4,505,746 A | 3/1985 | Nakai et al. |
| 4,525,178 A | 6/1985 | Hall |
| 4,636,253 A | 1/1987 | Nakai et al. |
| 4,694,918 A | 9/1987 | Hall |
| 4,794,326 A | 12/1988 | Friedl |
| 4,907,377 A | 3/1990 | Csillag et al. |
| 4,911,989 A | 3/1990 | Minoru et al. |
| 4,954,139 A | 9/1990 | Cerutti |
| 4,975,125 A | 12/1990 | Chakrabarti et al. |
| 5,106,674 A | 4/1992 | Okada et al. |
| 5,111,895 A | 5/1992 | Griffin |
| 5,127,923 A | 7/1992 | Bunting et al. |
| 5,128,080 A | 7/1992 | Jurewicz et al. |
| 5,266,236 A | 11/1993 | Bovenkerk |
| 5,288,676 A | 2/1994 | Shimada et al. |
| 5,304,342 A | 4/1994 | Hall et al. |
| 5,310,605 A | 5/1994 | Baldoni et al. |
| 5,468,268 A | 11/1995 | Tank et al. |
| 5,505,748 A | 4/1996 | Tank et al. |
| 5,580,666 A | 12/1996 | Dubensky et al. |
| 5,649,279 A | 7/1997 | Gustafson et al. |
| 5,880,382 A | 3/1999 | Fang et al. |
| 5,955,186 A | 9/1999 | Grab |
| 5,992,546 A | 11/1999 | Heinrich et al. |
| 6,024,776 A | 2/2000 | Heinrich et al. |
| 6,217,992 B1 | 4/2001 | Grab |
| 6,248,447 B1 | 6/2001 | Griffin et al. |
| 6,261,329 B1 | 7/2001 | Ogata et al. |
| 6,294,129 B1 | 9/2001 | Waldenstrom |
| 6,432,150 B1 | 8/2002 | Levashov et al. |
| 6,517,902 B2 | 2/2003 | Drake et al. |
| 6,541,115 B2 | 4/2003 | Pender et al. |
| 6,846,341 B2 | 1/2005 | Middlemiss |
| 7,074,247 B2 | 7/2006 | Tank et al. |
| 7,462,003 B2 | 12/2008 | Middlemiss |
| 7,475,948 B2 | 1/2009 | Hall et al. |
| 7,487,849 B2 | 2/2009 | Radtke |
| 7,556,668 B2 | 7/2009 | Eason et al. |
| 7,569,179 B2 | 8/2009 | Fang |
| 7,635,035 B1 | 12/2009 | Bertagnolli et al. |
| 7,678,325 B2 | 3/2010 | Gardinier |
| 7,691,173 B2 | 4/2010 | Eason et al. |
| 7,699,904 B2 | 4/2010 | Fang |
| 7,757,791 B2 | 7/2010 | Belnap et al. |
| 7,829,013 B2 | 11/2010 | Eason et al. |
| 7,879,129 B2 | 2/2011 | Koesters et al. |
| 8,080,071 B1 | 12/2011 | Vail |
| 8,147,574 B2 | 4/2012 | Montross |
| 8,162,082 B1 | 4/2012 | Gonzalez et al. |
| 8,490,721 B2 | 7/2013 | Naidoo et al. |
| 8,496,076 B2 | 7/2013 | Digiovanni et al. |
| 8,512,874 B2 | 8/2013 | Darolia et al. |
| 8,522,900 B2 | 9/2013 | Bellin |
| 8,579,052 B2 | 11/2013 | Digiovanni et al. |
| 8,651,203 B2 | 2/2014 | Digiovanni |
| 8,727,042 B2 | 5/2014 | Digiovanni |
| 8,764,919 B2 | 7/2014 | Nazmy et al. |
| 8,936,116 B2 | 1/2015 | Lyons |
| 9,027,675 B1 | 5/2015 | Jones et al. |
| 9,085,489 B2 | 7/2015 | Naidoo |
| 9,103,172 B1 | 8/2015 | Bertagnolli et al. |
| 9,255,316 B2 | 2/2016 | Bryan |
| 9,272,392 B2 | 3/2016 | Mukhopadhyay et al. |
| 9,487,847 B2 | 11/2016 | Mukhopadhyay et al. |
| 9,540,885 B2 | 1/2017 | Mukhopadhyay et al. |
| 9,610,555 B2 | 4/2017 | Mukhopadhyay et al. |
| 9,649,748 B2 | 5/2017 | Konovalov et al. |
| 9,657,529 B1 | 5/2017 | Bertagnolli et al. |
| 9,718,168 B2 | 8/2017 | Mukhopadhyay et al. |
| 9,719,307 B1 | 8/2017 | Bertagnolli et al. |
| 9,765,572 B2 | 9/2017 | Knuteson et al. |
| 11,292,750 B2 | 4/2022 | Bird |
| 2002/0020564 A1 | 2/2002 | Fang et al. |
| 2002/0112896 A1 | 8/2002 | Kruse et al. |
| 2002/0194955 A1 | 12/2002 | Fang et al. |
| 2003/0113560 A1 | 6/2003 | Yong |
| 2003/0129456 A1 | 7/2003 | Usami et al. |
| 2004/0159471 A1 | 8/2004 | Azar et al. |
| 2004/0187638 A1 | 9/2004 | Heinrich et al. |
| 2005/0050801 A1 | 3/2005 | Cho et al. |
| 2005/0115744 A1 | 6/2005 | Griffin et al. |
| 2005/0133277 A1 | 6/2005 | Dixon |
| 2005/0230156 A1 | 10/2005 | Belnap et al. |
| 2005/0262965 A1 | 12/2005 | Palanisamy et al. |
| 2006/0162969 A1 | 7/2006 | Belnap et al. |
| 2006/0166615 A1 | 7/2006 | Tank et al. |
| 2006/0263233 A1 | 11/2006 | Gardinier |
| 2007/0023206 A1 | 2/2007 | Keshavan et al. |
| 2007/0056778 A1 | 3/2007 | Webb et al. |
| 2007/0099030 A1 | 5/2007 | Dahl |
| 2007/0102200 A1 | 5/2007 | Choe et al. |
| 2007/0186483 A1 | 8/2007 | Tank et al. |
| 2007/0187153 A1 | 8/2007 | Bertagnolli |
| 2007/0187155 A1 | 8/2007 | Middlemiss |
| 2007/0292671 A1 | 12/2007 | Akesson et al. |
| 2007/0292672 A1 | 12/2007 | Ljungberg et al. |
| 2008/0011519 A1 | 1/2008 | Smith et al. |
| 2008/0017421 A1 | 1/2008 | Lockwood |
| 2008/0073126 A1 | 3/2008 | Shen et al. |
| 2008/0073127 A1 | 3/2008 | Zhan et al. |
| 2008/0075543 A1 | 3/2008 | Zhu et al. |
| 2008/0115421 A1 | 5/2008 | Sani |
| 2008/0128176 A1 | 6/2008 | Choe et al. |
| 2008/0142276 A1 | 6/2008 | Griffo et al. |
| 2008/0185078 A1 | 8/2008 | Ishida et al. |
| 2008/0185189 A1 | 8/2008 | Griffo et al. |
| 2008/0202820 A1 | 8/2008 | Eason et al. |
| 2008/0223621 A1 | 9/2008 | Middlemiss et al. |
| 2008/0223623 A1 | 9/2008 | Keshavan et al. |
| 2008/0230280 A1 | 9/2008 | Keshavan et al. |
| 2008/0295658 A1 | 12/2008 | Donnadieu et al. |
| 2008/0302579 A1 | 12/2008 | Keshavan et al. |
| 2009/0017332 A1 | 1/2009 | Kisi et al. |
| 2009/0022952 A1 | 1/2009 | Keshavan |
| 2009/0032169 A1 | 2/2009 | Dourfaye et al. |
| 2009/0071727 A1 | 3/2009 | Keshavan et al. |
| 2009/0090563 A1 | 4/2009 | Voronin et al. |
| 2009/0114454 A1 | 5/2009 | Belnap et al. |
| 2009/0152018 A1 | 6/2009 | Sani |
| 2009/0173015 A1 | 7/2009 | Keshavan et al. |
| 2009/0173547 A1 | 7/2009 | Voronin et al. |
| 2009/0178855 A1 | 7/2009 | Zhang et al. |
| 2009/0183925 A1 | 7/2009 | Zhang et al. |
| 2009/0260895 A1 | 10/2009 | Vail et al. |
| 2009/0324873 A1 | 12/2009 | Weis et al. |
| 2010/0012389 A1 | 1/2010 | Zhang et al. |
| 2010/0038148 A1 | 2/2010 | King |
| 2010/0050536 A1 | 3/2010 | Montross |

(56) References Cited

U.S. PATENT DOCUMENTS

| | | | |
|---|---|---|---|
| 2010/0061883 A1 | 3/2010 | Nazmy et al. | |
| 2010/0084196 A1 | 4/2010 | Bertagnolli et al. | |
| 2010/0084197 A1 | 4/2010 | Voronin et al. | |
| 2010/0104874 A1 | 4/2010 | Yong et al. | |
| 2010/0122852 A1 | 5/2010 | Russell et al. | |
| 2010/0126779 A1 | 5/2010 | Corbett et al. | |
| 2010/0199573 A1 | 8/2010 | Montross et al. | |
| 2010/0275523 A1 | 11/2010 | Tank | |
| 2010/0285335 A1 | 11/2010 | Sithebe et al. | |
| 2010/0287845 A1* | 11/2010 | Montross | C22C 26/00 51/307 |
| 2011/0067929 A1 | 3/2011 | Mukhopadhyay et al. | |
| 2011/0114394 A1 | 5/2011 | Lockwood et al. | |
| 2011/0116963 A1 | 5/2011 | Fang et al. | |
| 2011/0171484 A1 | 7/2011 | Konyashin et al. | |
| 2011/0315051 A1 | 12/2011 | Olsen | |
| 2012/0005966 A1 | 1/2012 | Cleboski et al. | |
| 2012/0012402 A1 | 1/2012 | Thigpen et al. | |
| 2012/0031675 A1 | 2/2012 | Truemner | |
| 2012/0034464 A1 | 2/2012 | Chakraborty et al. | |
| 2012/0040183 A1 | 2/2012 | Kelkar | |
| 2012/0055716 A1 | 3/2012 | Martensson et al. | |
| 2012/0151848 A1 | 6/2012 | Suryavanshi | |
| 2012/0212249 A1 | 8/2012 | Chen et al. | |
| 2012/0324801 A1 | 12/2012 | Fang | |
| 2012/0325565 A1 | 12/2012 | Fang | |
| 2013/0092449 A1 | 4/2013 | Fang et al. | |
| 2013/0092451 A1 | 4/2013 | Mukhopadhyay et al. | |
| 2013/0092452 A1 | 4/2013 | Mukhopadhyay et al. | |
| 2013/0133957 A1 | 5/2013 | Belnap et al. | |
| 2013/0206287 A1 | 8/2013 | Sato et al. | |
| 2014/0007995 A1 | 1/2014 | Ishida et al. | |
| 2014/0023546 A1 | 1/2014 | Konyashin et al. | |
| 2014/0086782 A1 | 3/2014 | Gries | |
| 2014/0134403 A1 | 5/2014 | Gledhill | |
| 2014/0154509 A1 | 6/2014 | Zhang et al. | |
| 2014/0174633 A1 | 6/2014 | Andersin et al. | |
| 2014/0231151 A1 | 8/2014 | Matthias et al. | |
| 2014/0311810 A1 | 10/2014 | Konyashin et al. | |
| 2014/0353047 A1 | 12/2014 | Naidoo | |
| 2015/0136495 A1 | 5/2015 | Knuteson et al. | |
| 2015/0284827 A1 | 10/2015 | Can et al. | |
| 2015/0292270 A1 | 10/2015 | Zhang et al. | |
| 2015/0376744 A1 | 12/2015 | Konyashin et al. | |
| 2016/0052108 A1 | 2/2016 | Miess | |
| 2016/0053549 A1 | 2/2016 | Digiovanni et al. | |
| 2016/0063549 A1 | 2/2016 | Fuchs | |
| 2016/0265285 A1 | 9/2016 | Stockey et al. | |
| 2017/0254153 A1 | 9/2017 | Bird et al. | |
| 2017/0266784 A1 | 9/2017 | Zhang et al. | |
| 2017/0267588 A1 | 9/2017 | Shin et al. | |
| 2017/0297960 A1 | 10/2017 | Zhang et al. | |
| 2018/0238116 A1 | 8/2018 | Mukhopadhyay et al. | |
| 2018/0327888 A1 | 11/2018 | Cao et al. | |
| 2018/0328117 A1 | 11/2018 | Bird | |
| 2019/0076920 A1 | 3/2019 | Ishii et al. | |
| 2019/0368278 A1 | 12/2019 | Cao et al. | |

FOREIGN PATENT DOCUMENTS

| | | | |
|---|---|---|---|
| CN | 101755066 A | 6/2010 | |
| CN | 102187048 A | 9/2011 | |
| CN | 102281974 A | 12/2011 | |
| CN | 103722174 A | 4/2014 | |
| CN | 104057094 A | 9/2014 | |
| CN | 106011653 A | 10/2016 | |
| DE | 102006018947 A1 | 10/2007 | |
| EP | 0278703 A2 | 8/1988 | |
| EP | 0476352 A1 | 3/1992 | |
| EP | 0974566 A1 | 1/2000 | |
| EP | 3369831 A1 | 9/2018 | |
| GB | 2489583 A | 10/2012 | |
| JP | 01-116048 A | 5/1989 | |
| JP | 03-054166 A | 3/1991 | |
| JP | 2014-208889 A | 11/2014 | |
| WO | 2004/054943 A1 | 7/2004 | |
| WO | 2006/001791 A1 | 1/2006 | |
| WO | 2006/032984 A2 | 3/2006 | |
| WO | 2007/035394 A2 | 3/2007 | |
| WO | 2007/110770 A2 | 10/2007 | |
| WO | 2008/086284 A2 | 7/2008 | |
| WO | 2009/027948 A1 | 3/2009 | |
| WO | 2009/027949 A1 | 3/2009 | |
| WO | WO-2009027948 A1 * | 3/2009 | C22C 26/00 |
| WO | 2009/147629 A1 | 12/2009 | |
| WO | 2010/029518 A1 | 3/2010 | |
| WO | 2013/087728 A2 | 6/2013 | |
| WO | 2013/087773 A1 | 6/2013 | |
| WO | 2013/092370 A1 | 6/2013 | |
| WO | 2013/178550 A1 | 12/2013 | |
| WO | 2013/178552 A1 | 12/2013 | |
| WO | 2016/049452 A1 | 3/2016 | |
| WO | 2017/009417 A1 | 1/2017 | |

OTHER PUBLICATIONS

Akaishi et al., Material Science and Engineering A (1988), vol. 05/106, 1 and 2 (Abstract only).

Andreeve et al., Features of the Influence of Nanomodivication and Macrostructureization on the Properties of the Fe—Mo Binder for a Didamond Tool, Russian Journal of Non Ferrous Metals, vol. 55, No. 6, (Nov. 2014), pp. 82-86.

Canadian Office Action for Canadian Application No. 3,063,097, dated Mar. 31, 2021, 4 pages, with English translation.

Canadian Requisition by the Examiner for Canadian Application No. 3,016,597, dated Jun. 19, 2019, 4 pages.

Chinese First Office Action for Chinese Application No. 201780024446, dated Oct. 31, 2019, 17 pages with English Translation.

Chinese Office Action, from Chinese Application No. 201880044364. 6, dated May 24, 2021, 15 pages.

Chinese Second Office Action for Chinese Application No. 201780024446.X, dated Oct. 10, 2020, 20 pages, with English Translation.

Correa et al., Microstructure and Mecanical Properties of WC Ni—Si Based Cemented Carbides Developed by Powder Metallurgy, International Journal of Refractory Metals and Hard Materials, vol. 28, Issue 5, (Sep. 2010), pp. 572-575.

European Communication pursuant to Article 94(3) EPC for European Application No. 17760799, dated Jul. 2, 2020, 8 pages.

European Search Report and Search Opinion Received for EP Application No. 18799295, dated Jan. 21, 2021, 7 pages.

Freund et al., Formation of Cuboidal Co3AlC Precipitates in Carbon-Containing Co—Al—W-Based Superalloys, Advanced Engineering Materials 2015, 17, No. 8, pp. 1113-1118.

German, R.M., "The Contiguity of Liquid Phase Sintered Microstructures," Metallurgical Transactions A, vol. 16A, Jul. 1985, pp. 1247-1252.

Kimura et al., Phase Equilibria in the T—Al—C (T: Co, Ni, Rh, Ir) and T—Al—B (T: Rh, Ir) Systems for the Design of E21—Co3AlC Based Heat Resistant Alloys, Intermetallics, vol. 14, Issue 5, May 2006, pp. 508-514. (Abstract only).

Kimura et al., Phase Stability and Relations of Multi-phase Alloys Based on B2 CoAl and E21 Co2AlC, Intermetallics, vol. 3, Issue 5, 1995, pp. 413-425. (Abstract only).

Kruth et al., Lasers and Materials in Selective Laser Sintering, Assembly Automation, vol. 23, Issue 4, (2003), pp. 357-371.

Levashov et al., Improved Mechanical and Tribological Properties of Metal-Matrix Composites Dispersion-Strengthened by Nanoparticles, Materials, vol. 3, (2010), pp. 97-109.

Ohtani et al., Thermodynamic analysis of the Co—Al—C and Ni—Al—C systems by incorporating ab initio energetic calculations into the Calphad approach, Computer Coupling of Phase Diagrams and Thermochemistry 28 (2004) pp. 177-190.

Russian Office Action for Russian Application No. 2018133336, dated May 13, 2020, 3 pages.

Sidorenko et al., Interaction of Diamond Grains with Nanosized Alloying Agents in Metal-Matrix Composites a Studied by Raman Spectroscopy, Diamond & Related Materials, vol. 38,, (Sep. 2013), pp. 59-62.

(56) References Cited

OTHER PUBLICATIONS

Underwood, Ervin E., "Quantitative Stereology", Addison-Wesley Publishing Company, Inc. Philippines copyright, (1970) 20 pages.

Zaitzev et al., Diamond Tools in Metal Bonds Dispersion Strengthened with Nanosized Particles for Cutting Highly Reinforced Concrete, Journal of Superhard Materials, vol. 32, No. 6, (Dec. 2010), pp. 423-431.

Gupta, K.P.; "The Co—Cr—W (cobalt-Chromium-Tungsten) System", Journal of Phase Equilibria and Diffusion, vol. 24, No. 2, Apr. 1, 2006 pp. 178-183.

Metals Handbook, 8th Ed, vol. 2, American Society for Metals, 1964, pp. 93-114.

\* cited by examiner

METHODS OF FORMING CUTTING ELEMENTS

CROSS-REFERENCE TO RELATED APPLICATION

This application is a divisional of U.S. patent application Ser. No. 15/993,362, filed May 30, 2018, now U.S. Pat. No. 11,536,091, issued Dec. 27, 2022, the disclosure of which is hereby incorporated herein in its entirety by this reference.

TECHNICAL FIELD

Embodiments of the disclosure relate to cutting elements, and to related earth-boring tools, structures, supporting substrates, and methods of forming the cutting elements, structures, and supporting substrates.

BACKGROUND

Earth-boring tools for forming wellbores in subterranean earth formations may include a plurality of cutting elements secured to a body. For example, fixed-cutter earth-boring rotary drill bits ("drag bits") include a plurality of cutting elements that are fixedly attached to a bit body of the drill bit. Similarly, roller cone earth-boring rotary drill bits may include cones that are mounted on bearing pins extending from legs of a bit body such that each cone is capable of rotating about the bearing pin on which it is mounted. A plurality of cutting elements may be mounted to each cone of the drill bit. Other earth-boring tools utilizing cutting elements include, for example, core bits, bi-center bits, eccentric bits, hybrid bits (e.g., rolling components in combination with fixed cutting elements), reamers, and casing milling tools.

The cutting elements used in such earth-boring tools often include a volume of polycrystalline diamond ("PCD") material on a substrate. Surfaces of the polycrystalline diamond act as cutting faces of the so-called polycrystalline diamond compact ("PDC") cutting elements. PCD material is material that includes inter-bonded particles (e.g., grains, crystals) of diamond material. In other words, PCD material includes direct, inter-granular bonds between the particles of diamond material.

PDC cutting elements are generally formed by sintering and bonding together relatively small diamond (synthetic, natural or a combination) particles, termed "grit," under conditions of high temperature and high pressure in the presence of a catalyst (e.g., cobalt, iron, nickel, or alloys and mixtures thereof) to form one or more layers (e.g., a "compact" or "table") of PCD material. These processes are often referred to as high temperature/high pressure (or "HTHP") processes. The supporting substrate may comprise a cermet material (i.e., a ceramic-metal composite material) such as, for example, cobalt-cemented tungsten carbide. In some instances, the PCD material may be formed on the cutting element, for example, during the HTHP process. In such instances, catalyst material (e.g., cobalt) in the supporting substrate may be "swept" into the diamonds during sintering and serve as a catalyst material for forming the diamond table from the diamond particles. Powdered catalyst material may also be mixed with the diamond particles prior to sintering the particles together in an HTHP process. In other methods, the diamond table may be formed separately from the supporting substrate and subsequently attached thereto.

Upon formation of the diamond table using an HTHP process, catalyst material may remain in interstitial spaces between the inter-bonded particles of the PDC. The presence of the catalyst material in the PDC may contribute to thermal damage in the PDC when the PDC cutting element is heated during use due to friction at the contact point between the cutting element and the formation. Accordingly, the catalyst material (e.g., cobalt) may be leached out of the interstitial spaces using, for example, an acid or combination of acids (e.g., aqua regia). Substantially all of the catalyst material may be removed from the PDC, or catalyst material may be removed from only a portion thereof, for example, from a cutting face of the PDC, from a side of the PDC, or both, to a desired depth. However, a fully leached PDC is relatively more brittle and vulnerable to shear, compressive, and tensile stresses than is a non-leached PDC. In addition, it is difficult to secure a completely leached PDC to a supporting substrate.

BRIEF SUMMARY

Embodiments described herein include cutting elements, and related earth-boring tools, structures, supporting substrates, and methods of forming the cutting elements, structures, and supporting substrates. For example, in accordance with one embodiment described herein, a cutting element comprises a cutting table comprising inter-bonded diamond particles, and a thermally stable material within interstitial spaces between the inter-bonded diamond particles. The thermally stable material comprises a carbide precipitate having the general chemical formula, $A_3XZ_{n-1}$, where A comprises one or more of Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, La, Ce, Pr, Nd, Pm, Sm, Eu, Gd, Tb, Dy, Ho, Er, Tm, Yb, Lu, Ac, Th, Pa, and U; X comprises one or more of Al, Ga, Sn, Be, Bi, Te, Sb, Se, As, Ge, Si, B, and P; Z comprises C; and n is greater than or equal to 0 and less than or equal to 0.75.

In additional embodiments, a method of forming a cutting element comprises providing a diamond-containing material comprising discrete diamond particles over a substrate. The diamond-containing material is sintered in the presence of a liquid phase of a homogenized alloy comprising at least one first element selected from Sc, Ti, V, Cr, Mn, Fe, Co, Ni, Cu, Zn, Y, Zr, Nb, Mo, Tc, Ru, Rh, Pd, Ag, Cd, Hf, Ta, Re, Os, Ir, Pt, Au, Hg, La, Ce, Pr, Nd, Pm, Sm, Eu, Gd, Tb, Dy, Ho, Er, Tm, Yb, Lu, Ac, Th, Pa, and U, and at least one second element selected from Al, Ga, Sn, Be, Bi, Te, Sb, Se, As, Ge, Si, B, and P to inter-bond the discrete diamond particles. Portions of the homogenized alloy within interstitial spaces between the inter-bonded diamond particles are converted into a thermally stable material comprising one or more carbide precipitates having the general chemical formula: $A_3XZ_{1-n}$, where A comprises the at least one first element; X comprises the at least one second element; Z comprises C; and n is greater than or equal to 0 and less than or equal to 0.75.

In further embodiments, a supporting substrate for a cutting element comprises a homogenized binder and WC particles dispersed in the homogenized binder. The homogenized binder comprises C, W, at least one element selected from Sc, Ti, V, Cr, Mn, Fe, Ni, Cu, Zn, Y, Zr, Nb, Mo, Tc, Ru, Rh, Pd, Ag, Cd, Hf, Ta, Re, Os, Ir, Pt, Au, Hg, La, Ce, Pr, Nd, Pm, Sm, Eu, Gd, Tb, Dy, Ho, Er, Tm, Yb, Lu, Ac, Th, Pa, and U, and at least one additional element selected from Al, Ga, Sn, Be, Bi, Te, Sb, Se, As, Ge, Si, B, and P.

DETAILED DESCRIPTION

Figure 1:
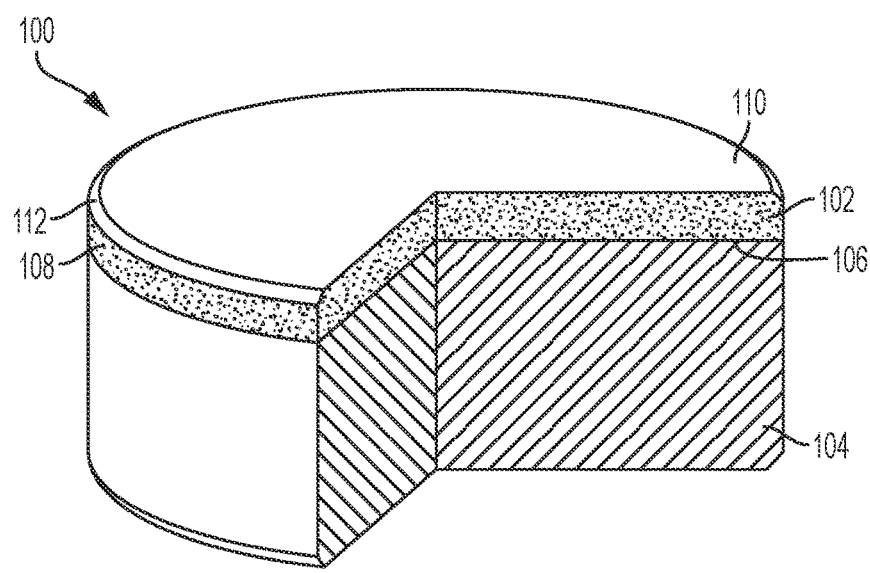
FIG. 1 is a partial cut-away perspective view of a cutting element, in accordance with embodiments of the disclosure.

The following description provides specific details, such as specific shapes, specific sizes, specific material compositions, and specific processing conditions, in order to provide a thorough description of embodiments of the present disclosure. However, a person of ordinary skill in the art would understand that the embodiments of the disclosure may be practiced without necessarily employing these specific details. Embodiments of the disclosure may be practiced in conjunction with conventional fabrication techniques employed in the industry. In addition, the description provided below does not form a complete process flow for manufacturing a cutting element or earth-boring tool. Only those process acts and structures necessary to understand the embodiments of the disclosure are described in detail below. Additional acts to form a complete cutting element or a complete earth-boring tool from the structures described herein may be performed by conventional fabrication processes.

Drawings presented herein are for illustrative purposes only, and are not meant to be actual views of any particular material, component, structure, device, or system. Variations from the shapes depicted in the drawings as a result, for example, of manufacturing techniques and/or tolerances, are to be expected. Thus, embodiments described herein are not to be construed as being limited to the particular shapes or regions as illustrated, but include deviations in shapes that result, for example, from manufacturing. For example, a region illustrated or described as box-shaped may have rough and/or nonlinear features, and a region illustrated or described as round may include some rough and/or linear features. Moreover, sharp angles that are illustrated may be rounded, and vice versa. Thus, the regions illustrated in the figures are schematic in nature, and their shapes are not intended to illustrate the precise shape of a region and do not limit the scope of the present claims. The drawings are not necessarily to scale. Additionally, elements common between figures may retain the same numerical designation.

As used herein, the terms "comprising," "including," "having," and grammatical equivalents thereof are inclusive or open-ended terms that do not exclude additional, unrecited elements or method steps, but also include the more restrictive terms "consisting of" and "consisting essentially of" and grammatical equivalents thereof. As used herein, the term "may" with respect to a material, structure, feature, or method act indicates that such is contemplated for use in implementation of an embodiment of the disclosure and such term is used in preference to the more restrictive term "is" so as to avoid any implication that other, compatible materials, structures, features, and methods usable in combination therewith should or must be excluded.

As used herein, the terms "longitudinal," "vertical," "lateral," and "horizontal" and are in reference to a major plane of a substrate (e.g., base material, base structure, base construction, etc.) in or on which one or more structures and/or features are formed and are not necessarily defined by earth's gravitational field. A "lateral" or "horizontal" direction is a direction that is substantially parallel to the major plane of the substrate, while a "longitudinal" or "vertical" direction is a direction that is substantially perpendicular to the major plane of the substrate. The major plane of the substrate is defined by a surface of the substrate having a relatively large area compared to other surfaces of the substrate.

As used herein, spatially relative terms, such as "below," "lower," "bottom," "above," "over," "upper," "top," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if materials in the figures are inverted, elements described as "over" or "above" or "on" or "on top of" other elements or features would then be oriented "below" or "beneath" or "under" or "on bottom of" the other elements or features. Thus, the term "over" can encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

As used herein, the singular forms "a," "an," and "the" are intended to include the plural forms as well, unless the context clearly indicates otherwise.

As used herein, the term "and/or" includes any and all combinations of one or more of the associated listed items.

As used herein, the term "configured" refers to a size, shape, material composition, material distribution, orientation, and arrangement of one or more of at least one structure and at least one apparatus facilitating operation of one or more of the structure and the apparatus in a predetermined way.

As used herein, the term "substantially" in reference to a given parameter, property, or condition means and includes to a degree that one of ordinary skill in the art would understand that the given parameter, property, or condition is met with a degree of variance, such as within acceptable tolerances. By way of example, depending on the particular parameter, property, or condition that is substantially met, the parameter, property, or condition may be at least 90.0 percent met, at least 95.0 percent met, at least 99.0 percent met, at least 99.9 percent met, or even 100.0 percent met.

As used herein, "about" or "approximately" in reference to a numerical value for a particular parameter is inclusive of the numerical value and a degree of variance from the numerical value that one of ordinary skill in the art would understand is within acceptable tolerances for the particular parameter. For example, "about" or "approximately" in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, the terms "earth-boring tool" and "earth-boring drill bit" mean and include any type of bit or tool used for drilling during the formation or enlargement of a wellbore in a subterranean formation and include, for example, fixed-cutter bits, roller cone bits, percussion bits, core bits, eccentric bits, bi-center bits, reamers, mills, drag bits, hybrid bits (e.g., rolling components in combination with fixed cutting elements), and other drilling bits and tools known in the art.

As used herein, the term "polycrystalline compact" means and includes any structure comprising a polycrystalline material formed by a process that involves application of pressure (e.g., compaction) to the precursor composition or materials used to form the polycrystalline material. In turn, as used herein, the term "polycrystalline material" means and includes any material comprising a plurality of particles (e.g., grains, crystals) of the material that are bonded directly together by inter-granular bonds. The crystal structures of the individual particles of the material may be randomly oriented in space within the polycrystalline material.

As used herein, the term "inter-granular bond" means and includes any direct atomic bond (e.g., covalent, metallic, etc.) between atoms in adjacent particles of hard material.

As used herein, the term "hard material" means and includes any material having a Knoop hardness value of greater than or equal to about 3,000 Kg/mm² (29, 420 MPa). Non-limiting examples of hard materials include diamond (e.g., natural diamond, synthetic diamond, or combinations thereof), and cubic boron nitride.

FIG. 1 illustrates a cutting element 100 in accordance with embodiments of the disclosure. The cutting element 100 includes a supporting substrate 104, and a cutting table 102 bonded to the supporting substrate 104 at an interface 106. The cutting table 102 may be disposed directly on the supporting substrate 104, and may exhibit at least one lateral side surface 108 (also referred to as the "barrel" of the cutting table 102), a cutting face 110 (also referred to as the "top" of the cutting table 102) opposite the interface 106 between the supporting substrate 104 and the cutting table 102, and at least one cutting edge 112 at a periphery (e.g., outermost boundary) of the cutting face 110.

The cutting table 102 and the supporting substrate 104 may each individually exhibit a generally cylindrical column shape, and the interface 106 between the supporting substrate 104 and cutting table 102 may be substantially planar. A ratio of a height of the cutting element 100 to an outer diameter of the cutting element 100 may be within a range of from about 0.1 to about 50, and a height (e.g., thickness) of the cutting table 102 may be within a range of from about 0.3 millimeters (mm) to about 5 mm. Surfaces (e.g., the lateral side surface 108, the cutting face 110) of the cutting table 102 adjacent the cutting edge 112 may each be substantially planar, or one or more of the surfaces of the cutting table 102 adjacent the cutting edge 112 may be at least partially non-planar. Each of the surfaces of the cutting table 102 may be polished, or one or more of the surfaces of the cutting table 102 may be at least partially non-polished (e.g., lapped, but not polished). In addition, the cutting edge 112 of the cutting table 102 may be at least partially (e.g., substantially) chamfered (e.g., beveled), may be at least partially (e.g., substantially) radiused (e.g., arcuate), may be partially chamfered and partially radiused, or may be non-chamfered and non-radiused. As shown in FIG. 1, in some embodiments, the cutting edge 112 is chamfered. If the cutting edge 112 is at least partially chamfered, the cutting edge 112 may include a single (e.g., only one) chamfer, or may include multiple (e.g., more than one) chamfers (e.g., greater than or equal to two (2) chamfers, such as from two (2) chamfers to 1000 chamfers). If present, each of the chamfers may individually exhibit a width less than or equal to about 0.1 inch, such as within a range of from about 0.001 inch to about 0.1 inch.

Figure 2:
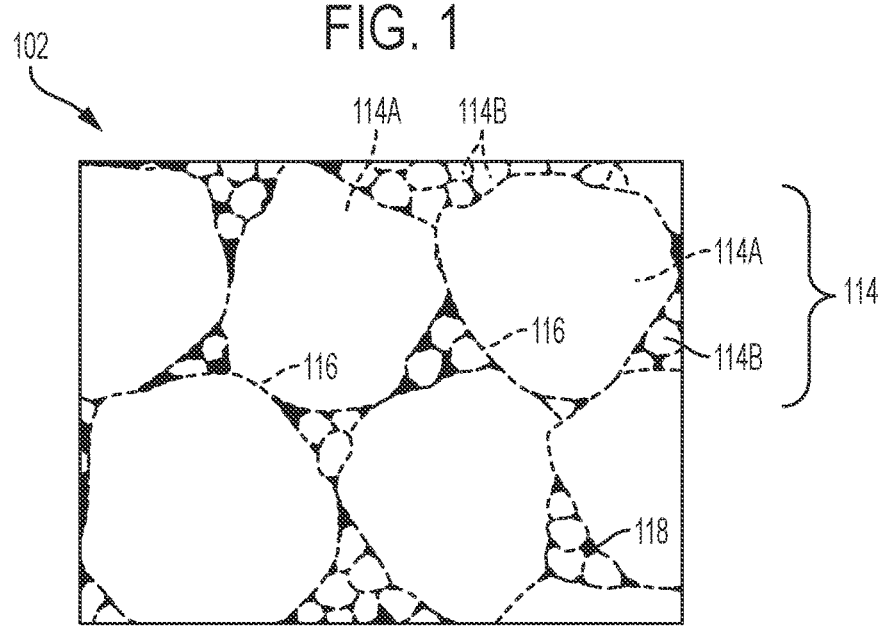
FIG. 2 is a simplified cross-sectional view illustrating how a microstructure of a cutting table of the cutting element of FIG. 1 may appear under magnification.

FIG. 2 is an enlarged view illustrating how a microstructure of the cutting table 102 shown in FIG. 1 may appear under magnification. The cutting table 102 includes interspersed and inter-bonded diamond particles 114 (e.g., inter-bonded diamond particles) that form a three-dimensional (3D) network of polycrystalline diamond (PCD) material. The inter-bonded diamond particles 114 may have a multi-modal particle size distribution. For example, as depicted in FIG. 2, the cutting table 102 may include larger diamond particles 114A (e.g., larger diamond particles) and smaller diamond particles 114B (e.g., smaller diamond particles). In additional embodiments, the inter-bonded diamond particles 114 may have a mono-modal particle size distribution (e.g., the smaller diamond particles 114B may be omitted, or the larger diamond particles 114A may be omitted). Direct inter-granular bonds between the larger diamond particles 114A and the smaller diamond particles 114B are represented in FIG. 2 by dashed lines 116. The larger diamond particles 114A may be monodisperse, wherein all the larger diamond particles 114A exhibit substantially the same size, or may be polydisperse, wherein the larger diamond particles 114A exhibit a range of sizes and are averaged. In addition, the smaller diamond particles 114B may be monodisperse, wherein all the smaller diamond particles 114B exhibit substantially the same size, or may be polydisperse, wherein the smaller diamond particles 114B exhibit a range of sizes and are averaged.

As shown in FIG. 2, interstitial spaces are present between the inter-bonded diamond particles 114 of the cutting table 102. The interstitial spaces are at least partially (e.g., substantially) filled with a thermally stable material 118 including at least one carbide precipitate (e.g., $E2_1$-type phase carbide precipitate, tetragonal P4/mm phase carbide precipitate) that is both thermally stable and mechanically stable. A standard enthalpy of formation of the carbide precipitate of the thermally stable material 118 is less than zero (indicating that the carbide precipitate is thermally stable), and an eigenvalue from a Young's modulus calculation for the carbide precipitate of the thermally stable material 118 is positive (indicating that the carbide precipitate is mechanically stable). The thermally stable material 118 may render the cutting table 102 thermally stable without needing to leach the cutting table 102. For example, the thermally stable material 118 may not significantly promote carbon transformations (e.g., graphite-to-diamond or vice versa) as compared to conventional cutting tables including inter-bonded diamond particles substantially exposed to conventional catalyst materials (e.g., catalytic cobalt, catalytic iron, catalytic nickel) within interstitial spaces between the inter-bonded diamond particles. Accordingly, the thermally stable material 118 may render the cutting table 102 more thermally stable than conventional cutting tables.

The carbide precipitate of the thermally stable material 118 may be a perovskite compound having the general chemical formula shown below:

$$A_3XZ_{n-1} \quad (1)$$

wherein A comprises one or more of scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), lanthanum (La), cerium (Ce), praseodymium (Pr), neodymium (Nd), promethium (Pm), samarium (Sm), europium (Eu), galodinium (Gd), terbium (Tb), dysprosium (Dy), holmium (Ho), erbium (Er), thulium (Tm), ytterbium (Yb), lutetium (Lu), actinium (Ac), thorium (Th), protoactinium (Pa), and uranium (U); X comprises one or more of aluminum (Al), gallium (Ga), tin (Sn), beryllium (Be), bismuth (Bi), tellurium (Te), antimony (Sb), selenium (Se), arsenic (As), germanium (Ge), silicon (Si), boron (B), and phosphorus (P); Z is carbon (C); and n is greater than or equal to 0 and less than or equal to 0.75 (i.e., $0 \le n \le 0.75$).

Figure 21:
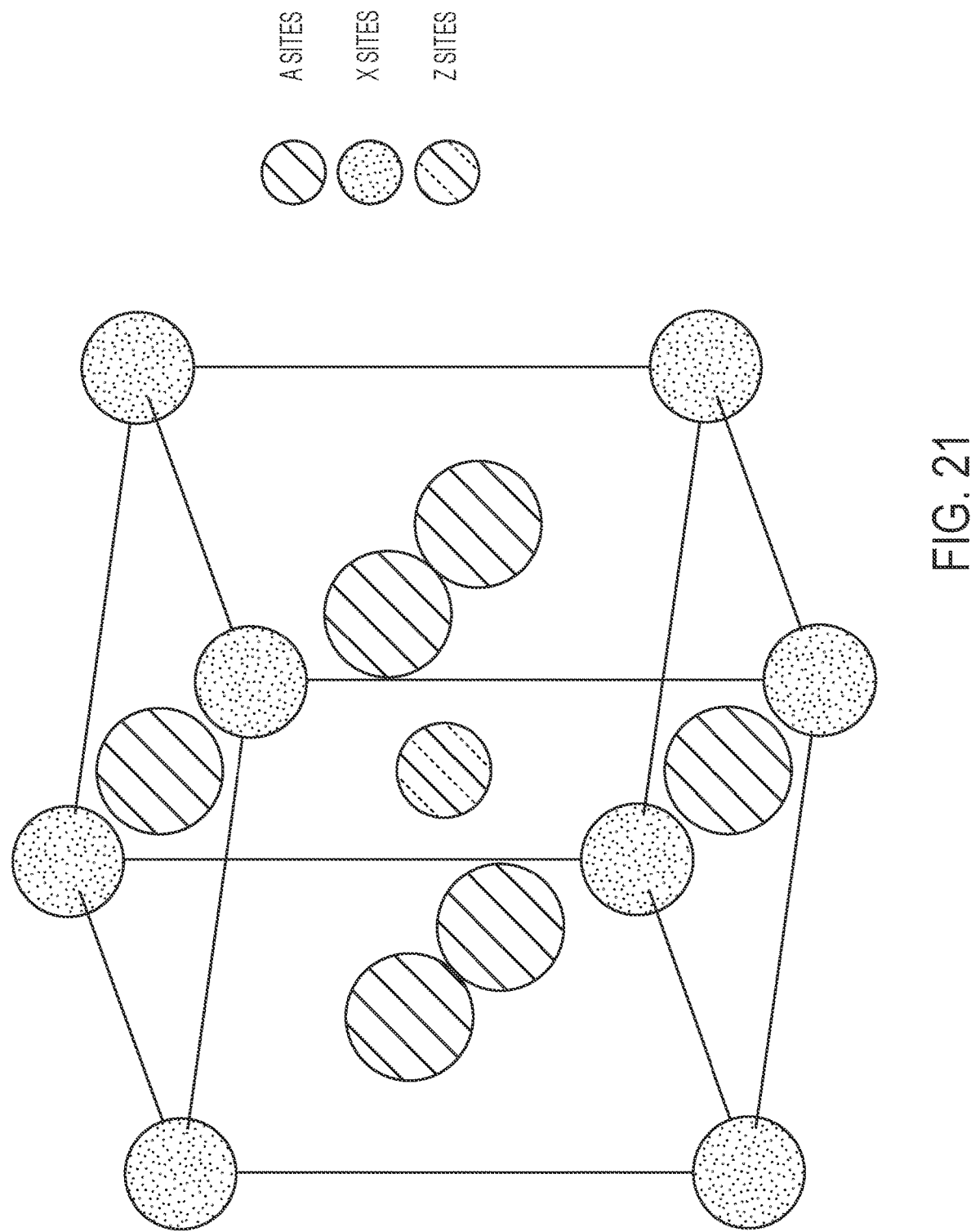
FIG. 21 is a simplified perspective view of the lattice structure of a κ-carbide precipitate of the cutting table of the cutting element of FIG. 1.

In some embodiments, the carbide precipitate of the thermally stable material 118 comprises an $E2_1$-type phase carbide (κ-carbide) having formula (1) above. FIG. 21 shows a simplified perspective view of the lattice structure of a κ-carbide precipitate having formula (1) above. As shown in FIG. 21, sites of "A" elements ("A sites") are at face centered (1/2, 1/2, 0) positions in the lattice structure of the κ-carbide precipitate; sites of "X" elements ("X sites") are at cube corner (0, 0, 0) positions in the lattice structure of the κ-carbide precipitate, and sites of "Z" elements or vacancies (i.e., vacancies corresponding to embodiments where $0<n\le 0.75$ in formula (1) above) ("Z sites") are located at body centered (1/2, 1/2, 0) positions in the lattice structure of the κ-carbide precipitate.

In additional embodiments, the carbide precipitate of thermally stable material 118 comprises a non-κ-carbide precipitate having formula (1) above. By way of non-limiting example, the carbide precipitate of the thermally stable material 118 may comprise a tetragonal P4/mm phase carbide precipitate having formula (1) above, such as $Co_3GeC_{0.25}$. It was unexpectedly discovered that $Co_3GeC_{0.25}$, a tetragonal P4/mm phase carbide precipitate, exhibits enhanced stability properties (e.g., thermal stability properties, mechanical stability properties) relative to $Co_3GeC$, a κ-carbide precipitate. The thermally stable material 118 may include one or more non-κ-carbide precipitates in addition to or in place of one or more κ-carbide precipitates.

The carbide precipitate (e.g., κ-carbide precipitate, non-κ-carbide precipitate) of the thermally stable material 118 includes at least three different elements. For example, the carbide precipitate may be a ternary (e.g., triple element) carbide precipitate (e.g., a ternary κ-carbide precipitate, a ternary non-κ-carbide precipitate) including a single (e.g., only one) first element (e.g., Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, La, Ce, Pr, Nd, Pm, Sm, Eu, Gd, Tb, Dy, Ho, Er, Tm, Yb, Lu, Ac, Th, Pa, or U) occupying all A sites in the lattice structure of the carbide precipitate; a single second element (e.g., Al, Ga, Sn, Be, Bi, Te, Sb, Se, As, Ge, Si, B, or P) occupying all X sites in the lattice structure of the carbide precipitate; and a single third element (e.g., C) occupying at least some (e.g., all, less than all) Z sites in the lattice structure of the carbide precipitate. In additional embodiments, the carbide precipitate of the thermally stable material 118 includes more than three different elements (e.g., at least four different elements). By way of non-limiting example, the carbide precipitate of the thermally stable material 118 may comprise a quaternary (e.g., quadruple element) carbide precipitate (e.g., a quaternary κ-carbide precipitate, a quaternary non-κ-carbide precipitate). The quaternary carbide precipitate may, for example, include a single (e.g., only one) first element (e.g., one of Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, La, Ce, Pr, Nd, Pm, Sm, Eu, Gd, Tb, Dy, Ho, Er, Tm, Yb, Lu, Ac, Th, Pa, and U) occupying A sites in the lattice structure of the carbide precipitate, two different second elements (e.g., two of Al, Ga, Sn, Be, Bi, Te, Sb, Se, As, Ge, Si, B, and P) occupying X sites in the lattice structure of the carbide precipitate, and a single third element (e.g., C) occupying at least some (e.g., all, less than all) Z sites in the lattice structure of the carbide precipitate; or may include two different first elements (e.g., two of Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, La, Ce, Pr, Nd, Pm, Sm, Eu, Gd, Tb, Dy, Ho, Er, Tm, Yb, Lu, Ac, Th, Pa, and U) occupying A sites in the lattice structure of the carbide precipitate, a single (e.g., only one) second element (e.g., one of Al, Ga, Sn, Be, Bi, Te, Sb, Se, As, Ge, Si, B, and P) occupying X sites in the lattice structure of the carbide precipitate, and a single element (e.g., C) occupying at least some (e.g., all, less than all) Z sites in the lattice structure of the carbide precipitate. C may render carbide precipitates of the thermally stable material 118 stable at ambient pressure and temperature conditions.

By way of non-limiting example, the thermally stable material 118 may include one or more ternary carbide precipitates (e.g., ternary κ-carbide precipitates, ternary non-κ-carbide precipitates) selected from $Sm_3SnC_{1-n}$, $Sm_3BiC_{1-n}$, $Sm_3TeC_{1-n}$, $Sm_3PC_{1-n}$, $Sm_3SiC_{1-n}$, $Sm_3GaC_{1-n}$, $Sc_3SnC_{1-n}$, $Sc_3GeC_{1-n}$, $Sc_3SbC_{1-n}$, $Sc_3AsC_{1-n}$, $Sm_3BeC_{1-n}$, $Sc_3PC_{1-n}$, $Sc_3SiC_{1-n}$, $Y_3SnC_{1-n}$, $Sc_3BiC_{1-n}$, $Tm_3SnC_{1-n}$, $Er_3SnC_{1-n}$, $Sc_3TeC_{1-n}$, $Y_3SbC_{1-n}$, $Sc_3SeC_{1-n}$, $Ho_3SnC_{1-n}$, $Sc_3GaC_{1-n}$, $Dy_3SnC_{1-n}$, $Y_3BiC_{1-n}$, $Tb_3SnC_{1-n}$, $Tm_3SbC_{1-n}$, $Er_3SbC_{1-n}$, $Lu_3SbC_{1-n}$, $Lu_3GeC_{1-n}$, $Ti_3GaC_{1-n}$, $Ti_3GeC_{1-n}$, $Gd_3SnC_{1-n}$, $Tb_3SbC_{1-n}$, $Y_3GeC_{1-n}$, $Er_3BiC_{1-n}$, $Ho_3BiC_{1-n}$, $Tm_3BiC_{1-n}$, $Lu_3AsC_{1-n}$, $Tm_3GeC_{1-n}$, $Dy_3BiC_{1-n}$, $Lu_3BiC_{1-n}$, $Tm_3AsC_{1-n}$, $Tb_3BiC_{1-n}$, $Ti_3SnC_{1-n}$, $Er_3AsC_{1-n}$, $Ti_3SiC_{1-n}$, $Y_3TeC_{1-n}$, $Gd_3BiC_{1-n}$, $Ce_3TeC_{1-n}$, $Ti_3AlC_{1-n}$, $Zr_3SnC_{1-n}$, $Dy_3AsC_{1-n}$, $La_3BiC_{1-n}$, $Sc_3AlC_{1-n}$, $Yb_3SeC_{1-n}$, $Tb_3AsC_{1-n}$, $Lu_3PC_{1-n}$, $Yb_3TeC_{1-n}$, $Lu_3SnC_{1-n}$, $Eu_3SeC_{1-n}$, $Er_3TeC_{1-n}$, $Ti_3SbC_{1-n}$, $Lu_3SiC_{1-n}$, $Tm_3TeC_{1-n}$, $Tm_3PC_{1-n}$, $Gd_3TeC_{1-n}$, $Gd_3AsC_{1-n}$, $Zr_3SbC_{1-n}$, $Lu_3GaC_{1-n}$, $Er_3PC_{1-n}$, $Sm_3BC_{1-n}$, $Lu_3TeC_{1-n}$, $Ho_3PC_{1-n}$, $Tm_3SiC_{1-n}$, $Er_3SiC_{1-n}$, $Dy_3PC_{1-n}$, $Tm_3GaC_{1-n}$, $Ce_3AsC_{1-n}$, $Y_3GaC_{1-n}$, $Ho_3SiC_{1-n}$, $Tb_3PC_{1-n}$, $Er_3GaC_{1-n}$, $Dy_3SiC_{1-n}$, $Eu_3BiC_{1-n}$, $Hf_3GaC_{1-n}$, $Ho_3GaC_{1-n}$, $Gd_3PC_{1-n}$, $Gd_3SeC_{1-n}$, $Lu_3AlC_{1-n}$, $Ce_3SnC_{1-n}$, $Tb_3SiC_{1-n}$, $Hf_3SnC_{1-n}$, $Dy_3GaC_{1-n}$, $Tm_3AlC_{1-n}$, $Gd_3SiC_{1-n}$, $Ti_3BiC_{1-n}$, $Tb_3GaC_{1-n}$, $Er_3AlC_{1-n}$, $Yb_3BiC_{1-n}$, $Yb_3SbC_{1-n}$, $La_3PC_{1-n}$, $Eu_3AsC_{1-n}$, $Fe_3AlC_{1-n}$, $Ho_3AlC_{1-n}$, $Gd_3GaC_{1-n}$, $Yb_3AsC_{1-n}$, $Th_3BiC_{1-n}$, $Ac_3SbC_{1-n}$, $Th_3SnC_{1-n}$, $Tb_3AlC_{1-n}$, $Eu_3PC_{1-n}$, $Fe_3SiC_{1-n}$, $Ti_3BeC_{1-n}$, $Yb_3PC_{1-n}$, $Gd_3AlC_{1-n}$, $Hf_3PC_{1-n}$, $V_3SiC_{1-n}$, $Ce_3SiC_{1-n}$, $V_3GeC_{1-n}$, $Fe_3GaC_{1-n}$, $Rh_3AlC_{1-n}$, $Th_3GeC_{1-n}$, $V_3AlC_{1-n}$, $Fe_3GeC_{1-n}$, $V_3GaC_{1-n}$, $Th_3PC_{1-n}$, $V_3PC_{1-n}$, $V_3SnC_{1-n}$, $Fe_3SnC_{1-n}$, $Zr_3BeC_{1-n}$, $Hf_3BeC_{1-n}$, $Nb_3GaC_{1-n}$, $Sc_3BeC_{1-n}$, $Th_3AlC_{1-n}$, $V_3SbC_{1-n}$, $Ce_3AlC_{1-n}$, $Co_3AlC_{1-n}$, $V_3AsC_{1-n}$, $Ni_3AlC_{1-n}$, $Co_3GaC_{1-n}$, $Ti_3BC_{1-n}$, $Rh_3GaC_{1-n}$, $Fe_3BeC_{1-n}$, $Fe_3SbC_{1-n}$, $Sc_3BC_{1-n}$, $U_3PC_{1-n}$, $Fe_3PC_{1-n}$, $Co_3SiC_{1-n}$, $Hf_3BiC_{1-n}$, $V_3BeC_{1-n}$, $V_3TeC_{1-n}$, $Ni_3GaC_{1-n}$, $Lu_3BeC_{1-n}$, $Mn_3AlC_{1-n}$, $Ru_3AlC_{1-n}$, $Fe_3AsC_{1-n}$, $Ta_3SnC_{1-n}$, $Mn_3SiC_{1-n}$, $V_3SeC_{1-n}$, $U_3SeC_{1-n}$, $Co_3SnC_{1-n}$, $Co_3BeC_{1-n}$, $Co_3GeC_{1-n}$, $U_3SiC_{1-n}$, $Cr_3SiC_{1-n}$, $V_3BiC_{1-n}$, $Tc_3AlC_{1-n}$, $La_3SiC_{1-n}$, $Rh_3SnC_{1-n}$, $Cr_3AlC_{1-n}$, $U_3AsC_{1-n}$, $Mn_3GaC_{1-n}$, $Th_3SiC_{1-n}$, $Rh_3BeC_{1-n}$, $Ni_3BeC_{1-n}$, $Mn_3GeC_{1-n}$, $Cr_3GeC_{1-n}$, $Pd_3AlC_{1-n}$, and $Cr_3GaC_{1-n}$, wherein $0 \leq n \leq 0.75$.

In some embodiments, the thermally stable material 118 includes one or more carbide precipitates (e.g., ternary κ-carbide precipitates, ternary non-κ-carbide precipitates, quaternary κ-carbide precipitates, and/or quaternary non-κ-carbide precipitates) free of (i.e., not including) Co. All of the carbide precipitates of the thermally stable material 118 may be free of Co, or less than all of the carbide precipitates of the thermally stable material 118 may be free of Co. In additional embodiments, the thermally stable material 118 includes one or more carbide precipitates (e.g., ternary κ-carbide precipitates, ternary non-κ-carbide precipitates, quaternary κ-carbide precipitates, and/or quaternary non-κ-carbide precipitates) free of (i.e., not including) Ni. All of the carbide precipitates of the thermally stable material 118 may be free of Ni, or less than all of the carbide precipitates of the thermally stable material 118 may be free of Ni. In further embodiments, the thermally stable material 118 includes one or more carbide precipitates (e.g., ternary κ-carbide precipitates, ternary non-κ-carbide precipitates, quaternary κ-carbide precipitates, and/or quaternary non-κ-carbide precipitates) free of (i.e., not including) Fe. All of the carbide precipitates of the thermally stable material 118 may be free of Fe, or less than all of the carbide precipitates of the thermally stable material 118 may be free of Fe. In still further embodiments, all of carbide precipitates of the thermally stable material 118 are free of (i.e., do not include) Co, Fe, and Ni.

In addition to carbide precipitates (e.g., κ-carbide precipitates, non-κ-carbide precipitates) having formula (1) above, the thermally stable material 118 of the cutting table 102 may include one or more intermetallic compound phase precipitates. As a non-limiting example, the thermally stable material 118 may include one or more of FCC $L1_2$ phase (e.g., gamma prime (γ') phase) precipitates, FCC $DO_{22}$ phase precipitates, $D8_5$ phase precipitates, $DO_{19}$ phase precipitates, and BCC/B2 phase precipitates. In some embodiments, the thermally stable material 118 of the cutting table 102 is formed of and includes carbide precipitate(s) having formula (1) above and FCC $L1_2$ phase precipitates. The thermally stable material 118 of the cutting table 102 may also include other precipitates formed of and including elements of the carbide precipitates having formula (1) above. By way of non-limiting example, the thermally stable material 118 may include, other beta (β) phase precipitates (e.g., β phase precipitates not having B2 ordering on a BCC parent crystal structure), FCC $L1_0$ phase (e.g., gamma (γ) phase) precipitates, and/or other carbide precipitates not having formula (1) above (e.g., WC precipitates; $M_xC$ precipitates, where x>2 and M comprises one or more of Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, La, Ce, Pr, Nd, Pm, Sm, Eu, Gd, Tb, Dy, Ho, Er, Tm, Yb, Lu, Ac, Th, Pa, and U).

As shown in FIG. 2, the thermally stable material 118 may at least partially (e.g., substantially) coat (e.g., cover) surfaces of the inter-bonded diamond particles 114 of the cutting table 102. The thermally stable material 118 may be located directly on the surfaces of the inter-bonded diamond particles 114 of the cutting table 102, and may at least partially impede (e.g., substantially prevent) back-conversion of the inter-bonded diamond particles 114 to other forms or phases of carbon (e.g., graphitic carbon, amorphous carbon, etc.). In some embodiments, substantially all catalytic elements adjacent the inter-bonded diamond particles 114 of the cutting table 102 are partitioned (e.g., incorporated) into carbide precipitates (e.g., κ-carbide precipitates, non-κ-carbide precipitates) having formula (1) above and/or other precipitates (e.g., FCC $L1_2$ phase precipitates; FCC $DO_{22}$ phase precipitates; $D8_5$ phase precipitates; $DO_{19}$ phase precipitates; BCC/B2 phase precipitates; other β phase precipitates; FCC $L1_0$ phase precipitates; other carbide precipitates not having formula (1) above). Accordingly, otherwise catalytic elements of the thermally stable material 118 may not catalyze reactions that decompose the inter-bonded diamond particles 114 during normal use and operation of the cutting table 102. In additional embodiments, one or more unreacted catalytic elements may be present within the thermally stable material 118. However, the particle sizes and distributions of the carbide precipitates having formula (1) above and/or other precipitates may be controlled to limit the exposure of the inter-bonded diamond particles 114 of the cutting table 102 to such unreacted catalytic elements.

The cutting table 102 may exhibit enhanced abrasion resistance and thermal stability up to a melting temperature or theoretical diamond stability temperature, at or near atmospheric conditions, whichever is lower, of the thermally stable material 118. For example, if the melting temperature of the thermally stable material 118 is about 1,200° C., the cutting table 102 may be thermally and physically stable at temperatures within a range from about 1,000° C. to about 1,100° C., which corresponds to the theoretical limit of diamond stability under or near atmospheric conditions (assuming no oxidation occurs). The thermally stable material 118 within interstitial spaces between the inter-bonded diamond particles 114 of the cutting table 102 may be thermodynamically stable at ambient pressure and temperatures, as well as at temperatures and pressures experienced, for example, during downhole drilling. The thermally stable material 118 may render the cutting table 102 thermally stable without having to remove (e.g., leach) material from the interstitial spaces of the cutting table 102.

With returned reference to FIG. 1, the material composition of the supporting substrate 104 may at least partially depend on the methodology (e.g., process) employed to form the cutting table 102 of the cutting element 100. For example, in some embodiments, the supporting substrate 104 includes tungsten carbide (WC) particles dispersed within a homogenized binder formed of and including elements of the thermally stable material 118 (FIG. 2) of the cutting table 102. The homogenized binder may, for example, comprise a substantially homogeneous alloy (e.g., a substantially homogeneous peritectic alloy) of the elements included in the thermally stable material 118 (e.g., the elements included in the carbide precipitate(s) of the thermally stable material 118 having formula (1) above) of the cutting table 102. The homogenized binder of the supporting substrate 104 may be employed (e.g., diffused from the supporting substrate 104 into a diamond-containing material adjacent the supporting substrate 104) to form the cutting table 102 (including the thermally stable material 118 (FIG. 2) thereof) during the formation of the cutting element 100, as described in further detail below with reference to FIGS. 3A and 3B. In additional embodiments, the supporting substrate 104 may have a different material composition, such as a material composition free of one or more of the elements present in the thermally stable material 118 of the cutting table 102 (e.g., free of one or more of the elements included in the carbide precipitate(s) of the thermally stable material 118 having formula (1) above). In such embodiments, such omitted elements may be obtained from one or more different sources (e.g., one or more sources other than the supporting substrate 104) during the formation of the cutting table 102 (including the thermally stable material 118 (FIG. 2) thereof) and the cutting element 100. For example, one or more of the elements included in the thermally stable material 118 (FIG. 2) (e.g., one or more of the elements included in the carbide precipitate(s) of the thermally stable material 118 having formula (1) above) of the cutting table 102 may be obtained from discrete alloy particles included in a diamond-containing material adjacent the supporting substrate 104 during the formation of the cutting element 100, as described in further detail below with reference to FIGS. 4A and 4B. As another example, one or more of the elements included in the thermally stable material 118 (FIG. 2) (e.g., one or more of the elements included in the carbide precipitate(s) of the thermally stable material 118 having formula (1) above) of the cutting table 102 may be obtained from additional structures (e.g., foils, plates, shims, meshes, films, layers) provided adjacent at least a diamond-containing material employed to form the cutting table 102 during the formation of the cutting element 100, as described in further detail below with reference to FIGS. 5A and 5B.

An embodiment of a method of forming the cutting element 100 will now be described with reference to FIGS. 3A and 3B, which illustrate simplified cross-sectional views of a container 300 in a process of forming the cutting element 100 shown in FIG. 1. With the description provided below, it will be readily apparent to one of ordinary skill in the art that the methods described herein may be used in various devices. In other words, the methods of the disclosure may be used whenever it is desired to form a thermally stable structure, such as a thermally stable cutting table (e.g., a thermally stable diamond table, such as a thermally stable PDC), for an earth-boring tool.

Figure 3A:
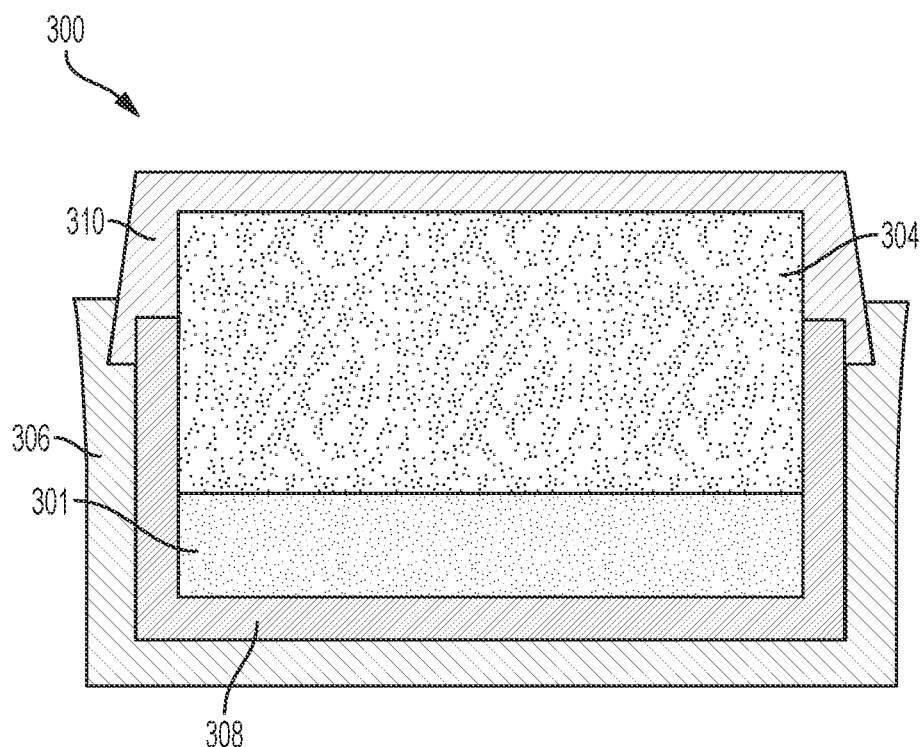
FIGS. 3A and 3B are simplified cross-sectional views of a container in a process of forming a cutting element, in accordance with embodiments of the disclosure.

Referring to FIG. 3A, a diamond-containing material 301 may be provided within the container 300, and a supporting substrate 304 may be provided directly on the diamond-containing material 301. The container 300 may substantially surround and hold the diamond-containing material 301 and the supporting substrate 304. As shown in FIG. 3A, the container 300 may include an inner cup 308 in which the diamond-containing material 301 and a portion of the supporting substrate 304 may be disposed, a bottom end piece 306 in which the inner cup 308 may be at least partially disposed, and a top end piece 310 surrounding the supporting substrate 304 and coupled (e.g., swage bonded) to one or more of the inner cup 308 and the bottom end piece 306. In additional embodiments, the bottom end piece 306 may be omitted (e.g., absent).

The diamond-containing material 301 (e.g., diamond powder) may be formed of and include discrete diamond particles (e.g., discrete natural diamond particles, discrete synthetic diamond particles, combinations thereof, etc.). The discrete diamond particles may individually exhibit a desired particle size. The discrete diamond particles may comprise, for example, one or more of micro-sized diamond particles and nano-sized diamond particles. In addition, each of the discrete diamond particles may individually exhibit a desired shape, such as at least one of a spherical shape, a hexahedral shape, an ellipsoidal shape, a cylindrical shape, a conical shape, or an irregular shape. In some embodiments, each of the discrete diamond particles of the diamond-containing material 301 exhibits a substantially spherical shape. The discrete diamond particles may be monodisperse, wherein each of the discrete diamond particles exhibits substantially the same material composition, size, and shape, or may be polydisperse, wherein at least one of the discrete diamond particles exhibits one or more of a different material composition, a different particle size, and a different shape than at least one other of the discrete diamond particles. The diamond-containing material 301 may be formed by conventional processes, which are not described herein.

The supporting substrate 304 comprises a consolidated structure including WC particles dispersed within a homogenized binder (e.g., a substantially homogeneous alloy, such as a substantially homogeneous peritectic alloy) comprising at least one first element selected from Sc, Ti, V, Cr, Mn, Fe, Co, Ni, Cu, Zn, Y, Zr, Nb, Mo, Tc, Ru, Rh, Pd, Ag, Cd, Hf, Ta, Re, Os, Ir, Pt, Au, Hg, La, Ce, Pr, Nd, Pm, Sm, Eu, Gd, Tb, Dy, Ho, Er, Tm, Yb, Lu, Ac, Th, Pa, and U; at least one second element selected from Al, Ga, Sn, Be, Bi, Te, Sb, Se, As, Ge, Si, B, and P; C; and W. The homogenized binder may, for example, comprise from about 35 weight percent (wt %) to about 95 wt % of the first element; from about 2.0 wt % to about 60 wt % of the second element; from about 0.1 wt % C to about 10 wt % C; and a remainder of W. In some embodiments, the homogenized binder is substantially free of Co. In additional embodiments, the homogenized binder is substantially free of Ni. In further embodiments, the homogenized binder is substantially free of Fe. In still further embodiments, the homogenized binder is substantially free of each of Co, Ni, and Fe. The supporting substrate 304 may include from about 80 wt % to about 95 wt % of the WC particles, and from about 5 wt % to about 20 wt % of the homogenized binder. In some embodiments, the supporting substrate 304 includes about 88 wt % WC particles, and about 12 wt % of a homogenized binder comprising the first element (e.g., one or more of Sc, Ti, V, Cr, Mn, Fe, Co, Ni, Cu, Zn, Y, Zr, Nb, Mo, Tc, Ru, Rh, Pd, Ag, Cd, Hf, Ta, Re, Os, Ir, Pt, Au, Hg, La, Ce, Pr, Nd, Pm, Sm, Eu, Gd, Tb, Dy, Ho, Er, Tm, Yb, Lu, Ac, Th, Pa, and U), the second element (e.g., one or more of Al, Ga, Sn, Be, Bi, Te, Sb, Se, As, Ge, Si, B, and P); C; and W. The homogenized binder of the supporting substrate 304 may have a liquidus temperature greater than or equal to about 750° C., such as within a range of from about 750° C. to about 1500° C., or from about 1000° C. to about 1500° C. As described in further detail below, the homogenized binder of the supporting substrate 304 may be employed to convert the discrete diamond particles of the diamond-containing material 301 into inter-bonded diamond particles.

As described in further detail below, the supporting substrate 304 may be formed through a multi-step process that includes forming a precursor composition, and then consolidating the precursor composition. With the description as provided below, it will be readily apparent to one of ordinary skill in the art that the methods described herein in relation to the formation of the supporting substrate 304 may be used in various applications. The methods described herein may be used whenever it is desired to form a consolidated structure including particles of a hard material (e.g., WC particles) dispersed in a homogenized binder.

The process of forming a precursor composition includes combining (e.g., mixing) a preliminary powder with a WC powder, a binding agent, and, optionally, one or more additive(s) to form a precursor composition. The preliminary powder may include at least one first element selected from Sc, Ti, V, Cr, Mn, Fe, Co, Ni, Cu, Zn, Y, Zr, Nb, Mo, Tc, Ru, Rh, Pd, Ag, Cd, Hf, Ta, Re, Os, Ir, Pt, Au, Hg, La, Ce, Pr, Nd, Pm, Sm, Eu, Gd, Tb, Dy, Ho, Er, Tm, Yb, Lu, Ac, Th, Pa, and U, at least one second element selected from Al, Ga, Sn, Be, Bi, Te, Sb, Se, As, Ge, Si, B, and P, and at least one third element selected from C and W. In some embodiments, the preliminary powder is substantially free of Co. In additional embodiments, the preliminary powder is substantially free of Ni. In further embodiments, the preliminary powder is substantially free of Fe. In still further embodiments, the preliminary powder is substantially free of each of Co, Ni, and Fe. The preliminary powder may, for example, comprise discrete alloy particles each individually including the first element, the second element, and the third element; and/or may comprise discrete elemental (e.g., non-alloy) particles (e.g., discrete elemental particles of the first element, discrete elemental particles of the second element, and/or discrete elemental particles of third element). During the process of forming the precursor composition, the discrete particles (e.g., discrete alloy particles and/or discrete elemental particles) of the preliminary powder may be distributed relative to the discrete WC particles of the WC powder and the additive(s) (if any) so as to facilitate the formation of a consolidated structure (e.g., a supporting substrate) able to effectuate the formation of a cutting element including a thermally stable cutting table (e.g., a thermally stable PDC table), as described in further detail bellow.

The preliminary powder may include any amounts of the first element (e.g., one or more of Sc, Ti, V, Cr, Mn, Fe, Co, Ni, Cu, Zn, Y, Zr, Nb, Mo, Tc, Ru, Rh, Pd, Ag, Cd, Hf, Ta, Re, Os, Ir, Pt, Au, Hg, La, Ce, Pr, Nd, Pm, Sm, Eu, Gd, Tb, Dy, Ho, Er, Tm, Yb, Lu, Ac, Th, Pa, and U), the second element (e.g., one or more of Al, Ga, Sn, Be, Bi, Te, Sb, Se, As, Ge, Si, B, and P), and the third element (e.g., one or more of C and W) able to facilitate the formation of a consolidated structure formed of and including WC particles and a homogenized binder including desired amounts of the first element, the second element, C, and W through the subsequent consolidation process. Accordingly, amounts of one or more of the first element, the second element, and the third element in the preliminary powder (e.g., as effectuated by the formulations and relative amounts of the discrete alloy particles and/or the discrete elemental particles thereof) may be selected at least partially based on amounts of W and C in the WC powder (e.g., as effectuated by the formulations and relative amounts of the discrete WC particles thereof) facilitating the formation of the homogenized binder of the consolidated structure. In turn, as described in further detail below, a material composition of the homogenized binder may be selected at least partially based on desired melting properties of the homogenized binder, on desired catalytic properties of the homogenized binder for the formation of a compact structure (e.g., a cutting table, such as a PDC table) including inter-bonded diamond particles, and on desired stability properties (e.g., thermal stability properties, mechanical stability properties) of the compact structure effectuated by the formation of a thermally stable material (e.g., the thermally stable material 118 previously described with reference to FIG. 2) from portions of the homogenized binder remaining within interstitial spaces between the inter-bonded diamond particles (e.g., the inter-bonded diamond particles 114 of the cutting table 102 previously described with reference to FIG. 2) following the formation thereof.

In some embodiments, the preliminary powder includes from about 60 wt % to about to 98.75 wt % of the first element (e.g., one or more of Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, La, Ce, Pr, Nd, Pm, Sm, Eu, Gd, Tb, Dy, Ho, Er, Tm, Yb, Lu, Ac, Th, Pa, and U), from about 2 wt % to about 40 wt % of the second element (e.g., one or more of Al, Ga, Sn, Be, Bi, Te, Sb, Se, As, Ge, Si, B, and P); and from about 0.25 wt % to about 2.0 wt % of the third element (e.g., one or more of W and C). Relatively higher concentrations of the second element may enhance the suppression of undesirable reactions (e.g., binary carbide forming reactions) between the first element and C during the formation of a compact structure (e.g., a cutting table, such as a PDC table) using a liquid phase of a homogenized binder subsequently formed from the precursor composition, enhancing the catalytic properties (e.g., carbon solubility and liquid phase transport) of the first element for the formation of inter-bonded diamond particles. By way of non-limiting example, if the first element comprises an element (e.g., Y, Ti, Zr, Hf, V, Nb, Ta, Cr, Mo, W) that is highly reactive with C to form a binary carbide (e.g., YC, TiC, ZrC, HfC, VC, NbC, TaC, CrC, MoC, WC), the second element may suppress reactions between the first element and C that would otherwise form the binary carbide so as to permit the first element to act as a catalyst for the formation of inter-bonded diamond particles during a sintering process at or above the liquidus temperature of the homogenized binder. Relatively higher concentrations of the second element may also enhance thermal stability properties of a compact structure (e.g., a cutting table, such as a PDC table) formed using the liquid phase of the homogenized binder, but may also increase and/or widen the melting temperature range of the homogenized binder as compared to homogenized binders having relatively lower concentrations of the second element. Even if the first element comprises an element (e.g., Co, No, Ag, Cu, Au, Pt, Tc) that is not highly reactive with C to form a binary carbide, the second element may enhance the stability properties (e.g., thermal stability properties, mechanical stability properties) of the compact structure (e.g., a cutting table, such as a PDC table) by facilitating the formation of carbide precipitates (e.g., κ-carbide precipitates, non-κ-carbide precipitates) having formula (1) above through the sintering process. In addition, relatively higher concentrations of C in the preliminary powder may enhance thermal stability properties of the compact structure formed using the liquid phase of homogenized binder through the formation of carbide precipitates, but may also modify (e.g., suppress) the melting characteristics of the homogenized binder by modifying the melting and solidification paths toward monovariant and invariant reaction lines.

If the preliminary powder includes two or more of the second elements (e.g., two or more of Al, Ga, Sn, Be, Bi, Te, Sb, Se, As, Ge, Si, B, and P), the preliminary powder may include substantially the same weight percentage of each of the two or more of the second elements; or may include a different weight percentage of at least one of the two or more of the second elements than at least one other of the two or more of the second elements. In addition, if the preliminary powder includes two or more of the first elements (e.g., two or more of Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, La, Ce, Pr, Nd, Pm, Sm, Eu, Gd, Tb, Dy, Ho, Er, Tm, Yb, Lu, Ac, Th, Pa, and U), the preliminary powder may include substantially the same weight percentage of each of the two or more of the first elements; or may include a different weight percentage of at least one of the two or more of the first elements than at least one other of the two or more of the first elements.

In some embodiments, the material composition of the preliminary powder is selected relative to the material composition of WC powder to facilitate the subsequent formation of a homogenized binder including amounts of the first element (e.g., one or more of Sc, Ti, V, Cr, Mn, Fe, Co, Ni, Cu, Zn, Y, Zr, Nb, Mo, Tc, Ru, Rh, Pd, Ag, Cd, Hf, Ta, Re, Os, Ir, Pt, Au, Hg, La, Ce, Pr, Nd, Pm, Sm, Eu, Gd, Tb, Dy, Ho, Er, Tm, Yb, Lu, Ac, Th, Pa, and U), the second element (one or more of Al, Ga, Sn, Be, Bi, Te, Sb, Se, As, Ge, Si, B, and P), C, and W facilitating the formation of a compact structure (e.g., cutting table, PDC table) including inter-bonded diamond particles using a liquid phase of the homogenized binder. The amounts of at least the first element and the second element in the preliminary powder may, for example, be selected such that the second element minimizes (e.g., substantially limits) reactions (e.g., binary carbide forming reactions) between the first element and carbon of discrete diamond particles that may otherwise substantially preclude the first element from being able to catalyze the formation of inter-bonded diamond particles from the discrete diamond particles using a liquid phase of the homogenized binder. In some embodiments, amounts of the second element are selected relative to amounts of the first element such that substantially none of the first element reacts with C to form a binary carbide upon infiltration (e.g., diffusion) of a liquid phase of the homogenized binder into the diamond-containing material 301 during subsequent HTHP processing to convert the discrete diamond particles of the diamond-containing material 301 into inter-bonded diamond particles. Accordingly, substantially all of the first element included within the liquid phase of the homogenized binder may catalyze the formation of the inter-bonded diamond particles. Amounts of the first element, the second element, and the third element (e.g., one or more of W and C) in the preliminary powder may be selected to permit a melting temperature range of the homogenized binder to be within a temperature range suitable for thermally treating (e.g., sintering) the diamond-containing material 301 to form the compact structure. In some embodiments, the preliminary powder includes about 86 wt % of the first element, and about 13 wt % of the second element.

In additional embodiments, the material composition of the preliminary powder is selected relative to the material compositions of the WC powder to facilitate the subsequent formation of a homogenized binder having a relatively lower melting temperature range and/or relatively narrower melting temperature range than a homogenized binder formulated to minimize (e.g., substantially limit) reactions (e.g., binary carbide forming reactions) between the first element and carbon of discrete diamond particles that may otherwise substantially preclude the first element from being able to catalyze the formation of inter-bonded diamond particles from discrete diamond particles using a liquid phase of the homogenized binder. For example, amounts of the second element (e.g., one or more of Al, Ga, Sn, Be, Bi, Te, Sb, Se, As, Ge, Si, B, and P) of the preliminary powder may be selected relative to amounts of the first element (e.g., one or more of Sc, Ti, V, Cr, Mn, Fe, Co, Ni, Cu, Zn, Y, Zr, Nb, Mo, Tc, Ru, Rh, Pd, Ag, Cd, Hf, Ta, Re, Os, Ir, Pt, Au, Hg, La, Ce, Pr, Nd, Pm, Sm, Eu, Gd, Tb, Dy, Ho, Er, Tm, Yb, Lu, Ac, Th, Pa, and U) such that less than all of the first element is impeded (e.g., precluded) from reacting with C to form a binary carbide upon infiltration (e.g., diffusion) of a liquid phase of the homogenized binder into the diamond-containing material 301 during subsequent HTHP processing to convert the discrete diamond particles of the diamond-containing material 301 into inter-bonded diamond particles. A majority (e.g., greater than or equal to 70 percent but less than 100 percent, greater than or equal to 80 percent but less than 100 percent, greater than or equal to 90 percent but less than 100 percent, greater than or equal to 95 percent but less than 100 percent) of the first element may catalyze the formation of the inter-bonded diamond particles, but at least a portion of the first element may react with C to form a binary carbide upon infiltration of the liquid phase of the homogenized binder into the diamond-containing material 301. Accordingly, a compact structure (e.g., cutting table, PDC table) formed using the liquid phase of the homogenized binder may include binary carbides within interstitial spaces between inter-bonded diamond particles thereof. In some embodiments, the preliminary powder includes about 89 wt % Co; about 9.2 wt % of one or more of Al, Ga, Sn, Be, Ge, and Si; and about 0.8 wt % C.

In some embodiments, at least some (e.g., all) of the discrete particles of the preliminary powder comprise discrete alloy particles individually formed of and including an alloy including at least one first element selected from Sc, Ti, V, Cr, Mn, Fe, Co, Ni, Cu, Zn, Y, Zr, Nb, Mo, Tc, Ru, Rh, Pd, Ag, Cd, Hf, Ta, Re, Os, Ir, Pt, Au, Hg, La, Ce, Pr, Nd, Pm, Sm, Eu, Gd, Tb, Dy, Ho, Er, Tm, Yb, Lu, Ac, Th, Pa, and U, at least one second element selected from Al, Ga, Sn, Be, Bi, Te, Sb, Se, As, Ge, Si, B, and P, and at least one third element selected from C and W. Each of the discrete alloy particles may include substantially the same elements and element ratios of as each other of the discrete alloy particles, or one or more of the discrete alloy particles may include different elements and/or different element ratios than one or more other of the discrete alloy particles, so long as the preliminary powder as a whole includes desired and predetermined ratios of the first element, the second element, and the third element. In some embodiments, the preliminary powder is formed of and includes discrete alloy particles having substantially the same amounts of one or more of the first element, the second element, and the third element as one another. In additional embodiments, the preliminary powder is formed of and includes discrete alloy particles having different amounts of the first element, the second element, and/or the third element than one another.

If included in the preliminary powder, the discrete alloy particles may be formed by conventional processes (e.g., ball milling processes, attritor milling processes, cryomilling processes, jet milling processes, powder atomization processes, etc.), which are not described herein. As a non-limiting example, an initial powder formed of and including particles of the first element (e.g., one or more of Sc, Ti, V, Cr, Mn, Fe, Co, Ni, Cu, Zn, Y, Zr, Nb, Mo, Tc, Ru, Rh, Pd, Ag, Cd, Hf, Ta, Re, Os, Ir, Pt, Au, Hg, La, Ce, Pr, Nd, Pm, Sm, Eu, Gd, Tb, Dy, Ho, Er, Tm, Yb, Lu, Ac, Th, Pa, and U), the second element (e.g., one or more of Al, Ga, Sn, Be, Bi, Te, Sb, Se, As, Ge, Si, B, and P), and the third element (e.g., one or more of C and W), alloys thereof, and/or combinations thereof may be provided into an attritor mill containing mixing structures (e.g., mixing spheres, mixing bars, etc.), and may then be subjected to a mechanical alloying process until the discrete alloy particles are formed. During the mechanical alloying process collisions between the mixing structures and the initial powder may cause particles of different materials to fracture and/or be welded or smeared together. Relatively larger particles may fracture during the mechanical welding process and relatively smaller particles may weld together, eventually forming discrete alloy particles each individually comprising a substantially homogeneous mixture of the constituents of the initial powder in substantially the same proportions of the initial powder. As another non-limiting example, an alloy material may be formed by conventional melting and mixing processes, and then the alloy material may be formed into the discrete alloy particles by one or more conventional atomization processes.

In additional embodiments, at least some (e.g., all) of the discrete particles of the preliminary powder comprise discrete elemental particles, such as first discrete elemental particles individually formed a single (e.g., only one) first element selected from Sc, Ti, V, Cr, Mn, Fe, Co, Ni, Cu, Zn, Y, Zr, Nb, Mo, Tc, Ru, Rh, Pd, Ag, Cd, Hf, Ta, Re, Os, Ir, Pt, Au, Hg, La, Ce, Pr, Nd, Pm, Sm, Eu, Gd, Tb, Dy, Ho, Er, Tm, Yb, Lu, Ac, Th, Pa, and U; second discrete elemental particles individually formed of a single (e.g., only one) second element selected from Al, Ga, Sn, Be, Bi, Te, Sb, Se, As, Ge, Si, B, and P; and/or third discrete elemental particles individually formed of a single (e.g., only one) element selected from C (e.g., discrete graphite particles, discrete graphene particles, discrete fullerene particles, discrete carbon nanofibers, discrete carbon nanotubes, etc.) and W. The preliminary powder may include any amounts of the discrete elemental particles permitting the preliminary powder as a whole to include desired and predetermined ratios of one or more of the first element, the second element, and the third element. If included in the preliminary powder, the discrete elemental particles may be formed by conventional processes (e.g., conventional milling processes), which are not described herein.

The preliminary powder may include discrete alloy particles but may be substantially free of discrete elemental particles; may include discrete elemental particles but may be substantially free of discrete alloy particles; or may include a combination of discrete alloy particles and discrete elemental particles. In some embodiments, the preliminary powder only includes discrete alloy particles. In additional embodiments, the preliminary powder only includes discrete elemental particles. In further embodiments, the preliminary powder includes a combination of discrete alloy particles and discrete elemental particles.

Each of the discrete particles (e.g., discrete alloy particles and/or discrete elemental particles) of the preliminary powder may individually exhibit a desired particle size, such as a particle size less than or equal to about 1000 micrometers ($\mu m$). The discrete particles may comprise, for example, one or more of discrete micro-sized particles and discrete nano-sized particles. As used herein, the term "micro-sized" means and includes a particle size with a range of from about one (1) $\mu m$ to about 1000 $\mu m$, such as from about 1 $\mu m$ to about 500 $\mu m$, from about 1 $\mu m$ to about 100 $\mu m$, or from about 1 $\mu m$ to about 50 $\mu m$. As used herein, the term "nano-sized" means and includes a particle size of less than 1 $\mu m$, such as less than or equal to about 500 nanometers (nm), or less than or equal to about 250 nm. In addition, each of the discrete particles may individually exhibit a desired shape, such as one or more of a spherical shape, a hexahedral shape, an ellipsoidal shape, a cylindrical shape, a conical shape, or an irregular shape.

The discrete particles (e.g., discrete alloy particles and/or discrete elemental particles) of the preliminary powder may be monodisperse, wherein each of the discrete particles exhibits substantially the same size and substantially the same shape, or may be polydisperse, wherein at least one of the discrete particles exhibits one or more of a different particle size and a different shape than at least one other of the discrete particles. In some embodiments, the discrete particles of the preliminary powder have a multi-modal (e.g., bi-modal, tri-modal, etc.) particle (e.g., particle) size distribution. For example, the preliminary powder may include a combination of relatively larger, discrete particles and relatively smaller, discrete particles. The multi-modal particle size distribution of the preliminary powder may, for example, provide the precursor composition with desirable particle packing characteristics for the subsequent formation of a consolidated structure (e.g., supporting substrate) therefrom, as described in further detail below. In additional embodiments, the preliminary powder has a mono-modal particle size distribution. For example, all of the discrete particles of the preliminary powder may exhibit substantially the same particle size.

The WC particles of the WC powder may include stoichiometric quantities or near stoichiometric quantities of W and C. Relative amounts of W and C in the discrete WC particles may be selected at least partially based on amounts and material compositions of the discrete particles of the preliminary powder, the discrete WC particles, and the additive(s) (if any) facilitating the formation of a consolidated structure (e.g., supporting substrate) formed of and including WC particles and a homogenized binder including desirable and predetermined amounts of at least one first element selected from Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, La, Ce, Pr, Nd, Pm, Sm, Eu, Gd, Tb, Dy, Ho, Er, Tm, Yb, Lu, Ac, Th, Pa, and U; at least one second element selected from Al, Ga, Sn, Be, Bi, Te, Sb, Se, As, Ge, Si, B, and P; C; and W through the subsequent consolidation process. In some embodiments, each of the discrete WC particles of the WC powder includes stoichiometric amounts of W and C. In additional embodiments, one or more of the discrete WC particles of the WC powder includes an excess amount of C than that stoichiometrically required to form WC. In further embodiments, one or more of the discrete WC particles of the WC powder includes an excess amount of W than that stoichiometrically required to form WC.

Each of the discrete WC particles of the WC powder may individually exhibit a desired particle size, such as a particle size less than or equal to about 1000 $\mu m$. The discrete WC particles may comprise, for example, one or more of discrete micro-sized WC particles and discrete nano-sized WC particles. In addition, each of the discrete WC particles may individually exhibit a desired shape, such as one or more of a spherical shape, a hexahedral shape, an ellipsoidal shape, a cylindrical shape, a conical shape, or an irregular shape.

The discrete WC particles of the WC powder may be monodisperse, wherein each of the discrete WC particles exhibits substantially the same size and shape, or may be polydisperse, wherein at least one of the discrete WC particles exhibits one or more of a different particle size and a different shape than at least one other of the discrete WC particles. In some embodiments, the WC powder has a multi-modal (e.g., bi-modal, tri-modal, etc.) particle size distribution. For example, the WC powder may include a combination of relatively larger, discrete WC particles and relatively smaller, discrete WC particles. In additional embodiments, the WC powder has a mono-modal particle size distribution. For example, all of the discrete WC particles of the WC powder may exhibit substantially the same particle size.

The WC powder, including the discrete WC particles thereof, the may be formed by conventional processes, which are not described herein.

The binding agent may comprise any material permitting the precursor composition to retain a desired shape during subsequent processing, and which may be removed (e.g., volatilized off) during the subsequent processing. By way of non-limiting example, the binding agent may comprise an organic compound, such as a wax (e.g., a paraffin wax). In some embodiments, the binding agent of the precursor composition is a paraffin wax.

Amounts of the preliminary powder, the WC powder, and the binding agent employed to form the precursor composition may be selected at least partially based on the configurations (e.g., material compositions, sizes, shapes) of the preliminary powder, and the WC powder facilitating the subsequent formation of the supporting substrate 304 including WC particles and a homogenized binder including desired and predetermined amounts of at least one first element selected from Sc, Ti, V, Cr, Mn, Fe, Co, Ni, Cu, Zn, Y, Zr, Nb, Mo, Tc, Ru, Rh, Pd, Ag, Cd, Hf, Ta, Re, Os, Ir, Pt, Au, Hg, La, Ce, Pr, Nd, Pm, Sm, Eu, Gd, Tb, Dy, Ho, Er, Tm, Yb, Lu, Ac, Th, Pa, and U; at least second element selected from Al, Ga, Sn, Be, Bi, Te, Sb, Se, As, Ge, Si, B, and P; C; and W. As a non-limiting example, the precursor composition may comprise from about 5 wt % to about 15 wt % of the preliminary powder, from about 85 wt % to about 95 wt % of the WC powder, and a remainder of the binding agent (e.g., paraffin wax). If the preliminary powder only includes discrete alloy particles, the precursor composition may, for example, include from about 5 wt % to about 15 wt % of the discrete preliminary particles, from about 85 wt % to about 95 wt % discrete of the WC particles, and a remainder of a binding agent. If the preliminary powder only includes first discrete elemental particles of the first element, second discrete elemental particles of the second element, and discrete C particles, the precursor composition may, for example, include from about 85 wt % to about 95 wt % of the discrete WC particles, from about 4 wt % to about 15 wt % of the first discrete elemental particles, from about 0.05 wt % to about 3 wt % of the second discrete elemental particles, and from about 0.013 wt % to about 0.3 wt % of the discrete C particles. In some embodiments, the precursor composition comprises about 88 wt % discrete WC particles and about 12 wt % alloy particles individually comprising the first element, the second element, and a third element selected from C and W. In additional embodiments, the precursor composition comprises about 88 wt % of discrete WC particles; about 10.3 wt % of first discrete elemental particles individually comprising the first element; about 1.6 wt % of second discrete elemental particles individually comprising the second element; and about 0.1 wt % of discrete C particles. In further embodiments, the precursor composition comprises about 88 wt % of discrete WC particles; about 10.7 wt % of first discrete elemental particles of the first element; about 1.2 wt % of second discrete elemental particles of the second element; and about 0.1 wt % of discrete C particles.

The precursor composition may be formed by mixing the preliminary powder, the WC powder, the binding agent, and at least one fluid material (e.g., acetone, heptane, etc.) formulated to dissolve and disperse the binding agent using one or more conventional processes (e.g., conventional milling processes, such as ball milling processes, attritor milling processes, cryomilling processes, jet milling processes, etc.) to form a mixture thereof. The preliminary powder, the WC powder, the binding agent, and the fluid material may be combined in any order. In some embodiments, the preliminary powder and the WC powder are combined (e.g., using a first milling process), and then the binding agent and fluid material are combined with the resulting mixture (e.g., using a second milling process). During the mixing process, collisions between different particles (e.g., the discrete particles of the preliminary powder, the discrete WC particles of the WC powder, the additive particles (if any), etc.) may cause at least some of the different particles to fracture and/or become welded or smeared together. For example, during the mixing process at least some materials (e.g., elements, alloys) of the discrete particles of the preliminary powder may be transferred to surfaces of the WC particles of the WC powder to form composite particles comprising WC coated with an alloy comprising at least one first element selected from Sc, Ti, V, Cr, Mn, Fe, Co, Ni, Cu, Zn, Y, Zr, Nb, Mo, Tc, Ru, Rh, Pd, Ag, Cd, Hf, Ta, Re, Os, Ir, Pt, Au, Hg, La, Ce, Pr, Nd, Pm, Sm, Eu, Gd, Tb, Dy, Ho, Er, Tm, Yb, Lu, Ac, Th, Pa, and U; at least one second element selected from Al, Ga, Sn, Be, Bi, Te, Sb, Se, As, Ge, Si, and B; and at least one third element selected from C and W. Thereafter, the fluid material may be removed (e.g., evaporated), leaving the binding agent on and around any remaining discrete particles of the preliminary powder, any remaining discrete WC particles of the WC powder, any composite particles (e.g., particles comprising WC coated with an alloy comprising the first element, the second element, and the third element), and any other particles comprising constituents of the discrete particles of the preliminary powder, and the discrete WC particles of the WC powder.

Following the formation of the precursor composition, the precursor composition is subjected to a consolidation process to form a consolidated structure (e.g., the supporting substrate 304) including WC particles dispersed within a homogenized binder. The homogenized binder may, for example, comprise a substantially homogeneous alloy (e.g., a substantially homogeneous peritectic alloy) of at least one first element selected from Sc, Ti, V, Cr, Mn, Fe, Co, Ni, Cu, Zn, Y, Zr, Nb, Mo, Tc, Ru, Rh, Pd, Ag, Cd, Hf, Ta, Re, Os, Ir, Pt, Au, Hg, La, Ce, Pr, Nd, Pm, Sm, Eu, Gd, Tb, Dy, Ho, Er, Tm, Yb, Lu, Ac, Th, Pa, and U; at least one second element selected from Al, Ga, Sn, Be, Bi, Te, Sb, Se, As, Ge, Si, and B; C; and W. Amounts of the first element, the second element, C, and W in the homogenized binder may at least partially depend on the amounts of the first element, the second element, and the third element included in the precursor composition. For example, the homogenized binder and the precursor composition may include substantially the same amounts of the first element and the second element; and homogenized binder may include different amounts of the third element than the precursor composition resulting from dissolution of W from the WC particles during the consolidation process and the migration from and/or maintenance of C of different components (e.g., precursor alloy particles, WC particles, etc.) during the consolidation process.

The consolidated structure (e.g., the supporting substrate 304) may be formed to exhibit any desired dimensions and any desired shape. The dimensions and shape of the consolidated structure may at least partially depend upon desired dimensions and desired shapes of a compact structure (e.g., a cutting table, such as a PDC table) to subsequently be formed on and/or attached to the consolidated structure, as described in further detail below. In some embodiments, the consolidated structure is formed to exhibit a cylindrical column shape. In additional embodiments, the consolidated structure is formed to exhibit a different shape, such as a dome shape, a conical shape, a frusto-conical shape, a rectangular column shape, a pyramidal shape, a frusto-pyramidal shape, a fin shape, a pillar shape, a stud shape, or an irregular shape. Accordingly, the consolidated structure may be formed to exhibit any desired lateral cross-sectional shape including, but not limited to, a circular shape, a semicircular shape, an ovular shape, a tetragonal shape (e.g., square, rectangular, trapezium, trapezoidal, parallelogram, etc.), a triangular shape, an elliptical shape, or an irregular shape.

The consolidation process may include forming the precursor composition into a green structure having a shape generally corresponding to the shape of the consolidated structure, subjecting the green structure to at least one densification process (e.g., a sintering process, a hot isostatic pressing (HIP) process, a sintered-HIP process, a hot pressing process, etc.) to form a consolidated structure including WC particles dispersed within an at least partially (e.g., substantially) homogenized binder, and, optionally, subjecting the consolidated structure to at least one supplemental homogenization process to further homogenize the at least partially homogenized binder. As used herein, the term "green" means unsintered. Accordingly, as used herein, a "green structure" means and includes an unsintered structure comprising a plurality of particles, which may be held together by interactions between one or more materials of the plurality of particles and/or another material (e.g., a binder).

The precursor composition may be formed into the green structure through conventional processes, which are not described in detail herein. For example, the precursor composition may be provided into a cavity of a container (e.g., canister, cup, etc.) having a shape complementary to a desired shape (e.g., a cylindrical column shape) of the consolidated structure, and then the precursor composition may be subjected to at least one pressing process (e.g., a cold pressing process, such as a process wherein the precursor composition is subjected to compressive pressure without substantially heating the precursor composition) to form the green structure. The pressing process may, for example, subject the precursor composition within the cavity of the container to a pressure greater than or equal to about 10 tons per square inch (tons/in$^2$), such as within a range of from about 10 tons/in$^2$ to about 30 tons/in$^2$.

Following the formation of the green structure, the binding agent may be removed from the green structure. For example, the green structure may be dewaxed by way of vacuum or flowing hydrogen at an elevated temperature. The resulting (e.g., dewaxed) structure may then be subjected to a partial sintering (e.g., pre-sintering) process to form a brown structure having sufficient strength for the handling thereof.

Following the formation of the brown structure, the brown structure may be subjected to a densification process (e.g., a sintering process, a hot isostatic pressing (HIP) process, a sintered-HIP process, a hot pressing process, etc.) that applies sufficient heat and sufficient pressure to the brown structure to form the consolidated structure including the WC particles dispersed in the at least partially homogenized binder. By way of non-limiting example, the brown structure may be wrapped in a sealing material (e.g., graphite foil), and may then be placed in a container made of a high temperature, self-sealing material. The container may be filled with a suitable pressure transmission medium (e.g., glass particles, ceramic particles, graphite particles, salt particles, metal particles, etc.), and the wrapped brown structure may be provided within the pressure transmission medium. The container, along with the wrapped brown structure and pressure transmission medium therein, may then be heated to a consolidation temperature facilitating the formation of the homogenized binder under isostatic (e.g., uniform) pressure applied by a press (e.g., a mechanical press, a hydraulic press, etc.) to at least partially (e.g., substantially) consolidate the brown structure and form the consolidated structure. The consolidation temperature may be a temperature greater than the solidus temperature of at least the discrete particles (e.g., discrete alloy particles and/or discrete elemental particles) of the preliminary powder used to form the brown structure (e.g., a temperature greater than or equal to the liquidus temperature of the discrete particles, a temperature between the solidus temperature and the liquidus temperature of the discrete particles, etc.), and the applied pressure may be greater than or equal to about 10 megapascals (MPa) (e.g., greater than or equal to about 50 MPa, greater than or equal to about 100 MPa, greater than or equal to about 250 MPa, greater than or equal to about 500 MPa, greater than or equal to about 750 MPa, greater than or equal to about 1.0 gigapascals (GPa), etc.). During the densification process, one or more elements of the WC particles and/or additive(s) (if any) present in the brown structure may diffuse into and homogeneously intermix with a molten alloy of at least one first element selected from Sc, Ti, V, Cr, Mn, Fe, Co, Ni, Cu, Zn, Y, Zr, Nb, Mo, Tc, Ru, Rh, Pd, Ag, Cd, Hf, Ta, Re, Os, Ir, Pt, Au, Hg, La, Ce, Pr, Nd, Pm, Sm, Eu, Gd, Tb, Dy, Ho, Er, Tm, Yb, Lu, Ac, Th, Pa, and U; at least one or second element selected from Al, Ga, Sn, Be, Bi, Te, Sb, Se, As, Ge, Si, and B; and at least one third element selected from C and W to form the at least partially homogenized binder (e.g., the homogenized alloy binder including the first element, the second element, C, and W) of the consolidated structure.

As previously mentioned, following formation, the consolidated structure may be subjected to a supplemental homogenization process to further homogenize the at least partially homogenized binder thereof. If performed, the supplemental homogenization process may heat the consolidated structure to one or more temperatures above the liquidus temperature of the at least partially homogenized binder thereof for a sufficient period of time to reduce (e.g., substantially eliminate) macrosegregation within the at least partially homogenized binder and provide the resulting further homogenized binder with a single (e.g., only one) melting temperature. In some embodiments, such as in embodiments wherein the preliminary powder is employed to form the consolidated structure comprises discrete elemental particles, the at least partially homogenized binder of the consolidated structure may have multiple (e.g., at least two) melting temperatures following the densification process due to one or more regions of at least partially homogenized binder exhibiting different material composition(s) than one or more other regions of at least partially homogenized binder. Such different regions may, for example, form as a result of efficacy margins in source powder mixing and cold consolidation. In such embodiments, the supplemental homogenization process may substantially melt and homogenize the at least partially homogenized binder to remove the regions exhibiting different material composition(s) and provide the further homogenized binder with only one melting point. Providing the homogenized binder of the consolidated structure with only one melting point may be advantageous for the subsequent formation of a cutting table using the consolidated structure, as described in further detail below. In additional embodiments, such as in embodiments wherein the at least partially homogenized binder of the consolidated structure is already substantially homogeneous (e.g., does not include regions exhibiting different material composition(s) than other regions thereof) following the densification process, the supplemental homogenization process may be omitted.

Figure 3B:
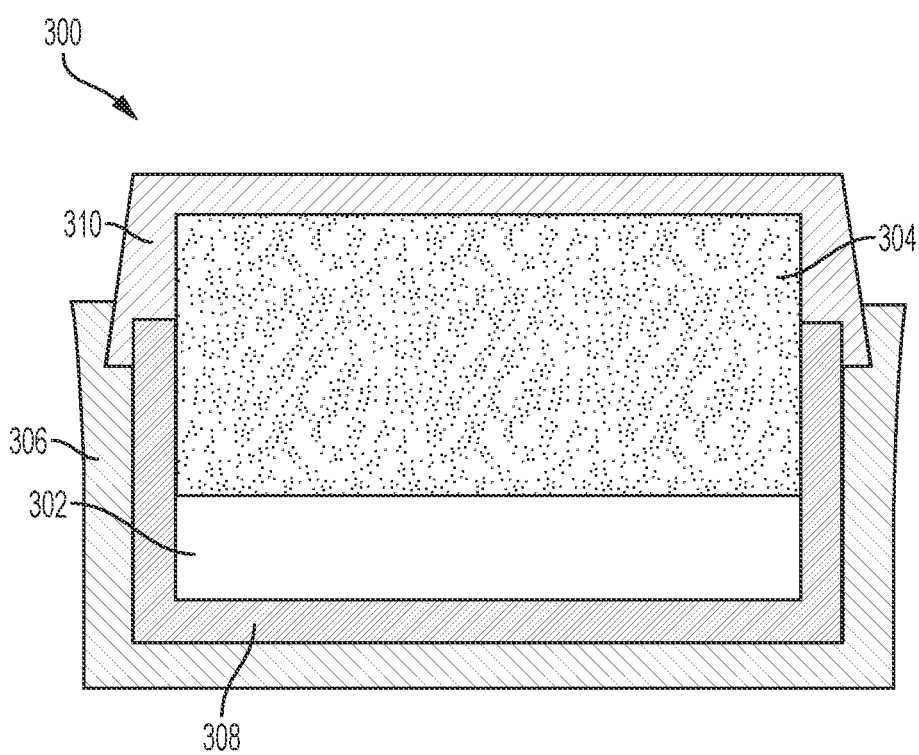

Referring next to FIG. 3B, the diamond-containing material 301 (FIG. 3A) and the supporting substrate 304 may be subjected to HTHP processing to form a cutting table 302. The HTHP processing may include subjecting the diamond-containing material 301 and the supporting substrate 304 to elevated temperatures and elevated pressures in a directly pressurized and/or indirectly heated cell for a sufficient time to convert the discrete diamond particles of the diamond-containing material 301 into inter-bonded diamond particles. The temperatures (e.g., sintering temperature(s)) employed within the heated, pressurized cell may be greater than the solidus temperature (e.g., greater than the solidus temperature and less than or equal to the liquidus temperature, greater than or equal to the liquidus temperature, etc.) of the homogenized binder of the supporting substrate 304, and pressures within the heated, pressurized cell may be greater than or equal to about 2.0 GPa (e.g., greater than or equal to about 3.0 GPa, such as greater than or equal to about 4.0 GPa, greater than or equal to about 5.0 GPa, greater than or equal to about 6.0 GPa, greater than or equal to about 7.0 GPa, greater than or equal to about 8.0 GPa, or greater than or equal to about 9.0 GPa). The temperature(s) employed during the HTHP processing to form the cutting table 302 at least partially depend on the pressure(s) employed during the HTHP processing, and on the material composition of the homogenized binder of the supporting substrate 304. Employing pressure(s) above atmospheric pressure (1 atm) during the HTHP processing may affect (e.g., shift) meta-stability lines (e.g., phase boundaries) of the liquid (L)+ diamond (D)+metal carbide (MC) phase field, which may influence (e.g., compel the increase of) the temperature(s) employed to form the cutting table 302. In addition, the material composition of the homogenized binder of the supporting substrate 304 may affect (e.g., increase, decrease) the melting temperature(s) of the homogenized binder, and may also affect (e.g., shift) the metastability lines of the L+D+MC+κ-carbide phase field, which may also impact (e.g., compel the increase of) the temperature(s) employed to form the cutting table 302. The diamond-containing material 301 and the supporting substrate 304 may be held at selected temperatures and pressures within the heated, pressurized cell for a sufficient amount of time to facilitate the inter-bonding of the discrete diamond particles of the diamond-containing material 301, such as a period of time between about 30 seconds and about 20 minutes.

During the HTHP processing, the homogenized binder of the supporting substrate 304 melts and a portion thereof is swept (e.g., mass transported, diffused) into the diamond-containing material 301 (FIG. 3A). The homogenized binder received by the diamond-containing material 301 catalyzes the formation of inter-granular bonds between the discrete diamond particles of the diamond-containing material 301 to form inter-bonded diamond particles, and also facilitates the formation of a thermally stable material (e.g., the thermally stable material 118 previously described with reference to FIG. 2) within interstitial spaces between the inter-bonded diamond particles of the cutting table 302. When the homogenized binder is in a liquid phase, the second element (e.g., one or more of Al, Ga, Sn, Be, Bi, Te, Sb, Se, As, Ge, Si, and B) of the homogenized binder may reduce the reactivity of the first element (e.g., Sc, Ti, V, Cr, Mn, Fe, Co, Ni, Cu, Zn, Y, Zr, Nb, Mo, Tc, Ru, Rh, Pd, Ag, Cd, Hf, Ta, Re, Os, Ir, Pt, Au, Hg, La, Ce, Pr, Nd, Pm, Sm, Eu, Gd, Tb, Dy, Ho, Er, Tm, Yb, Lu, Ac, Th, Pa, and U) of the homogenized binder with C, permitting the first element to catalyze the formation of inter-granular bonds between the discrete diamond particles of the diamond-containing material 301 (FIG. 3A) and also promoting the formation of non-binary carbide precipitates (e.g., ternary κ-carbide precipitates, ternary non-κ-carbide precipitates, quaternary κ-carbide precipitates, quaternary non-κ-carbide precipitates) within the interstitial spaces between the inter-bonded diamond particles of the cutting table 302. The thermally stable material of the cutting table 302 may render the cutting table 302 thermally stable without needing to leach the cutting table 302. For example, the thermally stable material may not significantly promote carbon transformations (e.g., graphite-to-diamond or vice versa) as compared to conventional cutting tables including inter-bonded diamond particles substantially exposed to conventional catalyst materials (e.g., catalytic Co, catalytic Fe, catalytic Ni) within interstitial spaces between the inter-bonded diamond particles. Accordingly, the thermally stable material may render the cutting table 302 more thermally stable than conventional cutting tables.

Since the diamond-containing material 301 (FIG. 3A) is provided directly on the supporting substrate 304, the types, amounts, and distributions of individual elements swept into the diamond-containing material 301 during the HTHP processing is substantially the same as the types, amounts, and distributions of individual elements of the homogenized binder of the supporting substrate 304. Put another way, the material composition (including the types, amounts, and distributions of the individual elements thereof) of the homogenized binder diffused into the diamond-containing material 301 during the HTHP processing to form the cutting table 302 is substantially the same as the material composition of homogenized binder within the supporting substrate 304 prior to the HTHP processing. For example, if the homogenized binder of the supporting substrate 304 comprises a ratio of at least one first element selected from Sc, Ti, V, Cr, Mn, Fe, Co, Ni, Cu, Zn, Y, Zr, Nb, Mo, Tc, Ru, Rh, Pd, Ag, Cd, Hf, Ta, Re, Os, Ir, Pt, Au, Hg, La, Ce, Pr, Nd, Pm, Sm, Eu, Gd, Tb, Dy, Ho, Er, Tm, Yb, Lu, Ac, Th, Pa, and U to at least one second element selected from Al, Ga, Sn, Be, Bi, Te, Sb, Se, As, Ge, Si, and B of about 9:1, a ratio of the first element to the second element swept into to the diamond-containing material 301 during the HTHP processing will also be about 9:1. Accordingly, providing the diamond-containing material 301 directly on the supporting substrate 304 may ensure that desired and predetermined sweep chemistries are provided into the diamond-containing material 301 during the HTHP processing.

In addition, providing the diamond-containing material 301 (FIG. 3A) directly on the supporting substrate 304 may reduce melting-point-based complexities associated with providing desired sweep chemistries into the diamond-containing material 301 during the HTHP processing as compared to configurations wherein a structure having a different material composition than the homogenized binder of the supporting substrate 304 is provided between the diamond-containing material 301 and the supporting substrate 304. For example, providing the diamond-containing material 301 directly on the supporting substrate 304 may permit a desired material composition (e.g., the material composition of the homogenized binder of the supporting substrate 304) to be swept into the diamond-containing material 301 using a single temperature (e.g., the melting temperature of the homogenized binder) and/or a relatively narrower temperature range, whereas providing a structure between the diamond-containing material 301 and the supporting substrate 304 may require exposing the diamond-containing material 301, the structure, and the supporting substrate 304 to multiple temperatures (e.g., the melting temperature of the structure, and the melting temperature of the homogenized binder of the supporting substrate 304) and/or a relatively wider temperature range to permit a desired material composition (e.g., a combination of the material compositions of the structure and the homogenized binder of the supporting substrate 304) to be swept into the diamond-containing material 301 during the HTHP processing.

Optionally, following formation, the cutting table 302 may be subjected to at least one solution treatment process to modify the material composition of the thermally stable material thereof. The solution treatment process may, for example, decompose carbide precipitates (e.g., κ-carbide precipitates, non-κ-carbide precipitates) of the thermally stable material into to one or more other precipitates. By way of non-limiting example, if at least the homogenized binder of the supporting substrate 304 effectuates the formation of a thermally stable material including κ-carbide precipitates in the cutting table 302, the cutting table 302 may optionally be subjected to a solution treatment process that heats the thermally stable material at least to a decomposition temperature of the κ-carbide precipitates (e.g., a temperature greater than or equal to about 1000° C., such as from about 1000° C. to about 1500° C., or from about 1300° C. to about 1500° C.) at a pressure above the Berman-Simon line to decompose the κ-carbide precipitates and form FCC $L1_2$ phase precipitates. If employed, the cutting table 302 may be subjected to a single (e.g., only one) solution treatment process employing a single temperature under pressure above the Berman-Simon line, or may be subjected to multiple (e.g., more than one) solution treatment processes employing different temperatures under pressure above the Berman-Simon line. Multiple solution treatment processes at different temperatures may, for example, facilitate the formation of precipitates (e.g., FCC $L1_2$ phase precipitates) having different particle sizes than one another. Relatively larger precipitate sizes may enhance high-temperature properties (e.g., creep rupture properties) of the thermally stable material, and relatively smaller precipitate sizes may enhance room-temperature properties of the thermally stable material.

In additional embodiments, the cutting element 100 previously described with reference to FIG. 1 may be formed through methods other than that described with reference to FIGS. 3A and 3B. For example, an embodiment of another method of forming the cutting element 100 (FIG. 1) will now be described with reference to FIGS. 4A and 4B, which illustrate simplified cross-sectional views of a container 400 in another process of forming the cutting element 100 shown in FIG. 1. With the description provided below, it will be readily apparent to one of ordinary skill in the art that the methods described herein may be used in various devices. In other words, the methods of the disclosure may be used whenever it is desired to form a thermally stable structure, such as a thermally stable cutting table (e.g., a thermally stable diamond table, such as a thermally stable PDC), for an earth-boring tool.

Figure 4A:
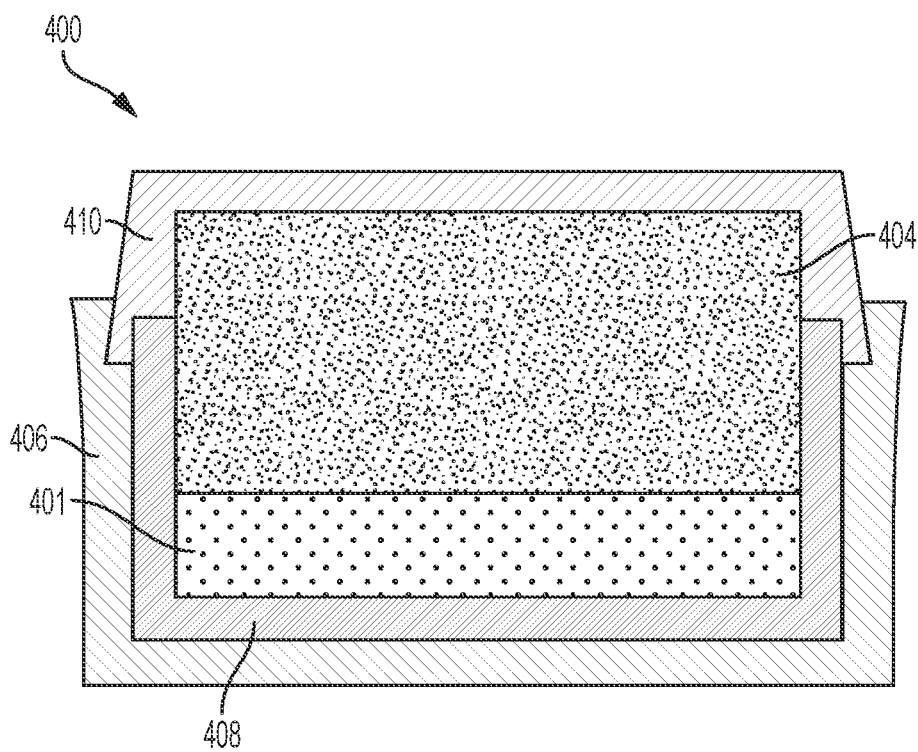
FIGS. 4A and 4B are simplified cross-sectional views of a container in a process of forming a cutting element, in accordance with additional embodiments of the disclosure.

Referring to FIG. 4A, a diamond-containing material 401 may be provided within the container 400, and a supporting substrate 404 may be provided on or over the diamond-containing material 401. The container 400 may substantially surround and hold the diamond-containing material 401 and the supporting substrate 404. As shown in FIG. 4A, the container 400 may include an inner cup 408 in which the diamond-containing material 401 and a portion of the supporting substrate 404 may be disposed, a bottom end piece 406 in which the inner cup 408 may be at least partially disposed, and a top end piece 410 surrounding the supporting substrate 404 and coupled (e.g., swage bonded) to one or more of the inner cup 408 and the bottom end piece 406. In additional embodiments, the bottom end piece 406 may be omitted (e.g., absent).

The diamond-containing material 401 (e.g., diamond powder) may be formed of and include discrete diamond particles, and discrete alloy particles formulated to facilitate the formation of a compact structure (e.g., a cutting table, such as a PDC table) including inter-bonded diamond particles and a thermally stable material (e.g., the thermally stable material 118 previously described with reference to FIG. 2) within interstitial spaces between the inter-bonded diamond particles (e.g., the inter-bonded diamond particles 114 of the cutting table 102 previously described with reference to FIG. 2) following subsequent HTHP processing.

The discrete diamond particles of the diamond-containing material 401 may comprise one or more of discrete natural diamond particles, and discrete synthetic diamond particles. The discrete diamond particles may individually exhibit a desired particle size. The discrete diamond particles may comprise, for example, one or more of micro-sized diamond particles and nano-sized diamond particles. In addition, each of the discrete diamond particles may individually exhibit a desired shape, such as at least one of a spherical shape, a hexahedral shape, an ellipsoidal shape, a cylindrical shape, a conical shape, or an irregular shape. In some embodiments, each of the discrete diamond particles of the diamond-containing material 401 exhibits a substantially spherical shape. The discrete diamond particles may be monodisperse, wherein each of the discrete diamond particles exhibits substantially the same material composition, size, and shape, or may be polydisperse, wherein at least one of the discrete diamond particles exhibits one or more of a different material composition, a different particle size, and a different shape than at least one other of the discrete diamond particles. The discrete diamond particles may be formed by conventional processes, which are not described herein.

The discrete alloy particles of the diamond-containing material 401 may individually be formed of and include a homogenized alloy (e.g., a homogenized peritectic alloy) of at least one first element selected from Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, La, Ce, Pr, Nd, Pm, Sm, Eu, Gd, Tb, Dy, Ho, Er, Tm, Yb, Lu, Ac, Th, Pa, and U, and at least one second element selected from Al, Ga, Sn, Be, Bi, Te, Sb, Se, As, Ge, Si, B, and P. The discrete alloy particles may each individually include any amounts of the first element and the second element able to facilitate (e.g., catalyze) the inter-bonding of the discrete diamond particles during subsequent HTHP processing, and able to facilitate the formation of a thermally stable material (e.g., the thermally stable material 118 previously described with reference to FIG. 2) within interstitial spaces between the inter-bonded diamond particles (e.g., the inter-bonded diamond particles 114 previously described with reference to FIG. 2). The discrete alloy particles of the diamond-containing material 401 may each individually have a liquidus temperature greater than or equal to about 525° C., such as within a range of from about 525° C. to about 1500° C. By way of non-limiting example, each of the discrete alloy particles may individually comprise a homogenized alloy selected from $Sm_3Sn$, $Sm_3Bi$, $Sm_3Te$, $Sm_3P$, $Sm_3Si$, $Sm_3Ga$, $Sc_3Sn$, $Sc_3Ge$, $Sc_3Sb$, $Sc_3As$, $Sm_3Be$, $Sc_3P$, $Sc_3Si$, $Y_3Sn$, $Sc_3Bi$, Tm$_3$Sn, Er$_3$Sn, Sc$_3$Te, Y$_3$Sb, Sc$_3$Se, Ho$_3$Sn, Sc$_3$Ga, Dy$_3$Sn, Y$_3$Bi, Tb$_3$Sn, Tm$_3$Sb, Er$_3$Sb, Lu$_3$Sb, Lu$_3$Ge, Ti$_3$Ga, Ti$_3$Ge, Gd$_3$Sn, Tb$_3$Sb, Y$_3$Ge, Er$_3$Bi, Ho$_3$Bi, Tm$_3$Bi, Lu$_3$As, Tm$_3$Ge, Dy$_3$Bi, Lu$_3$Bi, Tm$_3$As, Tb$_3$Bi, Ti$_3$Sn, Er$_3$As, Ti$_3$Si, Y$_3$Te, Gd$_3$Bi, Ce$_3$Te, Ti$_3$Al, Zr$_3$Sn, Dy$_3$As, La$_3$Bi, Sc$_3$Al, Yb$_3$Se, Tb$_3$As, Lu$_3$P, Yb$_3$Te, Lu$_3$Sn, Eu$_3$Se, Er$_3$Te, Ti$_3$Sb, Lu$_3$Si, Tm$_3$Te, Tm$_3$P, Gd$_3$Te, Gd$_3$As, Zr$_3$Sb, Lu$_3$Ga, Er$_3$P, Sm$_3$B, Lu$_3$Te, Ho$_3$P, Tm$_3$Si, Er$_3$Si, Dy$_3$P, Tm$_3$Ga, Ce$_3$As, Y$_3$Ga, Ho$_3$Si, Tb$_3$P, Er$_3$Ga, Dy$_3$Si, Eu$_3$Bi, Hf$_3$Ga, Ho$_3$Ga, Gd$_3$P, Gd$_3$Se, Lu$_3$Al, Ce$_3$Sn, Tb$_3$Si, Hf$_3$Sn, Dy$_3$Ga, Tm$_3$Al, Gd$_3$Si, Ti$_3$Bi, Tb$_3$Ga, Er$_3$Al, Yb$_3$Bi, Yb$_3$Sb, La$_3$P, Eu$_3$As, Fe$_3$Al, Ho$_3$Al, Gd$_3$Ga, Yb$_3$As, Th$_3$Bi, Ac$_3$Sb, Th$_3$Sn, Tb$_3$Al, Eu$_3$P, Fe$_3$Si, Ti$_3$Be, Yb$_3$P, Gd$_3$Al, Hf$_3$P, V$_3$Si, Ce$_3$Si, V$_3$Ge, Fe$_3$Ga, Rh$_3$Al, Th$_3$Ge, V$_3$Al, Fe$_3$Ge, V$_3$Ga, Th$_3$P, V$_3$P, V$_3$Sn, Fe$_3$Sn, Zr$_3$Be, Hf$_3$Be, Nb$_3$Ga, Sc$_3$Be, Th$_3$Al, V$_3$Sb, Ce$_3$Al, Co$_3$Al, V$_3$As, Ni$_3$Al, Co$_3$Ga, Ti$_3$B, Rh$_3$Ga, Fe$_3$Be, Fe$_3$Sb, Sc$_3$B, U$_3$P, Fe$_3$P, Co$_3$Si, Hf$_3$Bi, V$_3$Be, V$_3$Te, Ni$_3$Ga, Lu$_3$Be, Mn$_3$Al, Ru$_3$Al, Fe$_3$As, Ta$_3$Sn, Mn$_3$Si, V$_3$Se, U$_3$Se, Co$_3$Sn, Co$_3$Be, Co$_3$Ge, U$_3$Si, Cr$_3$Si, V$_3$Bi, Tc$_3$Al, La$_3$Si, Rh$_3$Sn, Cr$_3$Al, U$_3$As, Mn$_3$Ga, Th$_3$Si, Rh$_3$Be, Ni$_3$Be, Mn$_3$Ge, Cr$_3$Ge, Pd$_3$Al, and Cr$_3$Ga. In some embodiments, the discrete alloy particles are substantially free of Co. In additional embodiments, the discrete alloy particles are substantially free of Ni. In further embodiments, the discrete alloy particles are substantially free of Fe. In still further embodiments, the discrete alloy particles are substantially free of each of Co, Ni, and Fe. Each of the discrete alloy particles may include substantially the same elements and element ratios of as each other of the discrete alloy particles, or one or more of the discrete alloy particles may include different elements and/or different element ratios than one or more other of the discrete alloy particles. In some embodiments, each of the discrete alloy particles has substantially the same elements and element ratios as each other of the discrete alloy particles.

Each of the discrete alloy particles of the diamond-containing material 401 may individually exhibit a desired particle size, such as a particle size less than or equal to about 1000 μm. The discrete alloy particles may comprise, for example, one or more of discrete micro-sized particles and discrete nano-sized particles. In addition, each of the discrete alloy particles of the diamond-containing material 401 may individually exhibit a desired shape, such as one or more of a spherical shape, a hexahedral shape, an ellipsoidal shape, a cylindrical shape, a conical shape, or an irregular shape. The discrete particles of the diamond-containing material 401 may be monodisperse, wherein each of the discrete alloy particles exhibits substantially the same size and substantially the same shape, or may be polydisperse, wherein at least one of the discrete alloy particles exhibits one or more of a different particle size and a different shape than at least one other of the discrete alloy particles. In some embodiments, the discrete alloy particles of the diamond-containing material 401 have a multi-modal (e.g., bi-modal, tri-modal, etc.) particle size distribution. For example, the diamond-containing material 401 may include a combination of relatively larger, discrete alloy particles and relatively smaller, discrete alloy particles. In additional embodiments, the discrete alloy particles of the diamond-containing material 401 have a mono-modal particle size distribution.

The discrete alloy particles of the diamond-containing material 401 may be formed by conventional processes (e.g., ball milling processes, attritor milling processes, cryomilling processes, jet milling processes, powder atomization processes, etc.), which are not described herein. As a non-limiting example, an initial powder formed of and including particles of at least one first element selected from Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, La, Ce, Pr, Nd, Pm, Sm, Eu, Gd, Tb, Dy, Ho, Er, Tm, Yb, Lu, Ac, Th, Pa, and U, and at least one second element selected from Al, Ga, Sn, Be, Bi, Te, Sb, Se, As, Ge, Si, B, and P, alloys thereof, and/or combinations thereof may be provided into an attritor mill containing mixing structures (e.g., mixing spheres, mixing bars, etc.), and may then be subjected to a mechanical alloying process until the discrete alloy particles are formed. During the mechanical alloying process collisions between the mixing structures and the initial powder may cause particles of different materials to fracture and/or be welded or smeared together. Relatively larger particles may fracture during the mechanical welding process and relatively smaller particles may weld together, eventually forming discrete alloy particles each individually comprising a substantially homogeneous mixture of the constituents of the initial powder in substantially the same proportions of the initial powder. As another non-limiting example, an alloy material may be formed by conventional melting and mixing processes, and then the alloy material may be formed into the discrete alloy particles by one or more conventional atomization processes.

The diamond-containing material 401 may exhibit a substantially homogeneous distribution of the discrete diamond particles and the discrete alloy particles. The discrete diamond particles and the discrete alloy particles may be combined (e.g., mixed) with one another to form the diamond-containing material 401 exhibiting the substantially homogeneous distribution of the discrete diamond particles and the discrete alloy particles using conventional processes (e.g., conventional milling processes, such as conventional ball milling processes, conventional attritor milling processes, conventional cryomilling processes, conventional jet milling processes, etc.), which are not described in detail herein.

The supporting substrate 404 may be formed of and include a material that is relatively hard and resistant to wear. By way of non-limiting example, the supporting substrate 404 may be formed from and include a ceramic-metal composite material (also referred to as a "cermet" material). In some embodiments, the supporting substrate 404 is formed of and includes a cemented carbide material including carbide particles cemented together in a binder material. The carbide particles of the supporting substrate 404 may, for example, individually include one or more chemical compounds of W and C, such as WC, W$_2$C, or combinations of WC and W$_2$C. In some embodiments, the carbide particles comprise WC particles each including stoichiometric quantities or near stoichiometric quantities of W and C. In additional embodiments, one or more of the carbide particles includes an excess amount of C than that stoichiometrically required to form WC. In further embodiments, one or more of the carbide particles includes an excess amount of W than that stoichiometrically required to form WC. The binder material of the supporting substrate 404 may comprise a catalytic binder material formulated to promote the formation of the inter-bonded diamond particles from discrete diamond particles during HTHP processing, or may comprise a non-catalytic binder material that does not promote the formation of the inter-bonded diamond particles from discrete diamond particles during HTHP processing. The supporting substrate 404 may have a material composition substantially the same as that of the supporting substrate 304 previously described with reference to FIGS. 3A and 3B, or may have a different material composition than that of the supporting substrate 304 previously described with reference to FIGS. 3A and 3B.

Figure 4B:
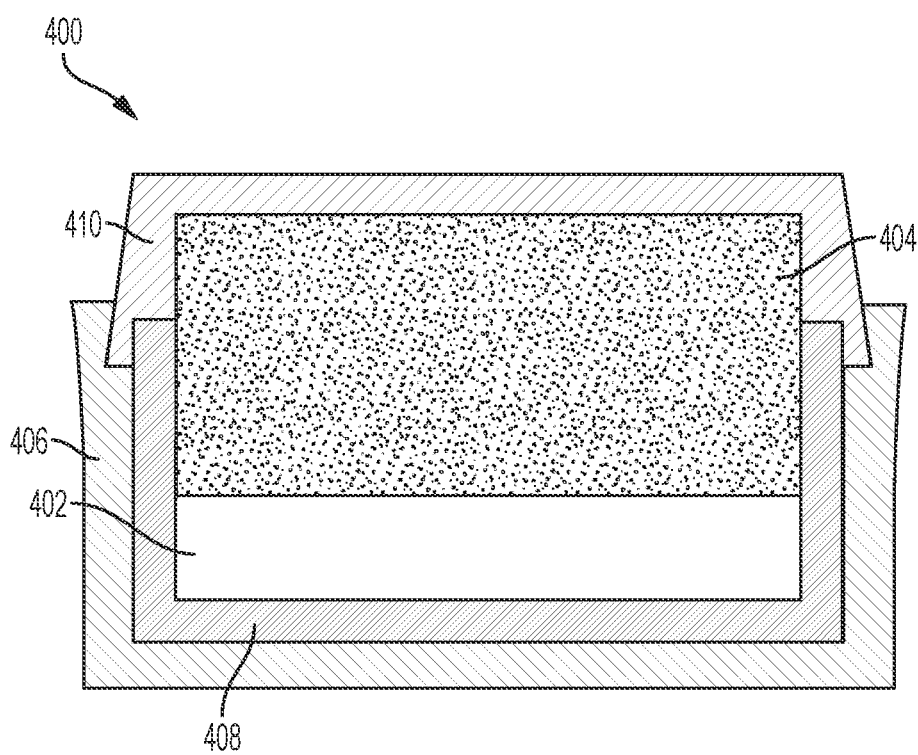

Referring next to FIG. 4B, the diamond-containing material 401 (FIG. 4A) and the supporting substrate 404 may be subjected to HTHP processing to form a cutting table 402. The HTHP processing may include subjecting the diamond-containing material 401 and the supporting substrate 404 to elevated temperatures and elevated pressures in a directly pressurized and/or indirectly heated cell for a sufficient time to convert the discrete diamond particles of the diamond-containing material 401 into inter-bonded diamond particles. The temperatures (e.g., sintering temperature(s)) employed within the heated, pressurized cell may be greater than the solidus temperature (e.g., greater than the solidus temperature and less than or equal to the liquidus temperature, greater than or equal to the liquidus temperature, etc.) of the discrete alloy particles of the diamond-containing material 401, and pressures within the heated, pressurized cell may be greater than or equal to about 2.0 GPa (e.g., greater than or equal to about 3.0 GPa, such as greater than or equal to about 4.0 GPa, greater than or equal to about 5.0 GPa, greater than or equal to about 6.0 GPa, greater than or equal to about 7.0 GPa, greater than or equal to about 8.0 GPa, or greater than or equal to about 9.0 GPa). The temperature(s) employed during the HTHP processing to form the cutting table 402 at least partially depend on the pressure(s) employed during the HTHP processing, and on the material composition of the discrete alloy particles of the diamond-containing material 401. Employing pressure(s) above atmospheric pressure (1 atm) during the HTHP processing may affect (e.g., shift) metastability lines (e.g., phase boundaries) of the liquid (L)+diamond (D)+metal carbide (MC) phase field, which may influence (e.g., compel the increase of) the temperature(s) employed to form the cutting table 402. In addition, the material composition of the discrete alloy particles of the diamond-containing material 401 may affect (e.g., increase, decrease) the melting temperature(s) of the discrete alloy particles, and may also affect (e.g., shift) the metastability lines of the L+D+MC+κ-carbide phase field, which may also impact (e.g., compel the increase of) the temperature(s) employed to form the cutting table 402. The diamond-containing material 401 and the supporting substrate 404 may be held at selected temperatures and pressures within the heated, pressurized cell for a sufficient amount of time to facilitate the inter-bonding of the discrete diamond particles of the diamond-containing material 401, such as a period of time between about 30 seconds and about 20 minutes.

During the HTHP processing, the discrete alloy particles of the diamond-containing material 401 (FIG. 4A) melt and catalyze the formation of inter-granular bonds between the discrete diamond particles of the diamond-containing material 401 to form the inter-bonded diamond particles of the cutting table 402, and also facilitate the formation of a thermally stable material (e.g., the thermally stable material 118 previously described with reference to FIG. 2) within interstitial spaces between the inter-bonded diamond particles of the cutting table 402. When the homogenized alloy of the discrete alloy particles is in a liquid phase, the second element (e.g., one or more of Al, Ga, Sn, Be, Bi, Te, Sb, Se, As, Ge, Si, and B) of the homogenized alloy may reduce the reactivity of the first element (e.g., Sc, Ti, V, Cr, Mn, Fe, Co, Ni, Cu, Zn, Y, Zr, Nb, Mo, Tc, Ru, Rh, Pd, Ag, Cd, Hf, Ta, Re, Os, Ir, Pt, Au, Hg, La, Ce, Pr, Nd, Pm, Sm, Eu, Gd, Tb, Dy, Ho, Er, Tm, Yb, Lu, Ac, Th, Pa, and U) of the homogenized alloy with C, permitting the first element to catalyze the formation of inter-granular bonds between the discrete diamond particles of the diamond-containing material 401 and also promoting the formation of non-binary carbide precipitates (e.g., ternary κ-carbide precipitates, ternary non-κ-carbide precipitates, quaternary κ-carbide precipitates, quaternary non-κ-carbide precipitates) within the interstitial spaces between the inter-bonded diamond particles of the cutting table 402. Even if the first element comprises an element (e.g., Co, No, Ag, Cu, Au, Pt, Tc) that is not highly reactive with C to form a binary carbide, the second element may enhance the stability properties (e.g., thermal stability properties, mechanical stability properties) of the cutting table 402 by facilitating the formation of carbide precipitates (e.g., κ-carbide precipitates, non-κ-carbide precipitates) having formula (1) above. The thermally stable material of the cutting table 402 may render the cutting table 402 thermally stable without needing to leach the cutting table 402. For example, the thermally stable material may not significantly promote carbon transformations (e.g., graphite-to-diamond or vice versa) as compared to conventional cutting tables including inter-bonded diamond particles substantially exposed to conventional catalyst materials (e.g., catalytic Co, catalytic Fe, catalytic Ni) within interstitial spaces between the inter-bonded diamond particles. Accordingly, the thermally stable material may render the cutting table 402 more thermally stable than conventional cutting tables.

Optionally, following formation, the cutting table 402 may be subjected to at least one solution treatment process to modify the material composition of the thermally stable material thereof. The solution treatment process may, for example, decompose carbide precipitates (e.g., κ-carbide precipitates, non-κ-carbide precipitates) of the thermally stable material into to one or more other precipitates. By way of non-limiting example, if at least the discrete alloy particles of the diamond-containing material 401 (FIG. 4A) effectuate the formation of a thermally stable material including κ-carbide precipitates in the cutting table 402, the cutting table 402 may optionally be subjected to a solution treatment process that heats the thermally stable material at least to a decomposition temperature of the κ-carbide precipitates (e.g., a temperature greater than or equal to about 1000° C., such as from about 1000° C. to about 1500° C., or from about 1300° C. to about 1500° C.) at a pressure above the Berman-Simon line to decompose the κ-carbide precipitates and form FCC $L1_2$ phase precipitates. If employed, the cutting table 402 may be subjected to a single (e.g., only one) solution treatment process employing a single temperature under pressure above the Berman-Simon line, or may be subjected to multiple (e.g., more than one) solution treatment processes employing different temperatures under pressure above the Berman-Simon line. Multiple solution treatment processes at different temperatures may, for example, facilitate the formation of precipitates (e.g., FCC $L1_2$ phase precipitates) having different particle sizes than one another. Relatively larger precipitate sizes may enhance high-temperature properties (e.g., creep rupture properties) of the thermally stable material, and relatively smaller precipitate sizes may enhance room-temperature properties of the thermally stable material.

In further embodiments, the cutting element 100 previously described with reference to FIG. 1 may be formed through methods other than those previously described with reference to FIGS. 3A and 3B and with reference to FIGS. 4A and 4B. For example, an embodiment of another method of forming the cutting element 100 (FIG. 1) will now be described with reference to FIGS. 5A and 5B, which illustrate simplified cross-sectional views of a container 500 in another process of forming the cutting element 100 shown in FIG. 1. With the description provided below, it will be readily apparent to one of ordinary skill in the art that the methods described herein may be used in various devices. In other words, the methods of the disclosure may be used whenever it is desired to form a thermally stable structure, such as a thermally stable cutting table (e.g., a thermally stable diamond table, such as a thermally stable PDC), for an earth-boring tool.

Figure 5A:
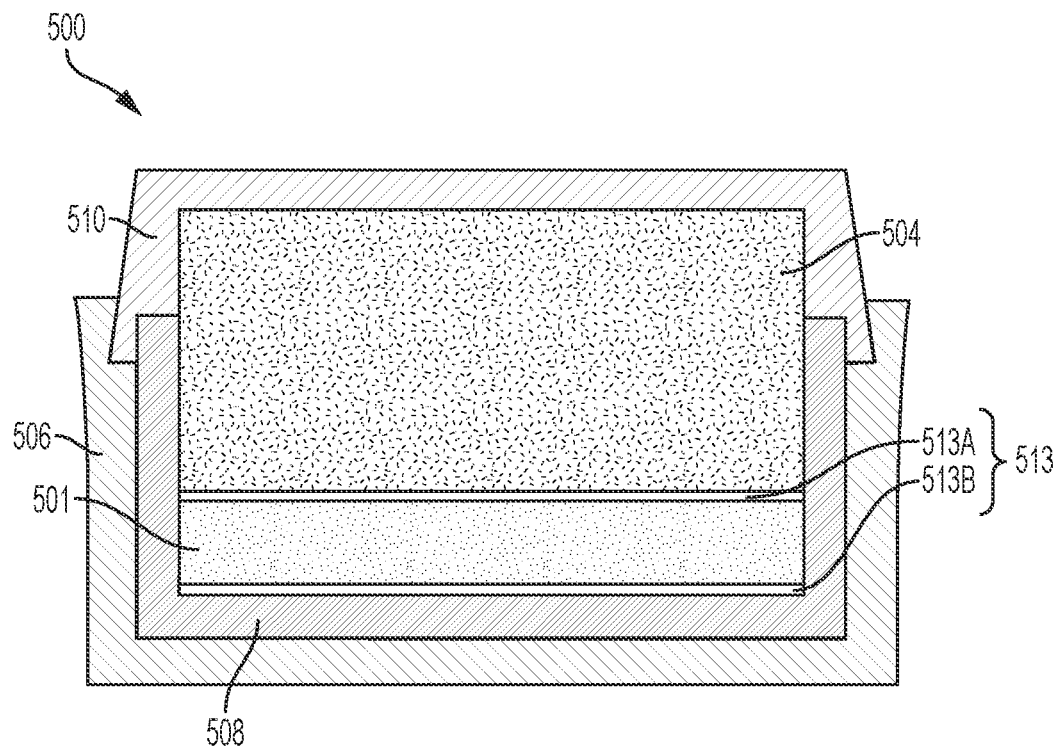
FIGS. 5A and 5B are simplified cross-sectional views of a container in a process of forming a cutting element, in accordance with further embodiments of the disclosure.

Referring to FIG. 5A, a diamond-containing material 501 may be provided within the container 500, a supporting substrate 504 may be provided on or over the diamond-containing material 501, and an alloy material 513 on at least the diamond-containing material 501. The container 500 may substantially surround and hold the diamond-containing material 501, the supporting substrate 504, and the alloy material 513. As shown in FIG. 5A, the container 500 may include an inner cup 508 in which the diamond-containing material 501, the alloy material 513, and a portion of the supporting substrate 504 may be disposed; a bottom end piece 506 in which the inner cup 508 may be at least partially disposed; and a top end piece 510 surrounding the supporting substrate 504 and coupled (e.g., swage bonded) to one or more of the inner cup 508 and the bottom end piece 506. In additional embodiments, the bottom end piece 506 may be omitted (e.g., absent).

The diamond-containing material 501 (e.g., diamond powder) may be formed of and include discrete diamond particles (e.g., discrete natural diamond particles, discrete synthetic diamond particles, combinations thereof, etc.). The discrete diamond particles may individually exhibit a desired particle size. The discrete diamond particles may comprise, for example, one or more of micro-sized diamond particles and nano-sized diamond particles. In addition, each of the discrete diamond particles may individually exhibit a desired shape, such as at least one of a spherical shape, a hexahedral shape, an ellipsoidal shape, a cylindrical shape, a conical shape, or an irregular shape. In some embodiments, each of the discrete diamond particles of the diamond-containing material 501 exhibits a substantially spherical shape. The discrete diamond particles may be monodisperse, wherein each of the discrete diamond particles exhibits substantially the same material composition, size, and shape, or may be polydisperse, wherein at least one of the discrete diamond particles exhibits one or more of a different material composition, a different particle size, and a different shape than at least one other of the discrete diamond particles. The diamond-containing material 501 may have a material composition substantially the same as that of the diamond-containing material 301 previously described with reference to FIGS. 3A and 3B, may have a material composition substantially the same as that of the diamond-containing material 401 previously described with reference to FIGS. 4A and 4B, or may have a material composition different than that of each of the diamond-containing material 301 previously described with reference to FIGS. 3A and 3B and the diamond-containing material 401 previously described with reference to FIGS. 4A and 4B. In some embodiments, the diamond-containing material 501 is substantially free of discrete alloy particles dispersed amongst the discrete diamond particles thereof. The diamond-containing material 501 may be formed by conventional processes, which are not described herein.

The supporting substrate 504 may be formed of and include a material that is relatively hard and resistant to wear. By way of non-limiting example, the supporting substrate 504 may be formed from and include a ceramic-metal composite material. In some embodiments, the supporting substrate 504 is formed of and includes a cemented carbide material including carbide particles cemented together in a binder material. The carbide particles of the supporting substrate 504 may, for example, individually include one or more chemical compounds of W and C, such as WC, $W_2C$, or combinations of WC and $W_2C$. In some embodiments, the carbide particles comprise WC particles each including stoichiometric quantities or near stoichiometric quantities of W and C. In additional embodiments, one or more of the carbide particles include an excess amount of C than that stoichiometrically required to form WC. In further embodiments, one or more of the carbide particles includes an excess amount of W than that stoichiometrically required to form WC. The binder material of the supporting substrate 404 may comprise a catalytic binder material formulated to promote the formation of the inter-bonded diamond particles from discrete diamond particles during HTHP processing, or may comprise a non-catalytic binder material that does not promote the formation of the inter-bonded diamond particles from discrete diamond particles during HTHP processing. The supporting substrate 504 may have a material composition substantially the same as that of the supporting substrate 304 previously described with reference to FIGS. 3A and 3B, may have a material composition substantially the same as that of the supporting substrate 404 previously described with reference to FIGS. 4A and 4B, or may have a material composition different than that of each of the supporting substrate 304 previously described with reference to FIGS. 3A and 3B and the supporting substrate 404 previously described with reference to FIGS. 4A and 4B.

The alloy material 513 may be provided directly adjacent one or more outermost (e.g., peripheral) boundaries of the diamond-containing material 501. The alloy material 513 may be provided directly adjacent opposing outermost boundaries of the diamond-containing material 501 and the supporting substrate 504, such that at least a portion of the alloy material 513 intervenes between the diamond-containing material 501 and the supporting substrate 504; and/or may be provided directly adjacent outermost boundaries of the diamond-containing material 501 not opposing an outermost boundary of the supporting substrate 504, such that at least a portion of the alloy material 513 does not intervene between the diamond-containing material 501 and the supporting substrate 504. For example, as shown in FIG. 5A, a first volume 513A of the alloy material 513 may be located directly adjacent opposing outermost boundaries of the diamond-containing material 501 and the supporting substrate 504, and a second volume 513B of the alloy material 513 may be located directly adjacent one or more other outermost boundaries of the diamond-containing material 501. In some embodiments, the alloy material 513 only includes the first volume 513A, such that the alloy material 513 is located directly adjacent opposing outermost boundaries of the diamond-containing material 501 and the supporting substrate 504, but does not substantially cover any other outermost boundaries of the diamond-containing material 501. In additional embodiments, the alloy material 513 only includes the second volume 513B, such that the alloy material 513 does not substantially intervene between diamond-containing material 501 and the supporting substrate 504, but does cover at least some other outermost boundaries (e.g., another outermost vertical boundary, outermost lateral boundaries) of the diamond-containing material 501. In further embodiments, the alloy material 513 includes the first volume 513A and the second volume 513B.

The alloy material 513 may be formed of and include at least one homogenized alloy (e.g., a homogenized peritectic alloy) of at least one first element selected from Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, La, Ce, Pr, Nd, Pm, Sm, Eu, Gd, Tb, Dy, Ho, Er, Tm, Yb, Lu, Ac, Th, Pa, and U, and at least one second element selected from Al, Ga, Sn, Be, Bi, Te, Sb, Se, As, Ge, Si, B, and P. The homogenized alloy may include any amounts of the first element and the second element able to facilitate (e.g., catalyze) the inter-bonding of the discrete diamond particles during subsequent HTHP processing, and able to facilitate the formation of a thermally stable material (e.g., the thermally stable material 118 previously described with reference to FIG. 2) within interstitial spaces between the inter-bonded diamond particles (e.g., the inter-bonded diamond particles 114 previously described with reference to FIG. 2). The homogenized alloy of the alloy material 513 may have a liquidus temperature greater than or equal to about 525° C., such as within a range of from about 525° C. to about 1500° C. By way of non-limiting example, the homogenized alloy may be selected from $Sm_3Sn$, $Sm_3Bi$, $Sm_3Te$, $Sm_3P$, $Sm_3Si$, $Sm_3Ga$, $Sc_3Sn$, $Sc_3Ge$, $Sc_3Sb$, $Sc_3As$, $Sm_3Be$, $Sc_3P$, $Sc_3Si$, $Y_3Sn$, $Sc_3Bi$, $Tm_3Sn$, $Er_3Sn$, $Sc_3Te$, $Y_3Sb$, $Sc_3Se$, $Ho_3Sn$, $Sc_3Ga$, $Dy_3Sn$, $Y_3Bi$, $Tb_3Sn$, $Tm_3Sb$, $Er_3Sb$, $Lu_3Sb$, $Lu_3Ge$, $Ti_3Ga$, $Ti_3Ge$, $Gd_3Sn$, $Tb_3Sb$, $Y_3Ge$, $Er_3Bi$, $Ho_3Bi$, $Tm_3Bi$, $Lu_3As$, $Tm_3Ge$, $Dy_3Bi$, $Lu_3Bi$, $Tm_3As$, $Tb_3Bi$, $Ti_3Sn$, $Er_3As$, $Ti_3Si$, $Y_3Te$, $Gd_3Bi$, $Ce_3Te$, $Ti_3Al$, $Zr_3Sn$, $Dy_3As$, $La_3Bi$, $Sc_3Al$, $Yb_3Se$, $Tb_3As$, $Lu_3P$, $Yb_3Te$, $Lu_3Sn$, $Eu_3Se$, $Er_3Te$, $Ti_3Sb$, $Lu_3Si$, $Tm_3Te$, $Tm_3P$, $Gd_3Te$, $Gd_3As$, $Zr_3Sb$, $Lu_3Ga$, $Er_3P$, $Sm_3B$, $Lu_3Te$, $Ho_3P$, $Tm_3Si$, $Er_3Si$, $Dy_3P$, $Tm_3Ga$, $Ce_3As$, $Y_3Ga$, $Ho_3Si$, $Tb_3P$, $Er_3Ga$, $Dy_3Si$, $Eu_3Bi$, $Hf_3Ga$, $Ho_3Ga$, $Gd_3P$, $Gd_3Se$, $Lu_3Al$, $Ce_3Sn$, $Tb_3Si$, $Hf_3Sn$, $Dy_3Ga$, $Tm_3Al$, $Gd_3Si$, $Ti_3Bi$, $Tb_3Ga$, $Er_3Al$, $Yb_3Bi$, $Yb_3Sb$, $La_3P$, $Eu_3As$, $Fe_3Al$, $Ho_3Al$, $Gd_3Ga$, $Yb_3As$, $Th_3Bi$, $Ac_3Sb$, $Th_3Sn$, $Tb_3Al$, $Eu_3P$, $Fe_3Si$, $Ti_3Be$, $Yb_3P$, $Gd_3Al$, $Hf_3P$, $V_3Si$, $Ce_3Si$, $V_3Ge$, $Fe_3Ga$, $Rh_3Al$, $Th_3Ge$, $V_3Al$, $Fe_3Ge$, $V_3Ga$, $Th_3P$, $V_3P$, $V_3Sn$, $Fe_3Sn$, $Zr_3Be$, $Hf_3Be$, $Nb_3Ga$, $Sc_3Be$, $Th_3Al$, $V_3Sb$, $Ce_3Al$, $CO_3Al$, $V_3As$, $Ni_3Al$, $Co_3Ga$, $Ti_3B$, $Rh_3Ga$, $Fe_3Be$, $Fe_3Sb$, $Sc_3B$, $U_3P$, $Fe_3P$, $Co_3Si$, $Hf_3Bi$, $V_3Be$, $V_3Te$, $Ni_3Ga$, $Lu_3Be$, $Mn_3Al$, $Ru_3Al$, $Fe_3As$, $Ta_3Sn$, $Mn_3Si$, $V_3Se$, $U_3Se$, $Co_3Sn$, $Co_3Be$, $Co_3Ge$, $U_3Si$, $Cr_3Si$, $V_3Bi$, $Tc_3Al$, $La_3Si$, $Rh_3Sn$, $Cr_3Al$, $U_3As$, $Mn_3Ga$, $Th_3Si$, $Rh_3Be$, $Ni_3Be$, $Mn_3Ge$, $Cr_3Ge$, $Pd_3Al$, and $Cr_3Ga$. In some embodiments, the homogenized alloy is substantially free of Co. In additional embodiments, the homogenized alloy is substantially free of Ni. In further embodiments, the homogenized alloy is substantially free of Fe. In still further embodiments, the homogenized alloy is substantially free of each of Co, Ni, and Fe.

The alloy material 513 may comprise at least one solid, substantially continuous alloy structure (e.g., an alloy foil, an alloy sheet, an alloy film, an alloy mesh) extending across (e.g., substantially across) one or more of the outermost boundaries (e.g., outermost vertical boundaries, outermost lateral boundaries) of at least the diamond-containing material 501; or may comprise a volume (e.g., group, cluster) of relatively smaller, discrete alloy structures (e.g., discrete alloy particles) positioned relative to one another to form a larger structure exhibiting a desired geometric configuration about the outermost boundaries of at least the diamond-containing material 501, but substantially free of bonds directly coupling the relatively smaller, discrete alloy structures to one another. In some embodiments, the alloy material 513 comprises a single (e.g., only one) alloy structure (e.g., an alloy foil, an alloy sheet, an alloy film, an alloy shim, an alloy mesh) laterally extending substantially completely across opposing outermost vertical boundaries of the diamond-containing material 501 and the supporting substrate 504. In additional embodiments, the alloy material 513 comprises a volume of discrete alloy particles that together laterally extend substantially completely across opposing outermost vertical boundaries of the diamond-containing material 501 and the supporting substrate 504. In further embodiments, the alloy material 513 comprises multiple (e.g., more than one) solid, substantially continuous alloy structures (e.g., alloy foils, alloy sheets, alloy films, alloy shims, alloy meshes, combinations thereof) that together extend substantially completely across one or more (e.g., only one, multiple, all) outermost boundaries (e.g., outermost vertical boundaries, outermost lateral boundaries) of the diamond-containing material 501. In yet further embodiments, the alloy material 513 comprises at least one volume of discrete alloy particles that together extend substantially completely across one or more (e.g., only one, multiple, all) outermost boundaries (e.g., outermost vertical boundaries, outermost lateral boundaries) of the diamond-containing material 501. In yet still further embodiments, the alloy material 513 comprises at least one solid, substantially continuous alloy structure (e.g., an alloy foil, an alloy sheet, an alloy film, an alloy shim, an alloy mesh) and at least one volume of discrete alloy particles that together extend substantially completely across one or more (e.g., only one, multiple, all) outermost boundaries (e.g., outermost vertical boundaries, outermost lateral boundaries) of the diamond-containing material 501.

Figure 5B:
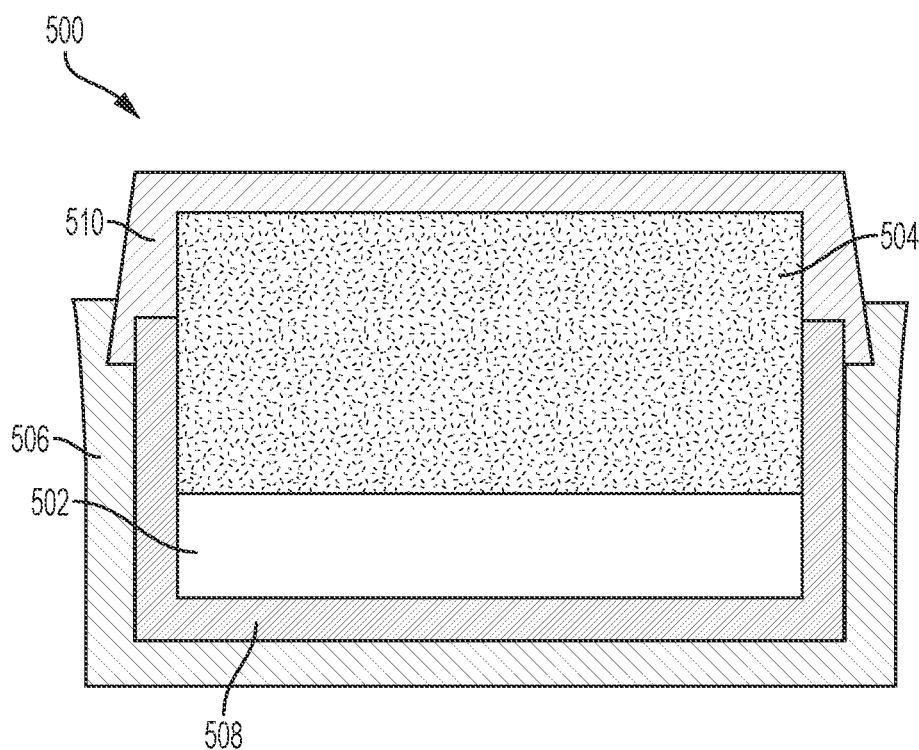

Referring next to FIG. 5B, the diamond-containing material 501 (FIG. 5A), the supporting substrate 504, and the alloy material 513 may be subjected to HTHP processing to form a cutting table 502. The HTHP processing may include subjecting the diamond-containing material 501, the supporting substrate 504, and the alloy material 513 to elevated temperatures and elevated pressures in a directly pressurized and/or indirectly heated cell for a sufficient time to convert the discrete diamond particles of the diamond-containing material 501 into inter-bonded diamond particles. The temperatures (e.g., sintering temperature(s)) employed within the heated, pressurized cell may be greater than the solidus temperature (e.g., greater than the solidus temperature and less than or equal to the liquidus temperature, greater than or equal to the liquidus temperature, etc.) of the homogenized alloy of the alloy material 513, and pressures within the heated, pressurized cell may be greater than or equal to about 2.0 GPa (e.g., greater than or equal to about 3.0 GPa, such as greater than or equal to about 4.0 GPa, greater than or equal to about 5.0 GPa, greater than or equal to about 6.0 GPa, greater than or equal to about 7.0 GPa, greater than or equal to about 8.0 GPa, or greater than or equal to about 9.0 GPa). The temperature(s) employed during the HTHP processing to form the cutting table 502 at least partially depend on the pressure(s) employed during the HTHP processing, and on the material composition of the homogenized alloy of the alloy material 513. Employing pressure(s) above atmospheric pressure (1 atm) during the HTHP processing may affect (e.g., shift) metastability lines (e.g., phase boundaries) of the liquid (L)+diamond (D)+metal carbide (MC) phase field, which may influence (e.g., compel the increase of) the temperature(s) employed to form the cutting table 502. In addition, the material composition of the homogenized alloy of the alloy material 513 may affect (e.g., increase, decrease) the melting temperature(s) of the homogenized alloy, and may also affect (e.g., shift) the metastability lines of the L+D+MC+κ-carbide phase field, which may also impact (e.g., compel the increase of) the temperature(s) employed to form the cutting table 502. The diamond-containing material 501, the supporting substrate 504, and the alloy material 513 may be held at selected temperatures and pressures within the heated, pressurized cell for a sufficient amount of time to facilitate the inter-bonding of the discrete diamond particles of the diamond-containing material 501, such as a period of time between about 30 seconds and about 20 minutes.

During the HTHP processing, the homogenized alloy of the alloy material 513 melts and a portion thereof is swept (e.g., mass transported, diffused) into the diamond-containing material 501 (FIG. 5A). The homogenized alloy received by the diamond-containing material 501 catalyzes the formation of inter-granular bonds between the discrete diamond particles of the diamond-containing material 501 to form inter-bonded diamond particles, and also facilitates the formation of a thermally stable material (e.g., the thermally stable material 118 previously described with reference to FIG. 2) within interstitial spaces between the inter-bonded diamond particles of the cutting table 502. When the homogenized alloy is in a liquid phase, the second element (e.g., one or more of Al, Ga, Sn, Be, Bi, Te, Sb, Se, As, Ge, Si, and B) of the homogenized alloy may reduce the reactivity of the first element (e.g., Sc, Ti, V, Cr, Mn, Fe, Co, Ni, Cu, Zn, Y, Zr, Nb, Mo, Tc, Ru, Rh, Pd, Ag, Cd, Hf, Ta, Re, Os, Ir, Pt, Au, Hg, La, Ce, Pr, Nd, Pm, Sm, Eu, Gd, Tb, Dy, Ho, Er, Tm, Yb, Lu, Ac, Th, Pa, and U) of the homogenized alloy with C, permitting the first element to catalyze the formation of inter-granular bonds between the discrete diamond particles of the diamond-containing material 501 and also promoting the formation of non-binary carbide precipitates (e.g., ternary κ-carbide precipitates, ternary non-κ-carbide precipitates, quaternary κ-carbide precipitates, quaternary non-κ-carbide precipitates) within the interstitial spaces between the inter-bonded diamond particles of the cutting table. Even if the first element comprises an element (e.g., Co, No, Ag, Cu, Au, Pt, Tc) that is not highly reactive with C to form a binary carbide, the second element may enhance the stability properties (e.g., thermal stability properties, mechanical stability properties) of the cutting table 502 by facilitating the formation of carbide precipitates (e.g., κ-carbide precipitates, non-κ-carbide precipitates) having formula (1) above. The thermally stable material of the cutting table 502 may render the cutting table 502 thermally stable without needing to leach the cutting table 502. For example, the thermally stable material may not significantly promote carbon transformations (e.g., graphite-to-diamond or vice versa) as compared to conventional cutting tables including inter-bonded diamond particles substantially exposed to conventional catalyst materials (e.g., catalytic Co, catalytic Fe, catalytic Ni) within interstitial spaces between the inter-bonded diamond particles. Accordingly, the thermally stable material may render the cutting table 502 more thermally stable than conventional cutting tables.

Optionally, following formation, the cutting table 502 may be subjected to at least one solution treatment process to modify the material composition of the thermally stable material thereof. The solution treatment process may, for example, decompose carbide precipitates (e.g., κ-carbide precipitates, non-κ-carbide precipitates) of the thermally stable material into to one or more other precipitates, such as FCC $L1_2$ phase precipitates. By way of non-limiting example, if at least the alloy material 513 (FIG. 5A) effectuates the formation of a thermally stable material including κ-carbide precipitates in the cutting table 502, the cutting table 502 may optionally be subjected to a solution treatment process that heats the thermally stable material at least to a decomposition temperature of the κ-carbide precipitates (e.g., a temperature greater than or equal to about 1000° C., such as from about 1000° C. to about 1500° C., or from about 1300° C. to about 1500° C.) at a pressure above the Berman-Simon line to decompose the κ-carbide precipitates and form FCC $L1_2$ phase precipitates. If employed, the cutting table 502 may be subjected to a single (e.g., only one) solution treatment process employing a single temperature under pressure above the Berman-Simon line, or may be subjected to multiple (e.g., more than one) solution treatment processes employing different temperatures under pressure above the Berman-Simon line. Multiple solution treatment processes at different temperatures may, for example, facilitate the formation of precipitates (e.g., FCC $L1_2$ phase precipitates) having different particle sizes than one another. Relatively larger precipitate sizes may enhance high-temperature properties (e.g., creep rupture properties) of the thermally stable material, and relatively smaller precipitate sizes may enhance room-temperature properties of the thermally stable material.

With returned reference to FIG. 1, while FIG. 1 depicts a particular configuration of the cutting element 100, including particular configurations of the cutting table 102 and the supporting substrate 104 thereof, different configurations may be employed. One or more of the cutting table 102 and the supporting substrate 104 may, for example, exhibit a different shape (e.g., a dome shape, a conical shape, a frusto-conical shape, a rectangular column shape, a pyramidal shape, a frusto-pyramidal shape, a fin shape, a pillar shape, a stud shape, or an irregular shape) and/or a different size (e.g., a different diameter, a different height), and/or the interface 106 between the supporting substrate 104 and cutting table 102 may be non-planar (e.g., convex, concave, ridged, sinusoidal, angled, jagged, V-shaped, U-shaped, irregularly shaped, etc.). By way of non-limiting example, in accordance with additional embodiments of the disclosure, FIGS. 6 through 17 show simplified side elevation views of cutting elements exhibiting different configurations than that of the cutting element 100 shown in FIG. 1. Throughout FIGS. 6 through 17 and the description associated therewith, functionally similar features are referred to with similar reference numerals incremented by 100. To avoid repetition, not all features shown in FIGS. 6 through 17 are described in detail herein. Rather, unless described otherwise below, a feature designated by a reference numeral that is a 100 increment of the reference numeral of a feature previously described with respect to one or more of FIGS. 1 and 6 through 17 (whether the previously described feature is first described before the present paragraph, or is first described after the present paragraph) will be understood to be substantially similar to the previously described feature.

Figure 6:
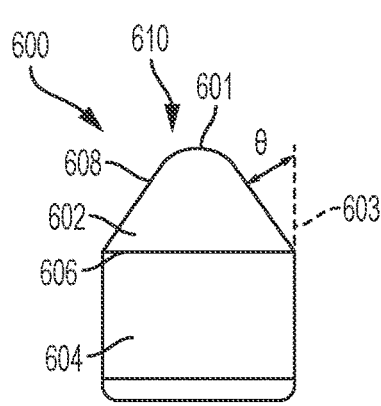
FIGS. 6 through 17 are side elevation views of different cutting elements, in accordance with additional embodiments of the disclosure.

FIG. 6 illustrates a simplified side elevation view of a cutting element 600, in accordance with another embodiment of the disclosure. The cutting element 600 includes a supporting substrate 604, and a cutting table 602 attached to the supporting substrate 604 at an interface 606. The cutting table 602 may have a material composition and a material distribution substantially similar to the material composition and the material distribution of the cutting table 102 previously described with reference to FIGS. 1 and 2. In addition, the supporting substrate 604 may have a material composition and a material distribution substantially similar to the material composition and the material distribution of one or more of the supporting substrates 104, 304, 404, 504 previously described with reference to FIGS. 1, 3A, 4A, and 5A. As shown in FIG. 6, the cutting table 602 exhibits a generally conical shape, and includes a conical side surface 608 and an apex 601 (e.g., tip) that at least partially define a cutting face 610 of the cutting table 602. The apex 601 comprises an end of the cutting table 602 opposing another end of the cutting table 602 secured to the supporting substrate 604 at the interface 606. The conical side surface 608 extends upwardly and inwardly from or proximate the interface 606 toward the apex 601. The apex 601 may be centered about a central longitudinal axis of the cutting element 600, and may be at least partially (e.g., substantially) radiused (e.g., arcuate). The conical side surface 608 may be defined by at least one angle θ between the conical side surface 608 and a phantom line 603 (shown in FIG. 6 with dashed lines) longitudinally extending from a lateral side surface of the supporting substrate 604. The angle θ may, for example, be within a range of from about five degrees (5°) to about eighty-five degrees (85°), such as from about fifteen degrees (15°) to about seventy-five degrees (75°), from about thirty degrees (30°) to about sixty degrees (60°), or from about forty-five degrees (45°) to about sixty degrees (60°). Ratios of a height of the cutting element 600 to outer diameters of the cutting element 600 may be within a range of from about 0.1 to about 48. The cutting element 600, including the cutting table 602 and the supporting substrate 604 thereof, may be formed using one or more processes substantially similar to those previously described with reference to FIGS. 3A through 5B (e.g., a process substantially similar to that previously described with reference to FIGS. 3A and 3B; a process substantially similar to that previously described with reference to FIGS. 4A and 4B; a process substantially similar to that previously described with reference to FIGS. 5A and 5B).

Figure 7:
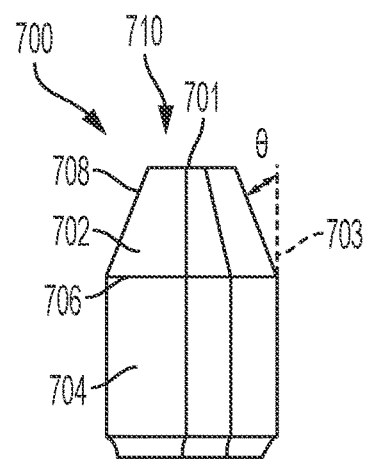

FIG. 7 illustrates a simplified side elevation view of a cutting element 700, in accordance with another embodiment of the disclosure. The cutting element 700 includes a supporting substrate 704, and a cutting table 702 attached to the supporting substrate 704 at an interface 706. The cutting table 702 may have a material composition and a material distribution substantially similar to the material composition and the material distribution of the cutting table 102 previously described with reference to FIGS. 1 and 2. In addition, the supporting substrate 704 may have a material composition and a material distribution substantially similar to the material composition and the material distribution of one or more of the supporting substrates 104, 304, 404, 504 previously described with reference to FIGS. 1, 3A, 4A, and 5A. As shown in FIG. 7, the cutting table 702 exhibits a generally frusto-conical shape, and includes a conical side surface 708 and an apex 701 (e.g., tip) that at least partially define a cutting face 710 of the cutting table 702. The apex 701 comprises an end of the cutting table 702 opposing another end of the cutting table 702 secured to the supporting substrate 704 at the interface 706. The conical side surface 708 extends upwardly and inwardly from or proximate the interface 706 toward the apex 701. The apex 701 may be centered about and may extend symmetrically outward diametrically from and perpendicular to a central longitudinal axis of the cutting element 700. The apex 701 may exhibit a circular lateral shape or a non-circular lateral shape (e.g., a laterally elongated shape, such as a rectangular shape, a non-rectangular quadrilateral shape, an elliptical shape, etc.), and may be substantially flat (e.g., two-dimensional, planar, non-radiused, non-arcuate, non-curved). The conical side surface 708 may be defined by at least one angle θ between the conical side surface 708 and a phantom line 703 (shown in FIG. 7 with dashed lines) longitudinally extending from a lateral side surface of the supporting substrate 704. The angle θ may, for example, be within a range of from about 5° to about 85°, such as from about 15° to about 75°, from about 30° to about 60°, or from about 45° to about 60°. Interfaces (e.g., edges) between the conical side surface 708 and the apex 701 may be smooth and transitioned (e.g., chamfered and/or radiused), or may be sharp (e.g., non-chamfered and non-radiused). A ratio of an outer diameter of the cutting table 702 at the apex 701 relative to an outer diameter of the cutting table 702 at the interface 706 may be within a range of from about 0.001 to about 1. The cutting element 700, including the cutting table 702 and the supporting substrate 704 thereof, may be formed using one or more processes substantially similar to those previously described with reference to FIGS. 3A through 5B (e.g., a process substantially similar to that previously described with reference to FIGS. 3A and 3B; a process substantially similar to that previously described with reference to FIGS. 4A and 4B; a process substantially similar to that previously described with reference to FIGS. 5A and 5B).

Figure 8:
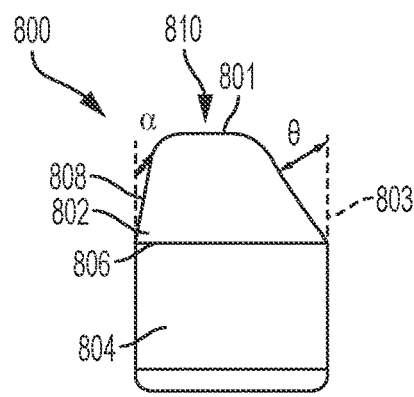

FIG. 8 illustrates a simplified side elevation view of a cutting element 800, in accordance with another embodiment of the disclosure. The cutting element 800 includes a supporting substrate 804, and a cutting table 802 attached to the supporting substrate 804 at an interface 806. The cutting table 802 may have a material composition and a material distribution substantially similar to the material composition and the material distribution of the cutting table 102 previously described with reference to FIGS. 1 and 2. In addition, the supporting substrate 804 may have a material composition and a material distribution substantially similar to the material composition and the material distribution of one or more of the supporting substrates 104, 304, 404, 504 previously described with reference to FIGS. 1, 3A, 4A, and 5A. As shown in FIG. 8, the cutting table 802 exhibits a generally frusto-conical shape, and includes a conical side surface 808 and an apex 801 (e.g., tip) that at least partially define a cutting face 810 of the cutting table 802. The apex 801 comprises an end of the cutting table 802 opposing another end of the cutting table 802 secured to the supporting substrate 804 at the interface 806. The conical side surface 808 extends upwardly and inwardly from or proximate the interface 806 toward the apex 801. A center of the apex 801 may be laterally offset from a central longitudinal axis of the cutting element 800. The apex 801 may exhibit a circular lateral shape or a non-circular lateral shape (e.g., a laterally elongated shape, such as a rectangular shape, a non-rectangular quadrilateral shape, an elliptical shape, etc.), and may be substantially flat (e.g., two-dimensional, planar, non-radiused, non-arcuate, non-curved). At least one region of the conical side surface 808 may be defined by at least one angle θ between the conical side surface 808 and a phantom line 803 (shown in FIG. 8 with dashed lines) longitudinally extending from a lateral side surface of the supporting substrate 804, and at least one other region of the conical side surface 808 may be defined by at least one additional angle α between the conical side surface 808 and the phantom line 803. The angle θ may be greater than the additional angle α. Each of the angle θ and the additional angle α may individually be within a range of from about 5° to about 85°. Interfaces (e.g., edges) between the conical side surface 808 and the apex 801 may be smooth and transitioned (e.g., chamfered and/or radiused), or may be sharp (e.g., non-chamfered and non-radiused). A ratio of an outer diameter of the cutting table 802 at the apex 801 relative to an outer diameter of the cutting table 802 at the interface 806 may be within a range of from about 0.001 to about 1. The cutting element 800, including the cutting table 802 and the supporting substrate 804 thereof, may be formed using one or more processes substantially similar to those previously described with reference to FIGS. 3A through 5B (e.g., a process substantially similar to that previously described with reference to FIGS. 3A and 3B; a process substantially similar to that previously described with reference to FIGS. 4A and 4B; a process substantially similar to that previously described with reference to FIGS. 5A and 5B).

Figure 9:
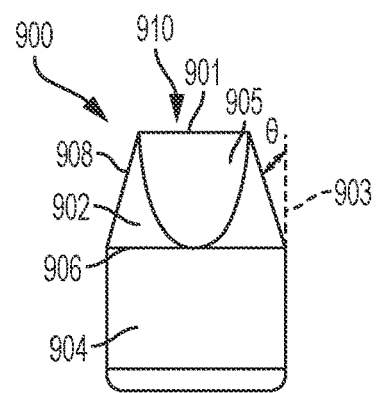

FIG. 9 illustrates a simplified side elevation view of a cutting element 900, in accordance with another embodiment of the disclosure. The cutting element 900 includes a supporting substrate 904, and a cutting table 902 attached to the supporting substrate 904 at an interface 906. The cutting table 902 may have a material composition and a material distribution substantially similar to the material composition and the material distribution of the cutting table 102 previously described with reference to FIGS. 1 and 2. In addition, the supporting substrate 904 may have a material composition and a material distribution substantially similar to the material composition and the material distribution of one or more of the supporting substrates 104, 304, 404, 504 previously described with reference to FIGS. 1, 3A, 4A, and 5A. As shown in FIG. 9, the cutting table 902 exhibits a chisel shape, and includes opposing conical side surfaces 908, opposing flat side surfaces 905, and an apex 901 (e.g., tip) that at least partially define a cutting face 910 of the cutting table 902. The apex 901 comprises an end of the cutting table 902 opposing another end of the cutting table 902 secured to the supporting substrate 904 at the interface 906. The opposing conical side surfaces 908 extend upwardly and inwardly from or proximate the interface 906 toward the apex 901. The opposing flat side surfaces 905 intervene between the opposing conical side surfaces 908, and also extend upwardly and inwardly from or proximate the interface 906 toward the apex 901. The apex 901 may be centered about and may extend symmetrically outward diametrically from and perpendicular to a central longitudinal axis of the cutting element 900. The apex 901 may exhibit a circular lateral shape or a non-circular lateral shape (e.g., a laterally elongated shape, such as a rectangular shape, a non-rectangular quadrilateral shape, an elliptical shape, etc.), and may be either arcuate (e.g., non-planar, radiused, curved) or substantially flat (e.g., two-dimensional, planar, non-radiused, non-arcuate, non-curved). The opposing conical side surfaces 908 may be defined by at least one angle θ between each of the opposing conical side surfaces 908 and a phantom line 903 (shown in FIG. 9 with dashed lines) longitudinally extending from a lateral side surface of the supporting substrate 904. The angle θ may, for example, be within a range of from about 5° to about 85°, such as from about 15° to about 75°, from about 30° to about 60°, or from about 45° to about 60°. The opposing flat side surfaces 905 may individually be defined by at least one other angle between the flat side surface 905 and the phantom line 903, wherein the at least one other angle is different than (e.g., less than or greater than) the angle θ between each of the opposing conical side surfaces 908 and the phantom line 903. Interfaces between the opposing conical side surfaces 908, the opposing flat side surfaces 905, and the apex 901 may be smooth and transitioned (e.g., chamfered and/or radiused), or may be sharp (e.g., non-chamfered and non-radiused). In some embodiments, a maximum height of the cutting element 900 is less than or equal to about 48 mm. The cutting element 900, including the cutting table 902 and the supporting substrate 904 thereof, may be formed using one or more processes substantially similar to those previously described with reference to FIGS. 3A through 5B (e.g., a process substantially similar to that previously described with reference to FIGS. 3A and 3B; a process substantially similar to that previously described with reference to FIGS. 4A and 4B; a process substantially similar to that previously described with reference to FIGS. 5A and 5B).

Figure 10:
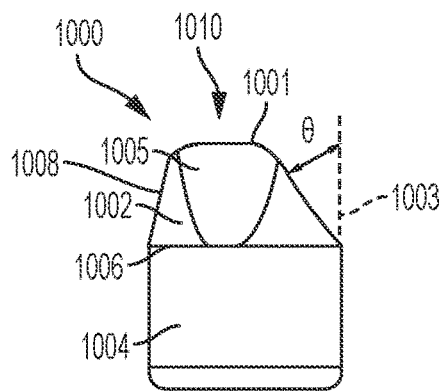

FIG. 10 illustrates a simplified side elevation view of a cutting element 1000, in accordance with another embodiment of the disclosure. The cutting element 1000 includes a supporting substrate 1004, and a cutting table 1002 attached to the supporting substrate 1004 at an interface 1006. The cutting table 1002 may have a material composition and a material distribution substantially similar to the material composition and the material distribution of the cutting table 102 previously described with reference to FIGS. 1 and 2. In addition, the supporting substrate 1004 may have a material composition and a material distribution substantially similar to the material composition and the material distribution of one or more of the supporting substrates 104, 304, 404, 504 previously described with reference to FIGS. 1, 3A, 4A, and 5A. As shown in FIG. 10, the cutting table 1002 exhibits a chisel shape, and includes opposing conical side surfaces 1008, opposing flat side surfaces 1005, and an apex 1001 (e.g., tip) that at least partially define a cutting face 1010 of the cutting table 1002. The apex 1001 comprises an end of the cutting table 1002 opposing another end of the cutting table 1002 secured to the supporting substrate 1004 at the interface 1006. The opposing conical side surfaces 1008 extend upwardly and inwardly from or proximate the interface 1006 toward the apex 1001. The opposing flat side surfaces 1005 intervene between the opposing conical side surfaces 1008, and also extend upwardly and inwardly from or proximate the interface 1006 toward the apex 1001. A center of the apex 1001 may be laterally offset from a central longitudinal axis of the cutting element 1000. The apex 1001 may exhibit a circular lateral shape or a non-circular lateral shape (e.g., a laterally elongated shape, such as a rectangular shape, a non-rectangular quadrilateral shape, an elliptical shape, etc.), and may be either arcuate (e.g., non-planar, radiused, curved) or substantially flat (e.g., two-dimensional, planar, non-radiused, non-arcuate, non-curved). One of the opposing conical side surfaces 1008 may be defined by at least one angle θ between the conical side surface 1008 and a phantom line 1003 (shown in FIG. 10 with dashed lines) longitudinally extending from a lateral side surface of the supporting substrate 1004, and another of the opposing conical side surfaces 1008 may be defined by another angle less than the angle θ. The angle θ may be within a range of from about 5° to about 85°, such as from about 15° to about 75°, from about 30° to about 60°, or from about 45° to about 60°. The opposing flat side surfaces 1005 may individually be defined by at least one additional angle between the flat side surface 1005 and the phantom line 1003, wherein the at least one additional angle is different than (e.g., less than or greater than) the angle θ. Interfaces between the opposing conical side surfaces 1008, the opposing flat side surfaces 1005, and the apex 1001 may be smooth and transitioned (e.g., chamfered and/or radiused), or may be sharp (e.g., non-chamfered and non-radiused). The cutting element 1000, including the cutting table 1002 and the supporting substrate 1004 thereof, may be formed using one or more processes substantially similar to those previously described with reference to FIGS. 3A through 5B (e.g., a process substantially similar to that previously described with reference to FIGS. 3A and 3B; a process substantially similar to that previously described with reference to FIGS. 4A and 4B; a process substantially similar to that previously described with reference to FIGS. 5A and 5B).

Figure 11:
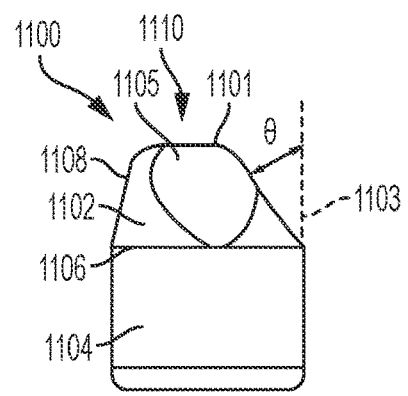

FIG. 11 illustrates a simplified side elevation view of a cutting element 1100, in accordance with another embodiment of the disclosure. The cutting element 1100 includes a supporting substrate 1104, and a cutting table 1102 attached to the supporting substrate 1104 at an interface 1106. The cutting table 1102 may have a material composition and a material distribution substantially similar to the material composition and the material distribution of the cutting table 102 previously described with reference to FIGS. 1 and 2. In addition, the supporting substrate 1104 may have a material composition and a material distribution substantially similar to the material composition and the material distribution of one or more of the supporting substrates 104, 304, 404, 504 previously described with reference to FIGS. 1, 3A, 4A, and 5A. As shown in FIG. 11, the cutting table 1102 exhibits a chisel shape, and includes opposing conical side surfaces 1108, opposing flat side surfaces 1105, and an apex 1101 (e.g., tip) that at least partially define a cutting face 1110 of the cutting table 1102. The configuration of the cutting table 1102 is similar to the configuration of the cutting table 1002 (FIG. 10) except that the apex 1101 of the cutting table 1102 may extend non-perpendicular (e.g., non-orthogonal) to a central longitudinal axis of the cutting element 1100. For example, the apex 1101 of the cutting table 1102 may exhibit a negative slope or a positive slope. The cutting element 1100, including the cutting table 1102 and the supporting substrate 1104 thereof, may be formed using one or more processes substantially similar to those previously described with reference to FIGS. 3A through 5B (e.g., a process substantially similar to that previously described with reference to FIGS. 3A and 3B; a process substantially similar to that previously described with reference to FIGS. 4A and 4B; a process substantially similar to that previously described with reference to FIGS. 5A and 5B).

Figure 12:
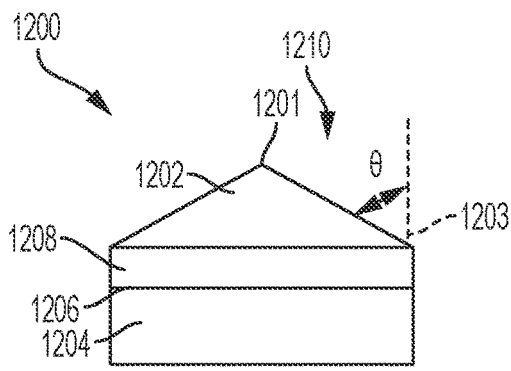

FIG. 12 illustrates a simplified side elevation view of a cutting element 1200, in accordance with another embodiment of the disclosure. The cutting element 1200 includes a supporting substrate 1204, and a cutting table 1202 attached to the supporting substrate 1204 at an interface 1206. The cutting table 1202 may have a material composition and a material distribution substantially similar to the material composition and the material distribution of the cutting table 102 previously described with reference to FIGS. 1 and 2. In addition, the supporting substrate 1204 may have a material composition and a material distribution substantially similar to the material composition and the material distribution of one or more of the supporting substrates 104, 304, 404, 504 previously described with reference to FIGS. 1, 3A, 4A, and 5A. As shown in FIG. 12, the cutting table 1202 exhibits a generally conical shape, and includes a semi-conical side surface 1208 and an apex 1201 (e.g., tip) that at least partially define a cutting face 1210 of the cutting table 1202. The apex 1201 comprises an end of the cutting table 1202 opposing another end of the cutting table 1202 secured to the supporting substrate 1204 at the interface 1206. The apex 1201 may be sharp (e.g., non-radiused), and may be centered about a central longitudinal axis of the cutting element 1200. For example, the apex 1201 may be a single (e.g., only one) point most distal from the interface 1206 between the supporting substrate 1204 and a cutting table 1202, or may be a single line most distal from the interface 1206 between the supporting substrate 1204 and a cutting table 1202. The semi-conical side surface 1208 may include a first portion adjacent the supporting substrate 1204 and extending substantially parallel to a phantom line 1203 (shown in FIG. 12 with dashed lines) longitudinally extending from a lateral side surface of the supporting substrate 1204, and a second portion between the first portion and the apex 1201 and extending at an angle θ relative to the phantom line 1203. The angle θ may, for example, be within a range of from about 5° to about 85°, such as from about 15° to about 75°, from about 30° to about 60°, or from about 45° to about 60°. The cutting element 1200, including the cutting table 1202 and the supporting substrate 1204 thereof, may be formed using one or more processes substantially similar to those previously described with reference to FIGS. 3A through 5B (e.g., a process substantially similar to that previously described with reference to FIGS. 3A and 3B; a process substantially similar to that previously described with reference to FIGS. 4A and 4B; a process substantially similar to that previously described with reference to FIGS. 5A and 5B).

Figure 13:
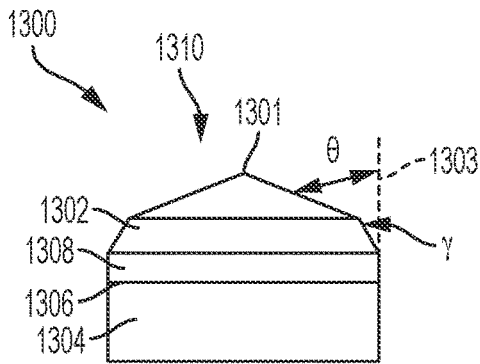

FIG. 13 illustrates a simplified side elevation view of a cutting element 1300, in accordance with another embodiment of the disclosure. The cutting element 1300 includes a supporting substrate 1304, and a cutting table 1302 attached to the supporting substrate 1304 at an interface 1306. The cutting table 1302 may have a material composition and a material distribution substantially similar to the material composition and the material distribution of the cutting table 102 previously described with reference to FIGS. 1 and 2. In addition, the supporting substrate 1304 may have a material composition and a material distribution substantially similar to the material composition and the material distribution of one or more of the supporting substrates 104, 304, 404, 504 previously described with reference to FIGS. 1, 3A, 4A, and 5A. As shown in FIG. 13, the cutting table 1302 exhibits a non-cylindrical shape, and includes a semi-conical side surface 1308 and an apex 1301 (e.g., tip) that at least partially define a cutting face 1310 of the cutting table 1302. The apex 1301 comprises an end of the cutting table 1302 opposing another end of the cutting table 1302 secured to the supporting substrate 1304 at the interface 1306. The apex 1301 may be sharp (e.g., non-radiused), and may be centered about a central longitudinal axis of the cutting element 1300. For example, the apex 1301 may be a single (e.g., only one) point most distal from the interface 1306 between the supporting substrate 1304 and a cutting table 1302, or may be a single line most distal from the interface 1306 between the supporting substrate 1304 and a cutting table 1302. The semi-conical side surface 1308 may include a first portion adjacent the supporting substrate 1304 and extending substantially parallel to a phantom line 1303 (shown in FIG. 13 with dashed lines) longitudinally extending from a lateral side surface of the supporting substrate 1304, a second portion adjacent the first portion and extending at an angle 7 relative to the phantom line 1303, and a third portion between the second portion and the apex 1301 and extending at an angle θ relative to the phantom line 1303. The angle θ between the third portion of the semi-conical side surface 1308 and the phantom line 1303 may be greater than the angle 7 between the second portion of the semi-conical side surface 1308 and the phantom line 1303. Each of the angle 7 between the second portion of the semi-conical side surface 1308 and the phantom line 1303 and angle θ between the third portion of the semi-conical side surface 1308 and the phantom line 1303 may individually be within a range of from about 5° to about 85°. The cutting element 1300, including the cutting table 1302 and the supporting substrate 1304 thereof, may be formed using one or more processes substantially similar to those previously described with reference to FIGS. 3A through 5B (e.g., a process substantially similar to that previously described with reference to FIGS. 3A and 3B; a process substantially similar to that previously described with reference to FIGS. 4A and 4B; a process substantially similar to that previously described with reference to FIGS. 5A and 5B).

Figure 14:
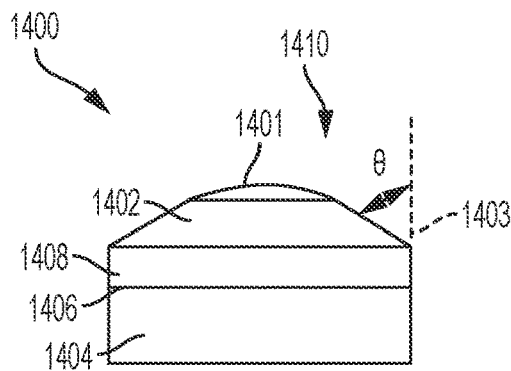

FIG. 14 illustrates a simplified side elevation view of a cutting element 1400, in accordance with another embodiment of the disclosure. The cutting element 1400 includes a supporting substrate 1404, and a cutting table 1402 attached to the supporting substrate 1404 at an interface 1406. The cutting table 1402 may have a material composition and a material distribution substantially similar to the material composition and the material distribution of the cutting table 102 previously described with reference to FIGS. 1 and 2. In addition, the supporting substrate 1404 may have a material composition and a material distribution substantially similar to the material composition and the material distribution of one or more of the supporting substrates 104, 304, 404, 504 previously described with reference to FIGS. 1, 3A, 4A, and 5A. As shown in FIG. 14, the cutting table 1402 exhibits a non-cylindrical shape, and includes a semi-conical side surface 1408 and an apex 1401 (e.g., tip) that at least partially define a cutting face 1410 of the cutting table 1402. The apex 1401 comprises an end of the cutting table 1402 opposing another end of the cutting table 1402 secured to the supporting substrate 1404 at the interface 1406. The apex 1401 may be radiused (e.g., arcuate, curved), and may be centered about a central longitudinal axis of the cutting element 1400. The semi-conical side surface 1408 may include a first portion adjacent the supporting substrate 1404 and extending substantially parallel to a phantom line 1403 (shown in FIG. 14 with dashed lines) longitudinally extending from a lateral side surface of the supporting substrate 1404, and a second portion between the first portion and the apex 1401 and extending at an angle θ relative to the phantom line 1403. The angle θ may, for example, be within a range of from about 5° to about 85°, such as from about 15° to about 75°, from about 30° to about 60°, or from about 45° to about 60°. The cutting element 1400, including the cutting table 1402 and the supporting substrate 1404 thereof, may be formed using one or more processes substantially similar to those previously described with reference to FIGS. 3A through 5B (e.g., a process substantially similar to that previously described with reference to FIGS. 3A and 3B; a process substantially similar to that previously described with reference to FIGS. 4A and 4B; a process substantially similar to that previously described with reference to FIGS. 5A and 5B).

Figure 15:
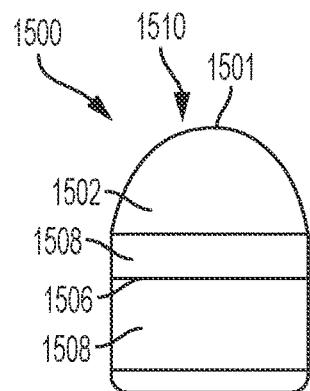

FIG. 15 illustrates a simplified side elevation view of a cutting element 1500, in accordance with another embodiment of the disclosure. The cutting element 1500 includes a supporting substrate 1504, and a cutting table 1502 attached to the supporting substrate 1504 at an interface 1506. The cutting table 1502 may have a material composition and a material distribution substantially similar to the material composition and the material distribution of the cutting table 102 previously described with reference to FIGS. 1 and 2. In addition, the supporting substrate 1504 may have a material composition and a material distribution substantially similar to the material composition and the material distribution of one or more of the supporting substrates 104, 304, 404, 504 previously described with reference to FIGS. 1, 3A, 4A, and 5A. As shown in FIG. 15, the cutting table 1502 exhibits a generally hemispherical shape, and includes a semi-hemispherical side surface 1508 and an apex 1501 (e.g., tip) that at least partially define a cutting face 1510 of the cutting table 1502. The apex 1501 comprises an end of the cutting table 1502 opposing another end of the cutting table 1502 secured to the supporting substrate 1504 at the interface 1506. The apex 1501 may be radiused (e.g., arcuate, curved), and may be centered about a central longitudinal axis of the cutting element 1500. The semi-hemispherical side surface 1508 may include a first portion adjacent the supporting substrate 1504 and extending substantially parallel to a lateral side surface of the supporting substrate 1504, and a second portion extending in an arcuate (e.g., curved) path between the first portion and the apex 1501. The cutting element 1500, including the cutting table 1502 and the supporting substrate 1504 thereof, may be formed using one or more processes substantially similar to those previously described with reference to FIGS. 3A through 5B (e.g., a process substantially similar to that previously described with reference to FIGS. 3A and 3B; a process substantially similar to that previously described with reference to FIGS. 4A and 4B; a process substantially similar to that previously described with reference to FIGS. 5A and 5B).

Figure 16:
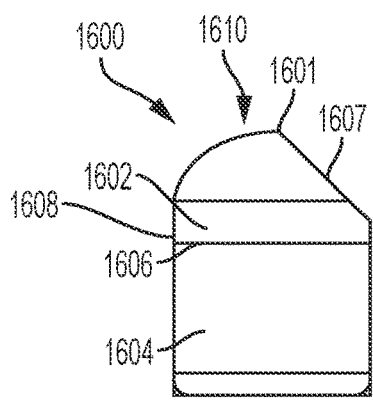

FIG. 16 illustrates a simplified side elevation view of a cutting element 1600, in accordance with another embodiment of the disclosure. The cutting element 1600 includes a supporting substrate 1604, and a cutting table 1602 attached to the supporting substrate 1604 at an interface 1606. The cutting table 1602 may have a material composition and a material distribution substantially similar to the material composition and the material distribution of the cutting table 102 previously described with reference to FIGS. 1 and 2. In addition, the supporting substrate 1604 may have a material composition and a material distribution substantially similar to the material composition and the material distribution of one or more of the supporting substrates 104, 304, 404, 504 previously described with reference to FIGS. 1, 3A, 4A, and 5A. As shown in FIG. 16, the cutting table 1602 exhibits a semi-hemispherical shape, and includes a semi-hemispherical side surface 1608, a flat side surface 1607, and an apex 1601 (e.g., tip) that at least partially define a cutting face 1610 of the cutting table 1602. The apex 1601 comprises an end of the cutting table 1602 opposing another end of the cutting table 1602 secured to the supporting substrate 1604 at the interface 1606. The semi-hemispherical side surface 1608 extends upwardly and inwardly from or proximate the interface 1606 toward the apex 1601. The flat side surface 1607 opposes the semi-hemispherical side surface 1608, and also extends upwardly and inwardly from or proximate the interface 1606 toward the apex 1601. The apex 1601 may be centered a longitudinal axis of the cutting element 1600. The semi-hemispherical side surface 1608 may include a first portion adjacent the supporting substrate 1604 and extending substantially parallel to a lateral side surface of the supporting substrate 1604, and a second portion extending in an arcuate (e.g., curved) path between the first portion and the apex 1601. The flat side surface 1607 may be substantially planar, and may be angled relative to a lateral side surface of the supporting substrate 1604. Interfaces between the semi-hemispherical side surface 1608, the flat side surface 1607, and the apex 1601 may be smooth and transitioned (e.g., chamfered and/or radiused), or may be sharp (e.g., non-chamfered and non-radiused). The cutting element 1600, including the cutting table 1602 and the supporting substrate 1604 thereof, may be formed using one or more processes substantially similar to those previously described with reference to FIGS. 3A through 5B (e.g., a process substantially similar to that previously described with reference to FIGS. 3A and 3B; a process substantially similar to that previously described with reference to FIGS.

4A and 4B; a process substantially similar to that previously described with reference to FIGS. 5A and 5B).

Figure 17:
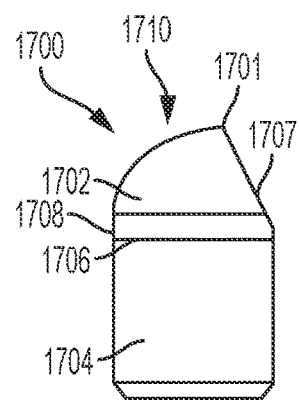

FIG. 17 illustrates a simplified side elevation view of a cutting element 1700, in accordance with another embodiment of the disclosure. The cutting element 1700 includes a supporting substrate 1704, and a cutting table 1702 attached to the supporting substrate 1704 at an interface 1706. The cutting table 1702 may have a material composition and a material distribution substantially similar to the material composition and the material distribution of the cutting table 102 previously described with reference to FIGS. 1 and 2. In addition, the supporting substrate 1704 may have a material composition and a material distribution substantially similar to the material composition and the material distribution of one or more of the supporting substrates 104, 304, 404, 504 previously described with reference to FIGS. 1, 3A, 4A, and 5A. As shown in FIG. 17, the cutting table 1702 exhibits a semi-hemispherical shape, and includes a semi-hemispherical side surface 1708, a flat side surface 1707, and an apex 1701 (e.g., tip) that at least partially define a cutting face 1710 of the cutting table 1702. The configuration of the cutting table 1702 is similar to the configuration of the cutting table 1602 (FIG. 16) except that the apex 1701 of the cutting table 1702 is laterally offset from a central longitudinal axis of the cutting element 1700. Laterally offsetting the apex 1701 from the central longitudinal axis of the cutting element 1700 may extend the dimensions of the semi-hemispherical side surface 1708 relative to those of the semi-conical side surface 1408 (FIG. 14) of the cutting element 1400 (FIG. 14), and may reduce the dimensions and angle of the flat side surface 1707 relative to those of the flat side surface 1607 (FIG. 16) of the cutting element 1600 (FIG. 16). The cutting element 1700, including the cutting table 1702 and the supporting substrate 1704 thereof, may be formed using one or more processes substantially similar to those previously described with reference to FIGS. 3A through 5B (e.g., a process substantially similar to that previously described with reference to FIGS. 3A and 3B; a process substantially similar to that previously described with reference to FIGS. 4A and 4B; a process substantially similar to that previously described with reference to FIGS. 5A and 5B).

The methods of the disclosure may also be employed to form structures other than cutting elements. Namely, the methods of the disclosure may be used whenever it is desired to form a structure or device including a table of hard material, such as diamond table (e.g., PDC table). The methods of disclosure may, for example, be employed to form various other structures associated with (e.g., employed in) downhole operations, such as bearing structures (e.g., bearing pads, bearing discs, bearing blocks, bearing sleeves), wear structures (e.g., wear pads, wear discs, wear block), block structures, die structures (e.g., tool die structures, wire die structures), and/or other structures. By way of non-limiting example, FIGS. 18 and 19 show additional structures (e.g., a bearing structure, a die structure) that may be formed in accordance with embodiments of the disclosure.

Figure 18:
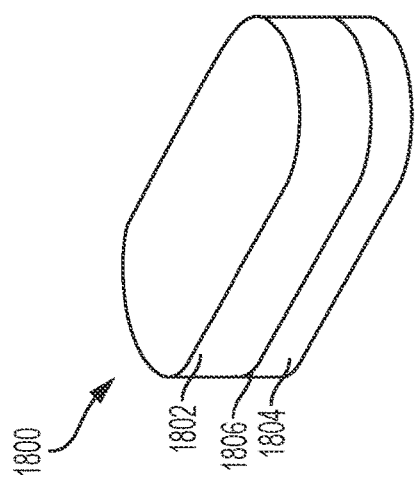
FIG. 18 is a perspective view of a bearing structure, in accordance with embodiments of the disclosure.

FIG. 18 illustrates a perspective view of a bearing structure 1800, in accordance with another embodiment of the disclosure. The bearing structure 1800 includes a supporting substrate 1804, and a hard material table 1802 (e.g., PDC table) attached to the supporting substrate 1804 at an interface 1806. The hard material table 1802 may have a material composition and a material distribution substantially similar to the material composition and the material distribution of the cutting table 102 previously described with reference to FIGS. 1 and 2. In addition, the supporting substrate 1804 may have a material composition and a material distribution substantially similar to the material composition and the material distribution of one or more of the supporting substrates 104, 304, 404, 504 previously described with reference to FIGS. 1, 3A, 4A, and 5A. The bearing structure 1800 may exhibit any desired peripheral geometric configuration (e.g., peripheral shape and peripheral size) suitable for a predetermined use of the bearing structure 1800. By way of non-limiting example, as shown in FIG. 18, the bearing structure 1800 may exhibit an elongate 3D shape, such as an ellipsoidal cylinder shape. In additional embodiments, the bearing structure 1800 may exhibit a different peripheral shape (e.g., a rectangular cylinder shape; circular cylinder shape; a conical shape; a frusto-conical shape; truncated versions thereof, or an irregular shape, such as a complex shape complementary to a recess or socket in an earth-boring tool to receive and hold the bearing structure 1800). In addition, the interface 1806 between the supporting substrate 1804 and the hard material table 1802 may be substantially planar, or may be non-planar (e.g., curved, angled, jagged, sinusoidal, V-shaped, U-shaped, irregularly shaped, combinations thereof, etc.). The bearing structure 1800, including the hard material table 1802 and the supporting substrate 1804 thereof, may be formed using one or more processes substantially similar to those previously described with reference to FIGS. 3A through 5B (e.g., a process substantially similar to that previously described with reference to FIGS. 3A and 3B; a process substantially similar to that previously described with reference to FIGS. 4A and 4B; a process substantially similar to that previously described with reference to FIGS. 5A and 5B).

Figure 19:
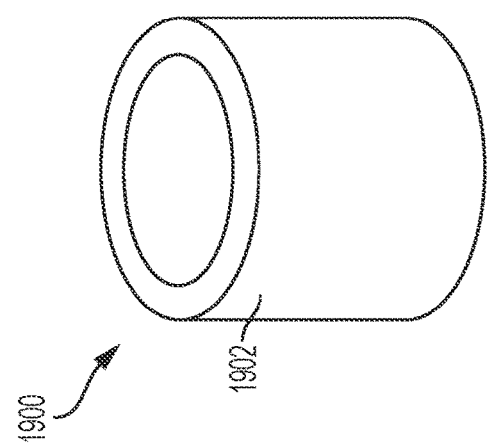
FIG. 19 is a perspective view of a die structure, in accordance with embodiments of the disclosure.

FIG. 19 illustrates a perspective view of die structure 1900, in accordance with another embodiment of the disclosure. The die structure 1900 includes a hard material table 1902 (e.g., PDC table), wherein the hard material table 1902 may have a material composition and a material distribution substantially similar to the material composition and the material distribution of the cutting table 102 previously described with reference to FIGS. 1 and 2. The die structure 1900 may exhibit any desired peripheral geometric configuration (e.g., peripheral shape and peripheral size) suitable for a predetermined use of the die structure 1900, such as a peripheral geometric configuration complementary to formation of another structure (e.g., an earth-boring tool structure, a wire structure) having a desired and predetermined peripheral geometric configuration. By way of non-limiting example, as shown in FIG. 19, the die structure 1900 may exhibit an at least partially (e.g., substantially) hollow elongate 3D shape, such as a tubular shape. In additional embodiments, the die structure 1900 may exhibit a different peripheral shape, such as an at least partially hollow form of a conical, cubic, cuboidal, cylindrical, semi-cylindrical, spherical, semi-spherical, triangular prismatic, or irregular shape. The die structure 1900, including the hard material table 1902 thereof, may be formed using one or more processes substantially similar to those previously described with reference to FIGS. 3A through 5B (e.g., a process substantially similar to that previously described with reference to FIGS. 3A and 3B; a process substantially similar to that previously described with reference to FIGS. 4A and 4B; a process substantially similar to that previously described with reference to FIGS. 5A and 5B).

Figure 20:
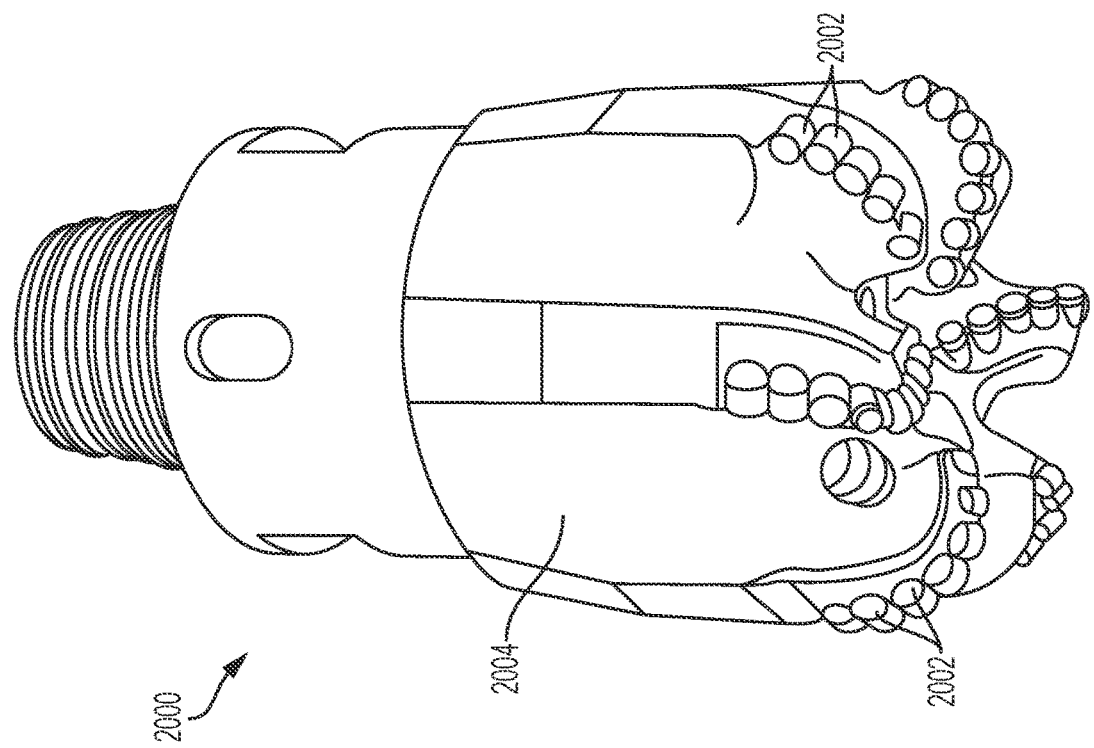
FIG. 20 is a perspective view of an embodiment of a fixed-cutter earth-boring rotary drill bit including a cutting element of the disclosure.

Embodiments of cutting elements (e.g., the cutting elements 100, 600, 700, 800, 900, 1000, 1100, 1200, 1300, 1400, 1500, 1600, 1700 illustrated in FIGS. 1 and 6 through 17) described herein may be secured to an earth-boring tool and used to remove subterranean formation material in accordance with additional embodiments of the disclosure. The earth-boring tool may, for example, be a rotary drill bit, a percussion bit, a coring bit, an eccentric bit, a reamer tool, a milling tool, etc. As a non-limiting example, FIG. 20 illustrates a fixed-cutter type earth-boring rotary drill bit 2000 that includes cutting elements 2002. One or more of the cutting elements 2002 may be substantially similar to one or more of the cutting elements 100, 600, 700, 800, 900, 1000, 1100, 1200, 1300, 1400, 1500, 1600, 1700 previously described herein with respect to FIGS. 1 and 6 through 17, and may be formed in accordance to the processes previously described herein with reference to FIGS. 3A through 5B (e.g., a process substantially similar to that previously described with reference to FIGS. 3A and 3B; a process substantially similar to that previously described with reference to FIGS. 4A and 4B; a process substantially similar to that previously described with reference to FIGS. 5A and 5B). The rotary drill bit 2000 includes a bit body 2004, and the cutting elements 2002 are attached to the bit body 2004. The cutting elements 2002 may, for example, be brazed, welded, or otherwise secured, within pockets formed in an outer surface of the bit body 2004. Optionally, the rotary drill bit 2000 may also include one or more other structures (e.g., bearing structures, wear structures, block structures) formed according to embodiments of the disclosure, such as the bearing structure 1800 previously described herein with respect to FIG. 18.

The following example serves to explain some embodiments of the present disclosure in more detail. The example is not to be construed as being exhaustive or exclusive as to the scope of the disclosure.

EXAMPLE

The stabilities (e.g., thermal stabilities, and mechanical stabilities) of different κ-carbide precipitates were evaluated using Vienna Ab-initio computer simulation package (VASP) methodologies. The analysis evaluated enthalpy of formation and eigenvalue from Young's modulus calculation for the different κ-carbide precipitates. Table 1 below summarizes the results of the analysis. As shown in Table 1, the κ-carbide precipitates each had an enthalpy of formation that was less than zero (indicating that the κ-carbide precipitate is thermally stable). In addition, each of the κ-carbide precipitates listed in Table 1 had an eigenvalue from a Young's modulus calculation that was positive (indicating that the κ-carbide precipitate is mechanically stable). The results indicate that each of the κ-carbide precipitates listed in Table 1 are stable and suitable for inclusion in a thermally stable material of a hard material structure (e.g., cutting table) for use in an earth-boring tool.

TABLE 1

| κ-carbide precipitate | Enthalpy of Formation (KJ/mol) | κ-carbide precipitate | Enthalpy of Formation (KJ/mol) | κ-carbide precipitate | Enthalpy of Formation (KJ/mol) |
| --- | --- | --- | --- | --- | --- |
| $Sm_3SnC$ | −704.822 | $Sm_3BiC$ | −698.476 | $Sm_3TeC$ | −680.23 |
| $Sm_3PC$ | −628.793 | $Sm_3SiC$ | −605.694 | $Sm_3GaC$ | −456.928 |
| $Sc_3SnC$ | −401.508 | $Sc_3GeC$ | −392.05 | $Sc_3SbC$ | −378.622 |
| $Sc_3AsC$ | −374.565 | $Sm_3BeC$ | −368.085 | $Sc_3PC$ | −361.205 |
| $Sc_3SiC$ | −354.422 | $Y_3SnC$ | −350.531 | $Sc_3BiC$ | −344.436 |
| $Tm_3SnC$ | −342.149 | $Er_3SnC$ | −339.945 | $Sc_3TeC$ | −339.294 |
| $Y_3SbC$ | −336.165 | $Sc_3SeC$ | −336.02 | $Ho_3SnC$ | −336 |
| $Sc_3GaC$ | −333.574 | $Dy_3SnC$ | −330.185 | $Y_3BiC$ | −325.21 |
| $Tb_3SnC$ | −322.851 | $Tm_3SbC$ | −321.617 | $Er_3SbC$ | −321.554 |
| $Lu_3SbC$ | −320.949 | $Lu_3GeC$ | −317.071 | $Ti_3GaC$ | −314.641 |
| $Ti_3GeC$ | −314.539 | $Gd_3SnC$ | −312.478 | $Tb_3SbC$ | −312.211 |
| $Y_3GeC$ | −311.336 | $Er_3BiC$ | −310.831 | $Ho_3BiC$ | −310.214 |
| $Tm_3BiC$ | −309.923 | $Lu_3AsC$ | −309.917 | $Tm_3GeC$ | −308.447 |
| $Dy_3BiC$ | −307.974 | $Lu_3BiC$ | −306.895 | $Tm_3AsC$ | −305.001 |
| $Tb_3BiC$ | −304.29 | $Ti_3SnC$ | −303.132 | $Er_3AsC$ | −302.427 |
| $Ti_3SiC$ | −301.968 | $Y_3TeC$ | −299.938 | $Gd_3BiC$ | −297.664 |
| $Ce_3TeC$ | −296.429 | $Ti_3AlC$ | −295.679 | $Zr_3SnC$ | −293.917 |
| $Dy_3AsC$ | −292.429 | $La_3BiC$ | −292.319 | $Sc_3AlC$ | −291.925 |
| $Yb_3SeC$ | −286.034 | $Tb_3AsC$ | −284.901 | $Lu_3PC$ | −282.484 |
| $Yb_3TeC$ | −282.293 | $Lu_3SnC$ | −281.097 | $Eu_3SeC$ | −278.937 |
| $Er_3TeC$ | −278.876 | $Ti_3SbC$ | −276.999 | $Lu_3SiC$ | −276.354 |
| $Tm_3TeC$ | −276.141 | $Tm_3PC$ | −275.024 | $Gd_3TeC$ | −274.579 |
| $Gd_3AsC$ | −274.349 | $Zr_3SbC$ | −274.346 | $Lu_3GaC$ | −271.369 |
| $Er_3PC$ | −271.368 | $Sm_3BC$ | −270.449 | $Lu_3TeC$ | −270.02 |
| $Ho_3PC$ | −266.29 | $Tm_3SiC$ | −265.632 | $Er_3SiC$ | −260.226 |
| $Dy_3PC$ | −259.237 | $Tm_3GaC$ | −256.175 | $Ce_3AsC$ | −254.551 |
| $Y_3GaC$ | −253.35 | $Ho_3SiC$ | −253.253 | $Tb_3PC$ | −250.6 |
| $Er_3GaC$ | −248.557 | $Dy_3SiC$ | −244.364 | $Eu_3BiC$ | −242.797 |
| $Hf_3GaC$ | −240.6 | $Ho_3GaC$ | −239.225 | $Gd_3PC$ | −238.928 |
| $Gd_3SeC$ | −237.084 | $Lu_3AlC$ | −236.831 | $Ce_3SnC$ | −235.456 |
| $Tb_3SiC$ | −233.924 | $Hf_3SnC$ | −231.962 | $Dy_3GaC$ | −228.5 |
| $Tm_3AlC$ | −222.698 | $Gd_3SiC$ | −220.401 | $Ti_3BiC$ | −216.955 |
| $Tb_3GaC$ | −216.845 | $Er_3AlC$ | −215.553 | $Yb_3BiC$ | −215.171 |
| $Yb_3SbC$ | −215.169 | $La_3PC$ | −215.099 | $Eu_3AsC$ | −214.244 |
| $Fe_3AlC$ | −210.127 | $Ho_3AlC$ | −206.657 | $Gd_3GaC$ | −202.834 |
| $Yb_3AsC$ | −202.589 | $Th_3BiC$ | −198.184 | $Ac_3SbC$ | −194.323 |
| $Th_3SnC$ | −193.111 | $Tb_3AlC$ | −185.118 | $Eu_3PC$ | −184.188 |
| $Fe_3SiC$ | −183.358 | $Ti_3BeC$ | −182.722 | $Yb_3PC$ | −177.404 |
| $Gd_3AlC$ | −171.312 | $Hf_3PC$ | −169.998 | $V_3SiC$ | −167.077 |
| $Ce_3SiC$ | −160.936 | $V_3GeC$ | −156.93 | $Fe_3GaC$ | −154.834 |
| $Rh_3AlC$ | −154.2 | $Th_3GeC$ | −147.293 | $V_3AlC$ | −145.097 |
| $Fe_3GeC$ | −142.829 | $V_3GaC$ | −141.158 | $Th_3PC$ | −135.138 |

TABLE 1-continued

| κ-carbide precipitate | Enthalpy of Formation (KJ/mol) | κ-carbide precipitate | Enthalpy of Formation (KJ/mol) | κ-carbide precipitate | Enthalpy of Formation (KJ/mol) |
|---|---|---|---|---|---|
| $V_3PC$ | −132.001 | $V_3SnC$ | −122.954 | $Fe_3SnC$ | −121.707 |
| $Zr_3BeC$ | −120.908 | $Hf_3BeC$ | −118.593 | $Nb_3GaC$ | −116.249 |
| $Sc_3BeC$ | −115.788 | $Th_3AlC$ | −115.145 | $V_3SbC$ | −112.187 |
| $Ce_3AlC$ | −109.525 | $V_3AsC$ | −108.401 | $Ni_3AlC$ | −107.311 |
| $Ti_3BC$ | −90.6332 | $Rh_3GaC$ | −87.8091 | $Fe_3BeC$ | −81.5766 |
| $Fe_3SbC$ | −79.5255 | $Sc_3BC$ | −75.0164 | $U_3PC$ | −74.7 |
| $Fe_3PC$ | −71.9518 | $Hf_3BiC$ | −65.1081 | $V_3BeC$ | −60.2572 |
| $V_3TeC$ | −57.678 | $Ni_3GaC$ | −55.3182 | $Lu_3BeC$ | −53.9309 |
| $Mn_3AlC$ | −53.5059 | $Ru_3AlC$ | −52.9992 | $Fe_3AsC$ | −51.9214 |
| $Ta_3SnC$ | −48.3087 | $Mn_3SiC$ | −47.6618 | $V_3SeC$ | −44.3932 |
| $U_3SeC$ | −43.7951 | $U_3SiC$ | −34.204 | $Cr_3SiC$ | −31.172 |
| $V_3BiC$ | −26.412 | $Tc_3AlC$ | −23.8878 | $La_3SiC$ | −21.94 |
| $Rh_3SnC$ | −20.2771 | $Cr_3AlC$ | −19.8249 | $U_3AsC$ | −14.1404 |
| $Mn_3GaC$ | −13.0819 | $Th_3SiC$ | −11.3861 | $Rh_3BeC$ | −10.6868 |
| $Ni_3BeC$ | −8.44939 | $Mn_3GeC$ | −7.60212 | $Cr_3GeC$ | −4.23139 |
| $Pd_3AlC$ | −2.3424 | $Cr_3GaC$ | −0.66372 | $Co3AlC$ | −157.648 |
| $Co3GaC$ | −100.221 | $Co3SiC$ | −66.0251 | $Co3SnC$ | −42.3607 |
| $Co3BeC$ | −41.6805 | $Co3GeC$ | −37.7468 | | |

While the disclosure is susceptible to various modifications and alternative forms, specific embodiments have been shown by way of example in the drawings and have been described in detail herein. However, the disclosure is not limited to the particular forms disclosed. Rather, the disclosure is to cover all modifications, equivalents, and alternatives falling within the scope of the following appended claims and their legal equivalent. For example, elements and features disclosed in relation to one embodiment may be combined with elements and features disclosed in relation to other embodiments of the disclosure.

What is claimed is:

1. A method of forming a cutting element, comprising:
   providing a diamond-containing material comprising discrete diamond particles over a substrate;
   sintering the diamond-containing material in the presence of a liquid phase of a homogenized alloy comprising at least one first element selected from Sc, Ti, V, Cr, Mn, Fe, Co, Ni, Cu, Zn, Y, Zr, Nb, Mo, Tc, Ru, Rh, Pd, Ag, Cd, Hf, Ta, Re, Os, Ir, Pt, Au, Hg, La, Ce, Pr, Nd, Pm, Sm, Eu, Gd, Tb, Dy, Ho, Er, Tm, Yb, Lu, Ac, Th, Pa, and U, and at least one second element selected from Al, Ga, Sn, Be, Bi, Te, Sb, Se, As, Ge, Si, B, and P to inter-bond the discrete diamond particles; and
   converting portions of the homogenized alloy within interstitial spaces between the inter-bonded diamond particles into a thermally stable material comprising:
   one or more carbide precipitates having the general chemical formula:

$A_3XZ_{1-n}$, where A comprises the at least one first element;
   X comprises the at least one second element;
   Z comprises C; and
   n is greater than or equal to 0 and less than or equal to 0.75; and
   one or more of an FCC $L1_2$ phase precipitate, an FCC $DO_{22}$ phase precipitate, a $D8_5$ phase precipitate, a $DO_{19}$ phase precipitate, a BCC/B2 phase precipitate, and an FCC $L1_0$ phase precipitate.

2. The method of claim 1, further comprising formulating the homogenized alloy to have an amount of the at least one second element capable of substantially suppressing reactions between the at least one first element and C that would otherwise form a binary carbide when the discrete diamond particles of the diamond-containing material are exposed to the liquid phase of the homogenized alloy.

3. A method of forming a cutting element, comprising:
   providing a diamond-containing material comprising discrete diamond particles over a substrate;
   sintering the diamond-containing material in the presence of a liquid phase of a homogenized alloy comprising at least one first element selected from Sc, Ti, V, Cr, Mn, Fe, Co, Ni, Cu, Zn, Y, Zr, Nb, Mo, Tc, Ru, Rh, Pd, Ag, Cd, Hf, Ta, Re, Os, Ir, Pt, Au, Hg, La, Ce, Pr, Nd, Pm, Sm, Eu, Gd, Tb, Dy, Ho, Er, Tm, Yb, Lu, Ac, Th, Pa, and U, and at least one second element selected from Al, Ga, Sn, Be, Bi, Te, Sb, Se, As, Ge, Si, B, and P to inter-bond the discrete diamond particles; and
   converting portions of the homogenized alloy within interstitial spaces between the inter-bonded diamond particles into a thermally stable material substantially free of Co, the thermally stable material comprising one or more carbide precipitates having the general chemical formula:

$A_3XZ_{1-n}$, where A comprises the at least one first element;
   X comprises the at least one second element;
   Z comprises C; and
   n is greater than or equal to 0 and less than or equal to 0.75.

4. The method of claim 1, wherein:
   providing the diamond-containing material over the substrate comprises providing the diamond-containing material directly on a supporting substrate comprising a homogenized binder comprising C, W, the at least one first element, and the at least one second element, and WC particles dispersed within the homogenized binder; and
   sintering the diamond-containing material in the presence of the liquid phase of the homogenized alloy comprises subjecting the supporting substrate and the diamond-containing material to elevated temperatures and elevated pressures to melt and diffuse a portion of the homogenized binder of the supporting substrate into the diamond-containing material and catalyze the formation of the inter-bonded diamond particles.

5. The method of claim 4, further comprising selecting the homogenized binder of the supporting substrate to have a melting temperature greater than or equal to about 750° C.

6. The method of claim 4, further comprising forming the diamond-containing material to comprise the discrete diamond particles and discrete alloy particles individually comprising the at least one first element and the at least one second element, and wherein sintering the diamond-containing material in the presence of the liquid phase of the homogenized alloy comprises subjecting the diamond-containing material to elevated temperatures and elevated pressures to melt the discrete alloy particles and catalyze the formation of the inter-bonded diamond particles.

7. The method of claim 6, further comprising selecting the discrete alloy particles to individually comprise a homogenized alloy selected from $Sm_3Sn$, $Sm_3Bi$, $Sm_3Te$, $Sm_3P$, $Sm_3Si$, $Sm_3Ga$, $Sc_3Sn$, $Sc_3Ge$, $Sc_3Sb$, $Sc_3As$, $Sm_3Be$, $Sc_3P$, $Sc_3Si$, $Y_3Sn$, $Sc_3Bi$, $Tm_3Sn$, $Er_3Sn$, $Sc_3Te$, $Y_3Sb$, $Sc_3Se$, $Ho_3Sn$, $Sc_3Ga$, $Dy_3Sn$, $Y_3Bi$, $Tb_3Sn$, $Tm_3Sb$, $Er_3Sb$, $Lu_3Sb$, $Lu_3Ge$, $Ti_3Ga$, $Ti_3Ge$, $Gd_3Sn$, $Tb_3Sb$, $Y_3Ge$, $Er_3Bi$, $Ho_3Bi$, $Tm_3Bi$, $Lu_3As$, $Tm_3Ge$, $Dy_3Bi$, $Lu_3Bi$, $Tm_3As$, $Tb_3Bi$, $Ti_3Sn$, $Er_3As$, $Ti_3Si$, $Y_3Te$, $Gd_3Bi$, $Ce_3Te$, $Ti_3Al$, $Zr_3Sn$, $Dy_3As$, $La_3Bi$, $Sc_3Al$, $Yb_3Se$, $Tb_3As$, $Lu_3P$, $Yb_3Te$, $Lu_3Sn$, $Eu_3Se$, $Er_3Te$, $Ti_3Sb$, $Lu_3Si$, $Tm_3Te$, $Tm_3P$, $Gd_3Te$, $Gd_3As$, $Zr_3Sb$, $Lu_3Ga$, $Er_3P$, $Sm_3B$, $Lu_3Te$, $Ho_3P$, $Tm_3Si$, $Er_3Si$, $Dy_3P$, $Tm_3Ga$, $Ce_3As$, $Y_3Ga$, $Ho_3Si$, $Tb_3P$, $Er_3Ga$, $Dy_3Si$, $Eu_3Bi$, $Hf_3Ga$, $Ho_3Ga$, $Gd_3P$, $Gd_3Se$, $Lu_3Al$, $Ce_3Sn$, $Tb_3Si$, $Hf_3Sn$, $Dy_3Ga$, $Tm_3Al$, $Gd_3Si$, $Ti_3Bi$, $Tb_3Ga$, $Er_3Al$, $Yb_3Bi$, $Yb_3Sb$, $La_3P$, $Eu_3As$, $Fe_3Al$, $Ho_3Al$, $Gd_3Ga$, $Yb_3As$, $Th_3Bi$, $Ac_3Sb$, $Th_3Sn$, $Tb_3Al$, $Eu_3P$, $Fe_3Si$, $Ti_3Be$, $Yb_3P$, $Gd_3Al$, $Hf_3P$, $V_3Si$, $Ce_3Si$, $V_3Ge$, $Fe_3Ga$, $Rh_3Al$, $Th_3Ge$, $V_3Al$, $Fe_3Ge$, $V_3Ga$, $Th_3P$, $V_3P$, $V_3Sn$, $Fe_3Sn$, $Zr_3Be$, $Hf_3Be$, $Nb_3Ga$, $Sc_3Be$, $Th_3Al$, $V_3Sb$, $Ce_3Al$, $Co_3Al$, $V_3As$, $Ni_3Al$, $Co_3Ga$, $Ti_3B$, $Rh_3Ga$, $Fe_3Be$, $Fe_3Sb$, $Sc_3B$, $U_3P$, $Fe_3P$, $Co_3Si$, $Hf_3Bi$, $V_3Be$, $V_3Te$, $Ni_3Ga$, $Lu_3Be$, $Mn_3Al$, $Ru_3Al$, $Fe_3As$, $Ta_3Sn$, $Mn_3Si$, $V_3Se$, $U_3Se$, $Co_3Sn$, $Co_3Be$, $Co_3Ge$, $U_3Si$, $Cr_3Si$, $V_3Bi$, $Tc_3Al$, $La_3Si$, $Rh_3Sn$, $Cr_3Al$, $U_3As$, $Mn_3Ga$, $Th_3Si$, $Rh_3Be$, $Ni_3Be$, $Mn_3Ge$, $Cr_3Ge$, $Pd_3Al$, and $Cr_3Ga$.

8. The method of claim 2, further comprising providing an alloy material comprising a substantially homogeneous alloy of the at least one first element and the at least one second element directly adjacent one or more outermost boundaries of the diamond-containing material, and wherein sintering the diamond-containing material in the presence of the liquid phase of the homogenized alloy comprises subjecting the diamond-containing material and the alloy material to elevated temperatures and elevated pressures to melt and diffuse a portion of the substantially homogeneous alloy of the alloy material into the diamond-containing material and catalyze the formation of the inter-bonded diamond particles.

9. The method of claim 8, further comprising selecting the substantially homogeneous alloy from $Sm_3Sn$, $Sm_3Bi$, $Sm_3Te$, $Sm_3P$, $Sm_3Si$, $Sm_3Ga$, $Sc_3Sn$, $Sc_3Ge$, $Sc_3Sb$, $Sc_3As$, $Sm_3Be$, $Sc_3P$, $Sc_3Si$, $Y_3Sn$, $Sc_3Bi$, $Tm_3Sn$, $Er_3Sn$, $Sc_3Te$, $Y_3Sb$, $Sc_3Se$, $Ho_3Sn$, $Sc_3Ga$, $Dy_3Sn$, $Y_3Bi$, $Tb_3Sn$, $Tm_3Sb$, $Er_3Sb$, $Lu_3Sb$, $Lu_3Ge$, $Ti_3Ga$, $Ti_3Ge$, $Gd_3Sn$, $Tb_3Sb$, $Y_3Ge$, $Er_3Bi$, $Ho_3Bi$, $Tm_3Bi$, $Lu_3As$, $Tm_3Ge$, $Dy_3Bi$, $Lu_3Bi$, $Tm_3As$, $Tb_3Bi$, $Ti_3Sn$, $Er_3As$, $Ti_3Si$, $Y_3Te$, $Gd_3Bi$, $Ce_3Te$, $Ti_3Al$, $Zr_3Sn$, $Dy_3As$, $La_3Bi$, $Sc_3Al$, $Yb_3Se$, $Tb_3As$, $Lu_3P$, $Yb_3Te$, $Lu_3Sn$, $Eu_3Se$, $Er_3Te$, $Ti_3Sb$, $Lu_3Si$, $Tm_3Te$, $Tm_3P$, $Gd_3Te$, $Gd_3As$, $Zr_3Sb$, $Lu_3Ga$, $Er_3P$, $Sm_3B$, $Lu_3Te$, $Ho_3P$, $Tm_3Si$, $Er_3Si$, $Dy_3P$, $Tm_3Ga$, $Ce_3As$, $Y_3Ga$, $Ho_3Si$, $Tb_3P$, $Er_3Ga$, $Dy_3Si$, $Eu_3Bi$, $Hf_3Ga$, $Ho_3Ga$, $Gd_3P$, $Gd_3Se$, $Lu_3Al$, $Ce_3Sn$, $Tb_3Si$, $Hf_3Sn$, $Dy_3Ga$, $Tm_3Al$, $Gd_3Si$, $Ti_3Bi$, $Tb_3Ga$, $Er_3Al$, $Yb_3Bi$, $Yb_3Sb$, $La_3P$, $Eu_3As$, $Fe_3Al$, $Ho_3Al$, $Gd_3Ga$, $Yb_3As$, $Th_3Bi$, $Ac_3Sb$, $Th_3Sn$, $Tb_3Al$, $Eu_3P$, $Fe_3Si$, $Ti_3Be$, $Yb_3P$, $Gd_3Al$, $Hf_3P$, $V_3Si$, $Ce_3Si$, $V_3Ge$, $Fe_3Ga$, $Rh_3Al$, $Th_3Ge$, $V_3Al$, $Fe_3Ge$, $V_3Ga$, $Th_3P$, $V_3P$, $V_3Sn$, $Fe_3Sn$, $Zr_3Be$, $Hf_3Be$, $Nb_3Ga$, $Sc_3Be$, $Th_3Al$, $V_3Sb$, $Ce_3Al$, $Co_3Al$, $V_3As$, $Ni_3Al$, $Co_3Ga$, $Ti_3B$, $Rh_3Ga$, $Fe_3Be$, $Fe_3Sb$, $Sc_3B$, $U_3P$, $Fe_3P$, $Co_3Si$, $Hf_3Bi$, $V_3Be$, $V_3Te$, $Ni_3Ga$, $Lu_3Be$, $Mn_3Al$, $Ru_3Al$, $Fe_3As$, $Ta_3Sn$, $Mn_3Si$, $V_3Se$, $U_3Se$, $Co_3Sn$, $Co_3Be$, $Co_3Ge$, $U_3Si$, $Cr_3Si$, $V_3Bi$, $Tc_3Al$, $La_3Si$, $Rh_3Sn$, $Cr_3Al$, $U_3As$, $Mn_3Ga$, $Th_3Si$, $Rh_3Be$, $Ni_3Be$, $Mn_3Ge$, $Cr_3Ge$, $Pd_3Al$, and $Cr_3Ga$.

10. The method of claim 8, wherein providing the alloy material comprising the substantially homogeneous alloy of the at least one first element and the at least one second element directly adjacent one or more outermost boundaries of the diamond-containing material comprises providing the alloy material directly adjacent opposing outermost boundaries of the diamond-containing material and the substrate, such that at least a portion of the alloy material intervenes between the diamond-containing material and the substrate.

11. The method of claim 8, wherein providing the alloy material comprising the substantially homogeneous alloy of the at least one first element and the at least one second element directly adjacent one or more outermost boundaries of the diamond-containing material comprises providing the alloy material directly adjacent outermost boundaries of the diamond-containing material, such that the alloy material does not substantially intervene between the diamond-containing material and the substrate.

12. The method of claim 2, wherein converting portions of the homogenized alloy within interstitial spaces between the inter-bonded diamond particles into the thermally stable material comprises forming the thermally stable material to comprise one or more of $Sm_3SnC_{1-n}$, $Sm_3BiC_{1-n}$, $Sm_3TeC_{1-n}$, $Sm_3PC_{1-n}$, $Sm_3SiC_{1-n}$, $Sm_3GaC_{1-n}$, $Sc_3SnC_{1-n}$, $Sc_3GeC_{1-n}$, $Sc_3SbC_{1-n}$, $Sc_3AsC_{1-n}$, $Sm_3BeC_{1-n}$, $Sc_3PC_{1-n}$, $Sc_3SiC_{1-n}$, $Y_3SnC_{1-n}$, $Sc_3BiC_{1-n}$, $Tm_3SnC_{1-n}$, $Er_3SnC_{1-n}$, $Sc_3TeC_{1-n}$, $Y_3SbC_{1-n}$, $Sc_3SeC_{1-n}$, $Ho_3SnC_{1-n}$, $Sc_3GaC_{1-n}$, $Dy_3SnC_{1-n}$, $Y_3BiC_{1-n}$, $Tb_3SnC_{1-n}$, $Tm_3SbC_{1-n}$, $Er_3SbC_{1-n}$, $Lu_3SbC_{1-n}$, $Lu_3GeC_{1-n}$, $Ti_3GaC_{1-n}$, $Ti_3GeC_{1-n}$, $Gd_3SnC_{1-n}$, $Tb_3SbC_{1-n}$, $Y_3GeC_{1-n}$, $Er_3BiC_{1-n}$, $Ho_3BiC_{1-n}$, $Tm_3BiC_{1-n}$, $Lu_3AsC_{1-n}$, $Tm_3GeC_{1-n}$, $Dy_3BiC_{1-n}$, $Lu_3BiC_{1-n}$, $Tm_3AsC_{1-n}$, $Tb_3BiC_{1-n}$, $Ti_3SnC_{1-n}$, $Er_3AsC_{1-n}$, $Ti_3SiC_{1-n}$, $Y_3TeC_{1-n}$, $Gd_3BiC_{1-n}$, $Ce_3TeC_{1-n}$, $Ti_3AlC_{1-n}$, $Zr_3SnC_{1-n}$, $Dy_3AsC_{1-n}$, $La_3BiC_{1-n}$, $Sc_3AlC_{1-n}$, $Yb_3SeC_{1-n}$, $Tb_3AsC_{1-n}$, $Lu_3PC_{1-n}$, $Yb_3TeC_{1-n}$, $Lu_3SnC_{1-n}$, $Eu_3SeC_{1-n}$, $Er_3TeC_{1-n}$, $Ti_3SbC_{1-n}$, $Lu_3SiC_{1-n}$, $Tm_3TeC_{1-n}$, $Tm_3PC_{1-n}$, $Gd_3TeC_{1-n}$, $Gd_3AsC_{1-n}$, $Zr_3SbC_{1-n}$, $Lu_3GaC_{1-n}$, $Er_3PC_{1-n}$, $Sm_3BC_{1-n}$, $Lu_3TeC_{1-n}$, $Ho_3PC_{1-n}$, $Tm_3SiC_{1-n}$, $Er_3SiC_{1-n}$, $Dy_3PC_{1-n}$, $Tm_3GaC_{1-n}$, $Ce_3AsC_{1-n}$, $Y_3GaC_{1-n}$, $Ho_3SiC_{1-n}$, $Tb_3PC_{1-n}$, $Er_3GaC_{1-n}$, $Dy_3SiC_{1-n}$, $Eu_3BiC_{1-n}$, $Hf_3GaC_{1-n}$, $Ho_3GaC_{1-n}$, $Gd_3PC_{1-n}$, $Gd_3SeC_{1-n}$, $Lu_3AlC_{1-n}$, $Ce_3SnC_{1-n}$, $Tb_3SiC_{1-n}$, $Hf_3SnC_{1-n}$, $Dy_3GaC_{1-n}$, $Tm_3AlC_{1-n}$, $Gd_3SiC_{1-n}$, $Ti_3BiC_{1-n}$, $Tb_3GaC_{1-n}$, $Er_3AlC_{1-n}$, $Yb_3BiC_{1-n}$, $Yb_3SbC_{1-n}$, $La_3PC_{1-n}$, $Eu_3AsC_{1-n}$, $Fe_3AlC_{1-n}$, $Ho_3AlC_{1-n}$, $Gd_3GaC_{1-n}$, $Yb_3AsC_{1-n}$, $Th_3BiC_{1-n}$, $AC_3SbC_{1-n}$, $Th_3SnC_{1-n}$, $Tb_3AlC_{1-n}$, $Eu_3PC_{1-n}$, $Fe_3SiC_{1-n}$, $Ti_3BeC_{1-n}$, $Yb_3PC_{1-n}$, $Gd_3AlC_{1-n}$, $Hf_3PC_{1-n}$, $V_3SiC_{1-n}$, $Ce_3SiC_{1-n}$, $V_3GeC_{1-n}$, $Fe_3GaC_{1-n}$, $Rh_3AlC_{1-n}$, $Th_3GeC_{1-n}$, $V_3AlC_{1-n}$, $Fe_3GeC_{1-n}$, $V_3GaC_{1-n}$, $Th_3PC_{1-n}$, $V_3PC_{1-n}$, $V_3SnC_{1-n}$, $Fe_3SnC_{1-n}$, $Zr_3BeC_{1-n}$, $Hf_3BeC_{1-n}$, $Nb_3GaC_{1-n}$, $SC_3BeC_{1-n}$, $Th_3AlC_{1-n}$, $V_3SbC_{1-n}$, $Ce_3AlC_{1-n}$, $Co_3AlC_{1-n}$, $V_3AsC_{1-n}$, $Ni_3AlC_{1-n}$, $Co_3GaC_{1-n}$, $Ti_3BC_{1-n}$, $Rh_3GaC_{1-n}$, $Fe_3BeC_{1-n}$, $Fe_3SbC_{1-n}$, $SC_3BC_{1-n}$, $U_3PC_{1-n}$, $Fe_3PC_{1-n}$, $Co_3SiC_{1-n}$, $Hf_3BiC_{1-n}$, $V_3BeC_{1-n}$, $V_3TeC_{1-n}$, $Ni_3GaC_{1-n}$, $Lu_3BeC_{1-n}$, $Mn_3AlC_{1-n}$, $Ru_3AlC_{1-n}$, $Fe_3AsC_{1-n}$, $Ta_3SnC_{1-n}$, $Mn_3SiC_{1-n}$, $V_3SeC_{1-n}$, $U_3SeC_{1-n}$, $Co_3SnC_{1-n}$, $Co_3BeC_{1-n}$, $Co_3GeC_{1-n}$, $U_3SiC_{1-n}$, $Cr_3SiC_{1-n}$, $V_3BiC_{1-n}$, $Tc_3AlC_{1-n}$, $La_3SiC_{1-n}$, $Rh_3SnC_{1-n}$, $Cr_3AlC_{1-n}$, $U_3AsC_{1-n}$, $Mn_3GaC_{1-n}$, $Th_3SiC_{1-n}$, $Rh_3BeC_{1-n}$, $Ni_3BeC_{1-n}$, $Mn_3GeC_{1-n}$, $Cr_3GeC_{1-n}$, $Pd_3AlC_{1-n}$, and $Cr_3GaC_{1-n}$, wherein $0 \leq n \leq 0.75$.

13. The method of claim 2, further comprising solution treating the thermally stable material to decompose the one or more carbide precipitates thereof into one or more FCC $L1_2$ phase precipitates.

14. A method of forming a cutting element, comprising:
providing a diamond-containing material comprising discrete diamond particles over a substrate;
sintering the diamond-containing material in the presence of a liquid phase of a homogenized alloy to inter-bond the discrete diamond particles, the homogenized alloy comprising:
one first element selected from Sc, Ti, V, Cr, Mn, Fe, Co, Ni, Cu, Zn, Y, Zr, Nb, Mo, Tc, Ru, Rh, Pd, Ag, Cd, Hf, Ta, Re, Os, Ir, Pt, Au, Hg, La, Ce, Pr, Nd, Pm, Sm, Eu, Gd, Tb, Dy, Ho, Er, Tm, Yb, Lu, Ac, Th, Pa, and U; and
two second elements selected from Al, Ga, Sn, Be, Bi, Te, Sb, Se, As, Ge, Si, B, and P; and
converting portions of the homogenized alloy within interstitial spaces between the inter-bonded diamond particles into a thermally stable material comprising a quaternary κ-carbide having the general chemical formula:

$A_3XZ_{1-n}$, where A comprises the one first element;
X comprises the two second elements;
Z comprises C; and
n is greater than or equal to 0 and less than or equal to 0.75.

15. The method of claim 14, wherein providing the diamond-containing material over the substrate comprises providing the diamond-containing material directly on a supporting substrate, the supporting substrate comprising:
a homogenized binder comprising C, W, the one first element, and the two second elements; and
WC particles dispersed within the homogenized binder.

16. The method of claim 15, further comprising selecting the homogenized binder of the supporting substrate to have a melting temperature within a range of from about 1000° C. to about 1500° C.

17. The method of claim 16, wherein sintering the diamond-containing material in the presence of the liquid phase of the homogenized alloy comprises subjecting the supporting substrate and the diamond-containing material to elevated temperatures and elevated pressures to melt and diffuse a portion of the homogenized binder of the supporting substrate into the diamond-containing material and catalyze the formation of the inter-bonded diamond particles.

18. The method of claim 14, further comprising forming the diamond-containing material to comprise the discrete diamond particles and discrete alloy particles individually comprising the one first element and the two second elements, and wherein sintering the diamond-containing material comprises subjecting the diamond-containing material to elevated temperatures and elevated pressures to melt the discrete alloy particles to form the liquid phase of the homogenized alloy and catalyze the formation of the inter-bonded diamond particles.

* * * * *

UNITED STATES PATENT AND TRADEMARK OFFICE
CERTIFICATE OF CORRECTION

PATENT NO. : 11,885,182 B2
APPLICATION NO. : 17/662871
DATED : January 30, 2024
INVENTOR(S) : Wanjun Cao and Marc W. Bird It is certified that error appears in the above-identified patent and that said Letters Patent is hereby corrected as shown below:

On the Title Page
In ITEM (57) ABSTRACT    Line 8,    change "formula, $A_3XZ_{n-1}$, where A" to --formula, $A_3XZ_{1-n}$, where A--

In the Specification
Column 2,    Line 27,    change "formula, $A_3XZ_{n-1}$, where A" to --formula, $A_3XZ_{1-n}$, where A--

Column 33,    Line 39,    change "$Ce_3Al$, $CO_3Al$, $V_3As$," to --$Ce_3Al$, $CO_3Al$, $V_3As$,--

Column 42,    Lines 51-52,    change "angle 7 relative to" to --angle $\gamma$ relative to--

Column 42,    Lines 56-57,    change "than the angle 7 between" to --than the angle $\gamma$ between--

Column 42,    Lines 58-59,    change "Each of the angle 7 between" to --Each of the angle $\gamma$ relative to--

Column 46,    Line 16,    change "versions thereof, or" to --versions thereof; or--

Signed and Sealed this
Twenty-seventh Day of August, 2024

Katherine Kelly Vidal
*Director of the United States Patent and Trademark Office*